US008708800B2

(12) United States Patent
Nicley et al.

(10) Patent No.: US 8,708,800 B2
(45) **Date of Patent: *Apr. 29, 2014**

(54) GAMING SYSTEM, GAMING DEVICE AND METHOD FOR PROVIDING A STRATEGY GAME HAVING A PLURALITY OF AWARDS

(71) Applicant: IGT, Reno, NV (US)

(72) Inventors: Mark C. Nicley, Daly City, NV (US); Binh T. Nguyen, Reno, NV (US); Scott A. Caputo, Santa Clara, CA (US); Ernie M. Lafky, San Francisco, CA (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/773,232

(22) Filed: Feb. 21, 2013

(65) Prior Publication Data

US 2013/0172059 A1 Jul. 4, 2013

Related U.S. Application Data

(63) Continuation of application No. 12/203,743, filed on Sep. 3, 2008, now Pat. No. 8,393,968.

(51) Int. Cl.
*A63F 9/24* (2006.01)
*A63F 13/00* (2014.01)
*G07F 17/32* (2006.01)

(52) U.S. Cl.
USPC ...................... 463/20; 463/5; 463/16; 463/42

(58) Field of Classification Search
USPC ........................................... 463/16, 20, 42, 5
See application file for complete search history.

(56) References Cited

U.S. PATENT DOCUMENTS 3,167,313 A 1/1965 Davenport et al.
4,003,578 A 1/1977 Jones
4,277,067 A 7/1981 Gettleman
4,323,242 A 4/1982 Rosenfeld
4,511,143 A 4/1985 Sankrithi
4,582,324 A 4/1986 Koza et al.

(Continued)

FOREIGN PATENT DOCUMENTS

EP 0 945 837 9/1999
EP 1 199 689 4/2002

(Continued)

OTHER PUBLICATIONS

Mark Nelson, Breaking Down Breakout: System and Level Design for Breakout-style Games, Aug. 2007, http://www.gamasutra.com/view/feature/130053/breaking_down_breakout_system_and_.php?print=1.*

(Continued)

*Primary Examiner* — Dmitry Suhol
*Assistant Examiner* — Jason Yen
(74) *Attorney, Agent, or Firm* — Neal, Gerber & Eisenberg LLP

(57) ABSTRACT

The disclosed gaming system, gaming device and method provide a game including a plurality of awards, each of the awards associated with a plurality of award characteristics, including an award value and a level of difficulty. Based at least in part on the award characteristics associated with the awards, a player strategically chooses which award or awards to play for (i.e., which award or awards to attempt to collect) in the game. In certain multiplayer embodiments, two or more players can work together to obtain awards.

26 Claims, 36 Drawing Sheets

(56) References Cited

U.S. PATENT DOCUMENTS 4,850,592 A 7/1989 Winter
5,083,800 A 1/1992 Lockton
5,178,395 A 1/1993 Lovell
5,333,868 A 8/1994 Goldfarb
5,560,603 A 10/1996 Seelig et al.
5,566,942 A 10/1996 Elum
5,611,730 A 3/1997 Weiss
5,664,998 A 9/1997 Seelig et al.
5,772,509 A 6/1998 Weiss
5,779,544 A 7/1998 Seelig et al.
5,813,672 A 9/1998 Loud, Jr.
5,876,284 A 3/1999 Acres et al.
5,882,258 A 3/1999 Kelly et al.
5,980,384 A 11/1999 Barrie
6,012,982 A 1/2000 Piechowiak et al.
6,015,346 A 1/2000 Bennett
6,050,895 A 4/2000 Luciano, Jr. et al.
6,089,976 A 7/2000 Schneider et al.
6,102,798 A 8/2000 Bennett
6,134,556 A 10/2000 Shin
6,224,486 B1 5/2001 Walker et al.
6,261,177 B1 7/2001 Bennett
6,273,420 B1 8/2001 Brooks
6,309,299 B1 10/2001 Weiss
6,309,300 B1 10/2001 Glavich
6,315,664 B1 11/2001 Baerlocher et al.
6,319,124 B1 11/2001 Baerlocher et al.
6,379,249 B1 * 4/2002 Satsukawa et al. ............. 463/31
6,406,369 B1 6/2002 Baerlocher et al.
6,439,995 B1 8/2002 Hughs-Baird et al.
6,443,837 B1 9/2002 Jaffe et al.
6,450,883 B1 9/2002 O'Halloran
6,511,375 B1 1/2003 Kaminkow
6,514,141 B1 2/2003 Kaminkow et al.
6,558,254 B2 5/2003 Baelocher et al.
6,572,469 B2 6/2003 Klitsner et al.
6,572,473 B1 6/2003 Baerlocher
6,582,307 B2 6/2003 Webb
6,589,117 B1 7/2003 Moritome et al.
6,595,854 B2 7/2003 Hughs-Baird et al.
6,599,185 B1 7/2003 Kaminkow et al.
6,602,136 B1 8/2003 Baerlocher et al.
6,602,137 B2 8/2003 Kaminkow et al.
6,607,437 B2 8/2003 Casey et al.
6,607,438 B2 8/2003 Baerlocher et al.
6,612,575 B1 9/2003 Cole et al.
6,638,164 B2 10/2003 Randall et al.
6,645,071 B2 11/2003 Perrie et al.
6,645,074 B2 11/2003 Thomas et al.
6,676,516 B2 1/2004 Baerlocher et al.
6,676,521 B1 1/2004 La Mura et al.
6,692,356 B2 2/2004 Baerlocher et al.
6,722,981 B2 4/2004 Kaminkow et al.
6,722,982 B2 4/2004 Kaminkow et al.
6,733,386 B2 5/2004 Cuddy et al.
6,743,096 B2 6/2004 Allendorf et al.
6,749,504 B2 6/2004 Hughs-Baird
6,758,747 B2 7/2004 Baerlocher
6,761,632 B2 7/2004 Bansemer et al.
6,769,983 B2 8/2004 Slomiany
6,780,103 B2 8/2004 Bansemer et al.
6,780,107 B2 8/2004 Baerlocher et al.
6,780,111 B2 8/2004 Cannon et al.
6,783,457 B2 8/2004 Hughs-Baird et al.
6,811,482 B2 11/2004 Letovsky
6,814,664 B2 11/2004 Baerlocher et al.
6,817,944 B2 11/2004 Kaminkow et al.
6,837,793 B2 1/2005 McClintic
6,843,721 B2 1/2005 Vancura
6,843,722 B2 1/2005 Webb
6,860,810 B2 3/2005 Cannon et al.
6,863,606 B1 3/2005 Berg et al.
6,875,108 B1 4/2005 Hughs-Baird
6,899,620 B2 5/2005 Kaminkown et al.
6,913,533 B2 7/2005 Cuddy et al.
6,918,830 B2 7/2005 Baerlocher
6,932,701 B2 8/2005 Glavich et al.
6,935,955 B1 * 8/2005 Kaminkow et al. ............. 463/35
6,942,568 B2 9/2005 Baerlocher
6,958,013 B2 10/2005 Miereau et al.
6,964,608 B1 11/2005 Koza
6,966,833 B2 11/2005 Kaminkow et al.
6,995,751 B2 2/2006 Falvo
6,996,833 B1 2/2006 Olson et al.
7,037,191 B2 5/2006 Rodgers et al.
7,040,984 B2 5/2006 Mead
7,056,210 B2 6/2006 Bansemer et al.
7,056,214 B2 6/2006 Miereau et al.
7,077,744 B2 7/2006 Cannon
7,104,888 B2 9/2006 Miereau et al.
7,112,137 B2 9/2006 Baerlocher et al.
7,121,942 B2 10/2006 Baerlocher
7,160,186 B2 1/2007 Cuddy et al.
7,160,188 B2 1/2007 Kaminkow et al.
7,169,041 B2 1/2007 Tessmer et al.
7,172,506 B2 2/2007 Baerlocher et al.
7,175,523 B2 2/2007 Gilmore et al.
7,175,524 B2 2/2007 Bansemer et al.
7,182,689 B2 2/2007 Hughs-Baird et al.
7,198,570 B2 4/2007 Rodgers et al.
7,235,011 B2 6/2007 Randall et al.
7,264,545 B2 9/2007 Maya et al.
7,300,348 B2 11/2007 Kaminkow et al.
7,302,650 B1 11/2007 Allyn et al.
7,303,469 B2 12/2007 Kaminkow et al.
7,311,598 B2 12/2007 Kaminkow et al.
7,311,604 B2 12/2007 Kaminkow et al.
7,314,409 B2 1/2008 Maya et al.
7,318,773 B2 1/2008 Baerlocher
7,326,115 B2 2/2008 Baerlocher
7,338,367 B2 3/2008 Kaminkow et al.
7,338,369 B2 3/2008 Mierau et al.
7,393,280 B2 7/2008 Cannon
7,682,244 B1 * 3/2010 Luciano et al. ................. 463/25
7,931,531 B2 4/2011 Oberberger
8,047,917 B2 11/2011 Kane et al.
2002/0049084 A1 4/2002 Hughs-Baird et al.
2002/0052232 A1 5/2002 Kaminkow
2003/0013514 A1 1/2003 Cregan et al.
2003/0027619 A1 * 2/2003 Nicastro, Sr. ................... 463/16
2003/0036422 A1 2/2003 Baerlocher et al.
2003/0036424 A1 2/2003 Baerlocher
2003/0040358 A1 2/2003 Rothkranz et al.
2003/0064773 A1 4/2003 Baerlocher et al.
2003/0119576 A1 * 6/2003 McClintic et al. .............. 463/20
2003/0153378 A1 8/2003 Schlegel et al.
2004/0048644 A1 3/2004 Gerrard et al.
2004/0048649 A1 3/2004 Peterson et al.
2004/0053665 A1 3/2004 Baerlocher
2004/0116173 A1 * 6/2004 Baerlocher ..................... 463/16
2004/0242315 A1 12/2004 Paulsen et al.
2004/0248639 A1 12/2004 Slomiany
2005/0020351 A1 1/2005 Baerlocher et al.
2005/0033461 A1 2/2005 Gerrard et al.
2005/0054404 A1 3/2005 Baerlocher
2005/0054405 A1 3/2005 Baerlocher et al.
2005/0054415 A1 3/2005 Kaminkow et al.
2005/0054416 A1 3/2005 Hostetler et al.
2005/0054435 A1 3/2005 Rodgers et al.
2005/0059446 A1 3/2005 Kaminkow
2005/0059456 A1 3/2005 Mead et al.
2005/0059461 A1 3/2005 Ching et al.
2005/0064928 A1 3/2005 Baerlocher et al.
2005/0096123 A1 5/2005 Cregan et al.
2005/0101372 A1 5/2005 Mierau et al.
2005/0121850 A1 * 6/2005 Pierce et al. .................. 273/139
2005/0181860 A1 8/2005 Nguyen et al.
2005/0192081 A1 9/2005 Marks et al.
2005/0197180 A1 9/2005 Kaminkow et al.
2005/0239538 A1 * 10/2005 Dixon ............................. 463/20
2005/0272496 A1 * 12/2005 Reinish et al. .................... 463/2
2006/0030401 A1 2/2006 Mead et al.
2006/0040735 A1 2/2006 Baerlocher
2006/0068882 A1 3/2006 Baerlocher et al.

(56) References Cited

U.S. PATENT DOCUMENTS

| | | | |
|---|---|---|---|
| 2006/0073874 A1 | 4/2006 | Cregan et al. | |
| 2006/0084500 A1 | 4/2006 | Baerlocher et al. | |
| 2006/0121971 A1 | 6/2006 | Slomiany et al. | |
| 2006/0183528 A1 | 8/2006 | Rodgers et al. | |
| 2006/0199628 A1 | 9/2006 | Rodgers et al. | |
| 2006/0205474 A1 | 9/2006 | Bansemer et al. | |
| 2006/0246977 A1 | 11/2006 | Cannon | |
| 2006/0281526 A1* | 12/2006 | Hornik et al. | 463/20 |
| 2007/0015566 A1 | 1/2007 | Baerlocher et al. | |
| 2007/0032285 A1 | 2/2007 | Wolf | |
| 2007/0054732 A1 | 3/2007 | Baerlocher | |
| 2007/0060271 A1 | 3/2007 | Cregan et al. | |
| 2007/0060300 A1 | 3/2007 | Baerlocher | |
| 2007/0060369 A1* | 3/2007 | Martin | 463/42 |
| 2007/0077990 A1 | 4/2007 | Cuddy et al. | |
| 2007/0087809 A1 | 4/2007 | Baerlocher | |
| 2007/0105620 A1 | 5/2007 | Cuddy et al. | |
| 2007/0111783 A1 | 5/2007 | Cuddy et al. | |
| 2007/0117606 A1 | 5/2007 | Baerlocher et al. | |
| 2007/0129131 A1 | 6/2007 | Kaminkow et al. | |
| 2007/0129133 A1 | 6/2007 | Bansemer et al. | |
| 2007/0149269 A1 | 6/2007 | Benbrahim | |
| 2007/0155485 A1 | 7/2007 | Cuddy et al. | |
| 2007/0298874 A1 | 12/2007 | Baerlocher et al. | |
| 2007/0298875 A1 | 12/2007 | Baerlocher et al. | |
| 2008/0076514 A1 | 3/2008 | Baerlocher et al. | |
| 2008/0076515 A1 | 3/2008 | Baerlocher et al. | |
| 2008/0076517 A1 | 3/2008 | Baerlocher et al. | |
| 2008/0215981 A1 | 9/2008 | York et al. | |
| 2008/0311980 A1 | 12/2008 | Cannon | |
| 2009/0024933 A1* | 1/2009 | Smedley et al. | 715/753 |
| 2009/0042644 A1 | 2/2009 | Zielinski | |
| 2009/0088253 A1 | 4/2009 | Oberberger et al. | |
| 2009/0104995 A1 | 4/2009 | Matsuyama et al. | |
| 2009/0137307 A1 | 5/2009 | Yoshizawa | |
| 2009/0291731 A1* | 11/2009 | Jaffe et al. | 463/16 |
| 2010/0016056 A1* | 1/2010 | Thomas et al. | 463/20 |
| 2010/0120521 A1 | 5/2010 | Caputo et al. | |
| 2010/0137047 A1* | 6/2010 | Englman et al. | 463/6 |
| 2011/0117982 A1 | 5/2011 | Nguyen | |

FOREIGN PATENT DOCUMENTS

| | | |
|---|---|---|
| EP | 1 298 607 | 4/2003 |
| EP | 1 531 434 | 5/2005 |
| GB | 2 262 642 | 6/1993 |
| GB | 2 113 881 | 8/2003 |
| WO | WO 01/74464 | 10/2001 |
| WO | WO 03/026759 | 4/2003 |
| WO | WO 03/049053 | 6/2003 |
| WO | WO 2005/002697 | 1/2005 |
| WO | WO 2005/015826 | 2/2005 |
| WO | WO 2006/004831 | 1/2006 |
| WO | WO 2007/021724 | 2/2007 |

OTHER PUBLICATIONS

Wikipedia, Arkanoid, Feb. 2007, http://en.wikipedia.org/wiki/Arkanoid.*

Monkeysushi, Gaming : Dungeons and Dragons : Math, May 2008, http://www.monkeysushi.net/gaming/DnD/math.html#feats.*

Alien Adventure, written by AC Coin & Slot, published in 2003 (1 page).

Battleship (game), written by http://en.wikipedia.org/wiki/attle-ship_(game), printed Jan. 29, 2008 (3 pages).

Battleship Game Rules, written by Hasbro, available in 2002 (2 pages).

Big Dawg, written by Summit, published in May 2005 (1 page).

Clue: The Great Museum Caper written by http://en.wikipedia.org/wiki/Clue:_The_Great_Museum_Caper, website printed on Jan. 29, 2008 (1 page).

Deviled Eggs Article in Strictly Slots, written by Aristocrat, published in May 2005 (1 page).

Dig Dug description, printed from http://en.wikipedia.org/wiki/Dig_Dug on Jan. 29, 2008 (5 pages).

Doom (video game) description, printed from http://en.wikipedia.org/wiki/Doom_%28video_game%29 on Jul. 22, 2008 (11 pages).

First Person Shooter game description, from wikipedia, printed from http://en.wikipedia.org/wiki/First-person_shooter on Jul. 22, 2008 (11 pages).

Half Life (video game) description, printed from http://en.wikipedia.org/wiki/Half-Life_%28video_game%29 on Jul. 22, 2008 (12 pages).

Hollywood Squares—Premier Night, written by WMS, published in Jun. 2005 (1 page).

Hollywood Squares—Tour of Stars, written by WMS, published in Oct. 2003 (1 page).

Its My Party, written by IGT, published in 2004 (4 pages).

Jackpot Jewels, written by IGT, published in 2004 (7 pages).

Lightspeed—Real Time Card Game Rules, published by Cheapass Games, available prior to May 2008 (4 pages).

Men in Black, written by WMS, published in Apr. 2004 (1 page).

Minesweeper (computer game) http://en.wikipedia.org/wiki/Mine-sweeper_(compter_game) website printed on Jan. 29, 2008 (8 pages).

Triple Double dollars Video Slots, written by IGT, published 2004 (4 pages).

Xandu, written by Atronic Casino Tech., Ltd., published in 2003 (2 pages).

* cited by examiner

410

| | | Player 1 | Player 2 | Player 3 |
|---|---|---|---|---|
| 430 | Wager placed | 100 | 100 | 100 |
| 440 | Bullets | 500 | 500 | 500 |
| 450 | Attacking Monster | — | — | — |
| 460 | Monsters Killed | — | — | — |
| 470 | Credits Won | 0 | 0 | 0 |

420

Players 1, 2, and 3, you each placed the wager and therefore have 500 bullets each to shoot these monsters! Touch a monster to aim your avatar at that monster. Don't forget, You can team up to get the big ones! Good Luck.

410

| | | Player 1 | Player 2 | Player 3 |
|---|---|---|---|---|
| 430 | Wager placed | 100 | 100 | 100 |
| 440 | Bullets | 500 | 500 | 500 |
| 450 | Attacking Monster | #2 | #1 | #1 |
| 460 | Monsters Killed | — | — | — |
| 470 | Credits Won | 0 | 0 | 0 |

420

Players 1, good luck...that is a big monster to attack on your own! Players 2 and 3, let's see if your team can kill the biggest monster out there! Begin Firing!

410

| | Player 1 | Player 2 | Player 3 |
|---|---|---|---|
| 430 Wager placed | 100 | 100 | 100 |
| 440 Bullets | 200 | 300 | 300 |
| 450 Attacking Monster | #2 | #1 | #1 |
| 460 Monsters Killed | — | #1 | #1 |
| 470 Credits Won | 0 | 400 | 400 |

420

Players 2 and 3, great team work! Your team killed the biggest monster for an award of 800 credits! You each get 400 for your contribution! Move your avatars to another monster!
Player 1, keep shooting or move to another monster if you don't think you can kill him!

FIG. 4D

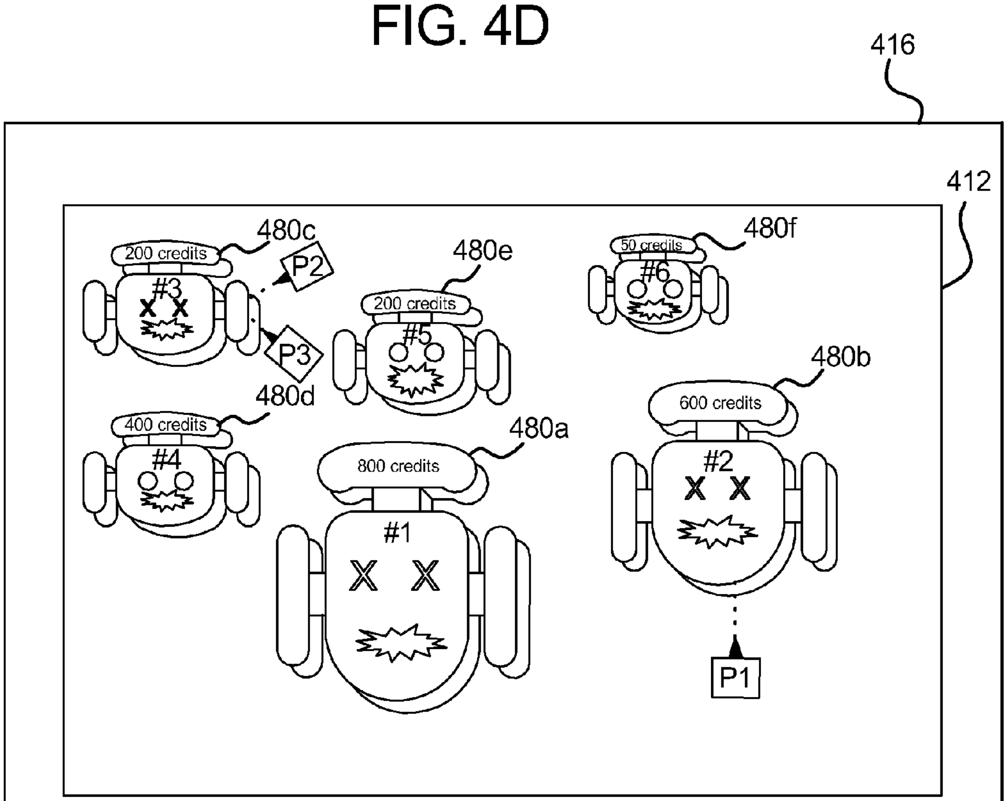

| | Player 1 | Player 2 | Player 3 |
|---|---|---|---|
| Wager placed | 100 | 100 | 100 |
| Bullets | 175 | 200 | 200 |
| Attacking Monster | #2 | #3 | #3 |
| Monsters Killed | #2 | #1,#3 | #1,#3 |
| Credits Won | 600 | 500 | 500 |

Players 1, great job. You managed to kill the #2 monster on your own. You win the entire award of 600 credits.You still have some bullets, so touch another monster to aim your avatar at that monster. Players 2 and 3, you each win 100 credits for killing the #3 monster. All players select new monsters to shoot!

416

412

410

| | Player 1 | Player 2 | Player 3 |
|---|---|---|---|
| 430 Wager placed | 100 | 100 | 100 |
| 440 Bullets | 50 | 75 | 75 |
| 450 Attacking Monster | #5 | #4 | #4 |
| 460 Monsters Killed | #2 | #1,#3,#4 | #1,#3,#4 |
| 470 Credits Won | 600 | 700 | 700 |

420

Players 2 and 3, your strategy is working great! You just killed monster #4. You each win another 200 credits! You still have bullets left. Go get that last little monster #6 or go help player 1 polish off monster #5!

416

410

| | Player 1 | Player 2 | Player 3 |
|---|---|---|---|
| 430 Wager placed | 100 | 100 | 100 |
| 440 Bullets | 0 | 25 | 25 |
| 450 Attacking Monster | #5 | #5 | #5 |
| 460 Monsters Killed | #2,#5 | #1,#3,#4,#5 | #1,#3,#4,#5 |
| 470 Credits Won | 700 | 750 | 750 |

420

Players 1,2, and 3, together you were able to defeat monster #5. Player 1, your contribution to monster #5's demise wins you 100 of the 200 total credits. Players 2 and 3, you each win 50 points for your contribution. Players 2 and 3, you both have bullets remaining to attack monster #6.

416

410

| | Player 1 | Player 2 | Player 3 |
|---|---|---|---|
| 430 Wager placed | 100 | 100 | 100 |
| 440 Bullets | 0 | 0 | 0 |
| 450 Attacking Monster | — | — | — |
| 460 Monsters Killed | #2,#5 | #1,#3,#4,#5,#6 | #1,#3,#4,#5,#6 |
| 470 Credits Won | 700 | 775 | 775 |

420

Congratulations! Players 2 and 3, you were able to kill another monster with your remaining bullets! You each win 25 more credits! Here are the final scores:

Player 1 = 700
Player 2 = 775
Player 3 = 775

GAMING SYSTEM, GAMING DEVICE AND METHOD FOR PROVIDING A STRATEGY GAME HAVING A PLURALITY OF AWARDS

PRIORITY CLAIM

This application is a continuation of, and claims priority to and the benefit of, U.S. patent application Ser. No. 12/203,743, filed on Sep. 3, 2008, the entire contents of which are incorporated herein by reference.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and based on the amount of the wager (e.g., the higher the wager, the higher the award). Symbols or symbol combinations which are less likely to occur usually provide higher awards.

Secondary or bonus games are also known in gaming machines. The secondary or bonus games usually provide an additional award to the player. Secondary or bonus games usually do not require an additional wager by the player to be activated. Secondary or bonus games are generally activated or triggered upon an occurrence of a designated triggering symbol or triggering symbol combination in the primary or base game. For instance, a bonus symbol occurring on the payline on the third reel of a three reel slot machine may trigger the secondary bonus game. When a secondary or bonus game is triggered, the gaming machines generally indicates this to the player through one or more visual and/or audio output devices, such as the reels, lights, speakers, video screens, etc. Part of the enjoyment and excitement of playing certain gaming machines is the occurrence of the secondary or bonus game (even before the player knows how much the bonus award will be). In other words, obtaining a bonus award is part of the enjoyment and excitement for players.

To increase player enjoyment and excitement with gaming devices, it is desirable to provide new and different games which promote interactivity among players and enable players to make strategic decisions which affect their ability to win awards or prizes.

SUMMARY

Various embodiments of the present disclosure provide a gaming device, a gaming system, and a method for operating a gaming device or gaming system which includes a game or game event having an element of strategic skill. More specifically, the present disclosure provides a game or game event which enables a player to make strategic choices or decisions that have a direct impact on the player's chance of obtaining one or more outcomes or awards in a play of a game.

In one embodiment, the gaming system provides a game including a plurality of awards. The awards can be displayed in any suitable manner, such as displayed as treasures. In one such embodiment, each of the awards is associated with a plurality of award characteristics, including an award value and a level of difficulty. The level of difficulty pertains to the amount of effort required to collect that award. In certain embodiments, the award value associated with each of the awards is proportional to the level of difficulty associated with that award. For example, awards that require more effort to collect are associated with larger award values than awards that are relatively easier to collect (i.e., require less effort). Based at least in part on the award characteristics associated with the awards, a player can strategically chooses which award or awards to play for (i.e., which award or awards to attempt to collect) in the game.

The present disclosure contemplates multiple ways in which the gaming system can provide the game. The game in alternative embodiments is provided as a primary or base game or as a secondary or bonus game. The game in alternative embodiments is provided in a single-player format or in a multiplayer format. The game in further alternative embodiments is provided as a type of extended or persistence game which extends over multiple plays or activations of a primary game or a secondary game. The game can be provided as a single play game where the awards are reset for each play or as one of an extended or persistence type game where the awards remain for multiple plays, activations or entries into the game.

In one single player embodiment, the game is implemented as a primary game operable upon a wager. In one embodiment, the primary game is a shooting game which includes a plurality of targets which can be shot at and destroyed. In one such embodiment, upon placement of a wager, the gaming device provides a player with a predetermined number of projectiles for shooting at one or more of the targets (such as rockets, arrows, laser blasts, etc.) or one or more weapons for shooting a number of projectiles. In another embodiment, the player may have a limited amount of energy which can be used for shooting. In a further embodiment, a player is provided with a finite amount of time for shooting. That is, the player may have a limited amount of time during which the player can shoot at one or more targets in an attempt to collect any awards associated with the targets. In one such embodiment, a player may have a finite amount of time during which the player can shoot an unlimited number of bullets.

Each of the targets is associated with an award and a level of difficulty. The level of difficulty represents the amount of damage (i.e., hits with the projectiles) required to destroy that target. In certain embodiments, the award associated with each of the targets is proportional to the level of difficulty associated with that target. For example, targets that are more difficult to destroy are associated with larger awards than targets that are relatively easier to destroy. In certain embodiments, the gaming system displays or conveys information relating to one or more of the award and level of difficulty associated with one of, a plurality of, or each of the targets.

To determine which target or targets to go for, a player may consider one or more of a variety of factors, including the award associated with the target, the amount of time that the player has to kill the target, the number and/or type of projectiles and the number and/or type of weapons in the player's arsenal, and the likelihood that the player will shoot and kill the target, etc.

After a player has selected a target to play for, the player utilizes the provided projectiles to shoot at the target. It should be appreciated that, in these embodiments, there is no physical skill involved. That is, a player can only shoot at a target if a projectile will hit. However, the player strategically selects which targets to shoot and, therefore, which award or awards to play for, based on any information about the targets and the resources available to the player. Thus, selecting which of the targets to shoot introduces an element of strategic skill to the game. In one alternative embodiment, a player's projectile may miss the target. In this embodiment, there is no penalty to the player for shooting and missing. In such an embodiment, rather than having a set number of bullets or projectiles, the player has a certain number of target hits. That is, a miss does not drain or deplete the player's available resources, such as ammunition.

In one embodiment, if the player destroys the target that the player is attacking, the player wins the award associated with the target. In another embodiment, the player receives an award randomly selected from a given distribution of award values. In one embodiment, if the player destroys the target, the player wins the award associated with the target, as well as an additional or supplemental award amount. In one embodiment, if the player hits the target but does not destroy the target, the player obtains a portion of the award based on the amount of damage caused to the target. In one embodiment, as a player attacks a target, the player wins awards for any damage caused to the target. The player wins an additional award when the target is ultimately killed or destroyed. In one embodiment, the gaming system associates new awards with the targets as each target is destroyed. In this embodiment, the available awards change periodically, resulting in the player having to make strategic decisions regarding which targets to attack.

In various embodiments, an award may be any suitable item of value, such as a monetary award, points that the game adds to a total score, a bonus game, or credits. In one embodiment, an award may be associated with a number of power-up points, which can be used by a player to obtain certain advantages or enhanced capabilities for the game, such as an increased quantity of projectiles or more powerful projectiles or weapons.

In one embodiment, the player can obtain different types of projectiles. In one such embodiment, different types of projectiles may cause different amounts of damage to the targets. For example, silver bullets may be the weakest type of projectile (i.e., cause the least amount of damage per bullet) but cost less to obtain, while gold bullets may cause more damage but cost more. In one embodiment, certain projectiles, such as a bomb, may cause a random amount of damage. In one embodiment, a player pays or wagers different amounts to obtain different types of projectiles. In one embodiment, the game enables the player to select one of a plurality of different wager packages, where each wager package is associated with different types of bullets and different quantities of each type of bullet for a specified wager amount. In another embodiment, hitting a target with a specific type of projectile costs the player a certain number of credits, based on the type of projectile. In one embodiment, different players may be eligible to obtain different types of projectiles based on player tracking.

In one embodiment, the game includes a variety of different types of targets. In one embodiment, different targets are only susceptible to different types of projectiles. That is, certain targets may only be damaged if they are hit by certain types of projectiles. In one such embodiment, a player can win an award for destroying all of the targets of a particular type.

In various embodiments, the player can continue going after targets until the player runs out of projectiles, runs out of time, or runs out of energy. Thus, the player can choose to play the game using different strategies or approaches. For example, certain players may prefer an approach which involves attacking as many easy targets as possible in the provided amount of time or with the provided amount of projectiles in an attempt to accumulate as many awards as possible, even though they may be smaller awards. Other players may prefer to spend more of their resources trying to destroy a more difficult target to try win a large award or prize. Players can alternate using different approaches and can employ a number of other strategies to add variety and excitement to the game. Enabling a player to make strategic decisions about which target or targets to play for in the game directly impacts the player's ability to collect awards.

In one embodiment, the shooting game of the present disclosure includes a wagering game initiated by the player. In one such embodiment, the player funds the gaming machine and utilizes a portion of the deposited funds to place a wager to play the game. For example, the player may fund the gaming machine with an amount of credits, such as $10. The player utilizes a portion of the initial funds to place a $5 wager and receives 50 bullets for the wager placed. During play of the shooting game, each bullet shot at a target causes a randomly determined amount of damage to the target. Thus, each time the player shoots a bullet, the player is wagering ten cents that the bullet will cause enough damage to destroy the target. Multiple bullets may be shot during play of the game in attempt to destroy the targets. After a target is destroyed, the player is provided with any award associated with that target. In one such embodiment, when the player destroys a target and wins the associated award, the award is added to any remaining funds from the initial funds. As long as there are credits left in the fund, the player can continue placing wagers to obtain more bullets to shoot at the targets.

It should be appreciated that, although these embodiments are described as a shooting game, the same game principle could be implemented by the gaming device using other themes, such as diving for treasures in the ocean (i.e., players attempt to collect treasures, where treasures at deeper depths of the ocean may be harder to reach and associated with a larger award) or tomb raiding (i.e., treasures located deeper into the tomb are harder to reach and associated with a larger award).

It should also be appreciated that, the game of this embodiment may be provided in this form as a primary or base game, which is operable upon placement of a wager, or as a secondary or bonus game, which is triggered in any suitable manner.

In one embodiment, the game of the present disclosure is implemented as a multiplayer game. In one such embodiment, the multiplayer game is a multiplayer primary game, wherein each of a plurality of players are provided with a number of projectiles for shooting one or more targets upon placement of a wager. In another embodiment, the game of this embodiment is a multiplayer secondary or bonus game which can be triggered in any suitable manner.

In such multiplayer embodiments, the game includes a plurality of targets, each of the targets associated with an award and a difficulty level. In one embodiment, the gaming system enables players to work together in teams in attempt to destroy certain targets. For example, one or more of the targets which have a high level of difficulty may require two or more players to destroy. This leads to even more strategic decision-making for the players. During game play, each player must make choices such as: (i) whether the player has enough resources (i.e., projectiles, energy, or time) to destroy a target associated with a certain award value or difficulty level on his own; (ii) whether to go for a target that is associated with a large award but is more difficult to destroy or a target that is easier to destroy and associated with a smaller award; and (iii) whether or not to attack a given target with another player or a team of players. Working together in teams helps players to destroy targets that they would not be able to destroy on their own or to destroy a larger number of targets in a given amount of time. On the other hand, a player may elect not to join a team to attack a particular target if the player believes that his or her share of the potential award will be too small.

In one embodiment, when a team of players successfully destroys a target, one, a plurality, or each of the players on that team wins the award associated with the target. In one embodiment, the players on the team share the award associated with that target. In various alternative embodiments, the players share the award: (i) evenly amongst the players of the team; (ii) based on the relative number of projectiles spent by each player to destroy the target (i.e., the relative contribution of each player); (iii) based on the relative damage caused by each player to the target; (iv) based on time (e.g., players who shot earlier projectiles and/or caused earlier damage to the target are provided with a larger portion of the award than players who contributed later); (v) based on prior winnings in the game; (vi) based on the amount wagered by each player; (vii) based on player tracking; (viii) based on any other suitable criteria; and (ix) any combination of these. In another embodiment, the player who shoots the projectile which ultimately kills or destroys the target (i.e., the player who shoots the last projectile or bullet which destroys the target) wins an award. In one such embodiment, the other players of the team may be provided with supplemental or consolation awards.

In various embodiments, each player participating in the game may work together with another player or join a team which includes or is capable of including a plurality of players in any suitable manner. In certain embodiments, players can change the target they are shooting at or change teams at any suitable or designated time.

In one embodiment, each player can see how many players are shooting at any given target at the same time. A player can decide to attack a target or abandon a target that the player is currently shooting at based on the number of other people who are currently attacking that target or based on new target opportunities. If too many players are trying to destroy a particular target, the award associated with that target may be divided over a larger number of players once the target is destroyed. Thus, a player may not want to shoot at a certain target, if the award will be divided among a large number of players. Accordingly, each player must not only determine which target to go for based on the target's associated award and level of difficulty, but the player must also consider the number of other players playing for the same award at the same time.

In some embodiments, a given player will share in the award of a destroyed target if one or more of that player's projectiles hit the target. In other embodiments, a given player must be actively engaged with the target when it is conquered in order to share in the completion award. For example, a player must have the target targeted, must have the target in shooting range, or must hit the target with a projectile within a certain period of time before the target is destroyed.

In this manner, the present disclosure provides a game in which players can incorporate strategy and choice in determining which awards they want to play for. A player can team up with other players in an attempt to obtain the greatest chance of destroying a target and thus winning an award. A player can team up with other players to coordinate actions for mutual benefit. A player can choose to avoid attacking certain targets based upon an expectation of low return when there is too much competition for the same award. A player can select targets based on that player's available projectiles, time remaining, or any other suitable resource. This enables players to have an active role while gaming and to make decisions which directly affect their ability to win awards in the game.

In one embodiment, the game is an ongoing, extended or persistence-type game. In such embodiments, one or more players (depending on whether the game is a single player or multiplayer game) may enter or play the game: (i) at designated time intervals; (ii) as a bonus award associated with a play of another game; (iii) by placing a wager of a designated number of credits; (iv) any combination of these; and (v) any other suitable manner. In various such embodiments, when a player enters the game, the player may play the game: (i) for a designated period (i.e., amount of time); (ii) until the player runs out of a designated number of projectiles provided to the player; (iii) until no targets are left in the game; (iv) until collecting one or more awards which cause the termination of that player's participation in the game; and (v) according to any other suitable criteria.

In certain embodiments, the ongoing, extended or persistence-type game is continuous and goes on whether there are players playing the game or not. In such embodiments, eligible players (i.e., players who have qualified to play the game), can enter and exit the game as they please. In such embodiments, the game continues regardless of whether or not there are any players currently playing the game. In certain embodiments, one or more computer-controlled agents or avatars which operate like player-controlled agents are present in the ongoing or extended game when few or no player-controlled agents are actively participating in the game.

In one such embodiment, the ongoing, extended or persistence-type game includes a virtual game world or game environment, wherein one or more qualified players (dependent on whether the game is a single player or multiplayer game) can enter in and out of the virtual game world, as desired. Once a player qualifies to participate in the ongoing game, that player can enter the virtual game world, which is always on and ever-changing based on the activities of other players who are already there.

In one embodiment, upon or after suitably qualifying to enter the virtual game world, a player avatar representing the player appears in the virtual game world. The player can see his or her avatar in the virtual game world, as well as each of the available targets. In one such embodiment, once a player selects a target to go for, the player's avatar continues to shoot at the target until target is destroyed or until the player runs out of time, bullets, energy, etc. In certain multiplayer implementations of this embodiment, in the virtual game world, players can see the available targets and the avatars for any other players who are also playing the game at any given time.

In some embodiments, players can see and control target sights and can see where other players are aiming. In one embodiment, the player avatars take up actual space in the virtual game world, such that each player can see the other players' avatars, and that player's avatar can block other players from obtaining line-of-sight to targets. This introduces an element of competition into the game (or enables a given player to reduce the amount of cooperation the player wishes to engage in).

In such embodiments, the game is continuously occurring whether or not there are players in the virtual game world or not.

It should be appreciated that the ongoing game of this embodiment can be implemented as a primary or base game and as a secondary or bonus game.

In an alternative embodiment, the present disclosure provides a multiplayer game which includes a matrix divided into a plurality of sectors. Each of the sectors includes a plurality of spaces. A plurality of the spaces are each associated with one of a plurality of awards or treasures. Upon placement of a wager or other suitable triggering event, each of a plurality of players is provided with a designated number of collectors which can be placed on the matrix in attempt to collect one or more of the awards.

In certain embodiments, one or more of the awards or treasures are displayed on the matrix such that each player can see information relating to one or more of the location and the value of the award. The players place their collectors on the matrix based at least in part on the displayed information regarding the awards. After all of the players have placed their collectors on the matrix, a determination is made as to whether each player will get to collect any awards.

In one such embodiment, the game occurs in phases. In a first phase, the players take turns placing their collectors on the matrix, one at a time. When choosing which spaces to put collectors on, the players consider a variety of factors, such as the location of the awards on the matrix and where other players have placed their collectors. For example, players want to place collectors in the best spots to collect the most awards. The more players collecting on the same award reduces the value of that award per player. Therefore, players may want to place their collectors in locations where they can win a smaller award which is not being pursued by other players. Players also want to place their collectors on the matrix in the best locations to block and/or destroy other players' collectors. In some embodiments, certain collectors can damage or destroy other players' collectors. In some embodiments, a player may obtain additional score credits, awards, or points for damaging or destroying other players' collectors. In addition to earning additional awards for the player, destroying other players' collectors is also be beneficial because it causes fewer collectors to be collecting the awards in the game. That is, by destroying another player's collector, a player may be able to block other players from collecting on certain awards. In some embodiments, certain collectors have the ability to take credits, awards or points from another collector. In some embodiments, certain collectors can block other collectors from collecting from one or more than one target.

After all collectors have been placed on the matrix, a second phase of the game begins, during which the collection determination occurs. In this phase, the gaming system randomly determines which of the players' collectors will collect an award, which of the collectors will destroy any other collectors, and which of the collectors will be destroyed by another player's collector. In one embodiment, the sectors of the matrix are randomly resolved so that players do not necessarily know whose collectors will act first. As each sector is resolved, all the collectors in that sector collect awards that they can reach, and they destroy all collectors that they can reach. In various alternative embodiments, a collector's reach is defined as being within a certain proximity or on one or more straight line paths from the collector. After all the sectors have been resolved, the game ends and each player wins the total of all the awards collected by that player's collectors and any credits or points for destroying other players' collectors.

In this embodiment, the players use strategy to place collectors on the matrix based on where awards are located on the matrix and where other players have placed their collectors. This provides a multiplayer gaming experience with meaningful choices and variety and excitement in outcomes.

Accordingly, one advantage of the present disclosure is to provide a game which enables players to make decisions which directly affect their ability to win awards.

Another advantage of the present disclosure is to provide a game wherein a player can choose to play for one or more awards having varying award values.

Another advantage of the present disclosure is to provide a game which can be implemented as both a single player and a multiplayer game.

Another advantage of the present disclosure is to provide a multiplayer game with awards which are split among team members based on each team member's relative contribution to achieving a designated goal or completing a designated task.

Another advantage of the present disclosure is to provide an ongoing game or gaming world or environment which players can enter and exit as they please.

Additional features and advantages are described herein and will be apparent from the following Detailed Description and the figures.

BRIEF DESCRIPTION OF THE FIGURES

FIGS. 4A, 4B, 4C, 4D, 4E, 4F, and 4G illustrate screen shots for a play of a game by multiple players according to one multiplayer embodiment of the present disclosure.

DETAILED DESCRIPTION

The present disclosure may be implemented in various configurations for gaming machines, gaming devices, or gaming systems, including but not limited to: (1) a dedicated gaming machine, gaming device, or gaming systems wherein the computerized instructions for controlling any games (which are provided by the gaming machine or gaming device) are provided with the gaming machine or gaming device prior to delivery to a gaming establishment; and (2) a changeable gaming machine, gaming device, or gaming system wherein the computerized instructions for controlling any games (which are provided by the gaming machine or gaming device) are downloadable to the gaming machine or gaming device through a data network after the gaming machine or gaming device is in a gaming establishment. In one embodiment, the computerized instructions for controlling any games are executed by at least one central server, central controller, or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller, or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
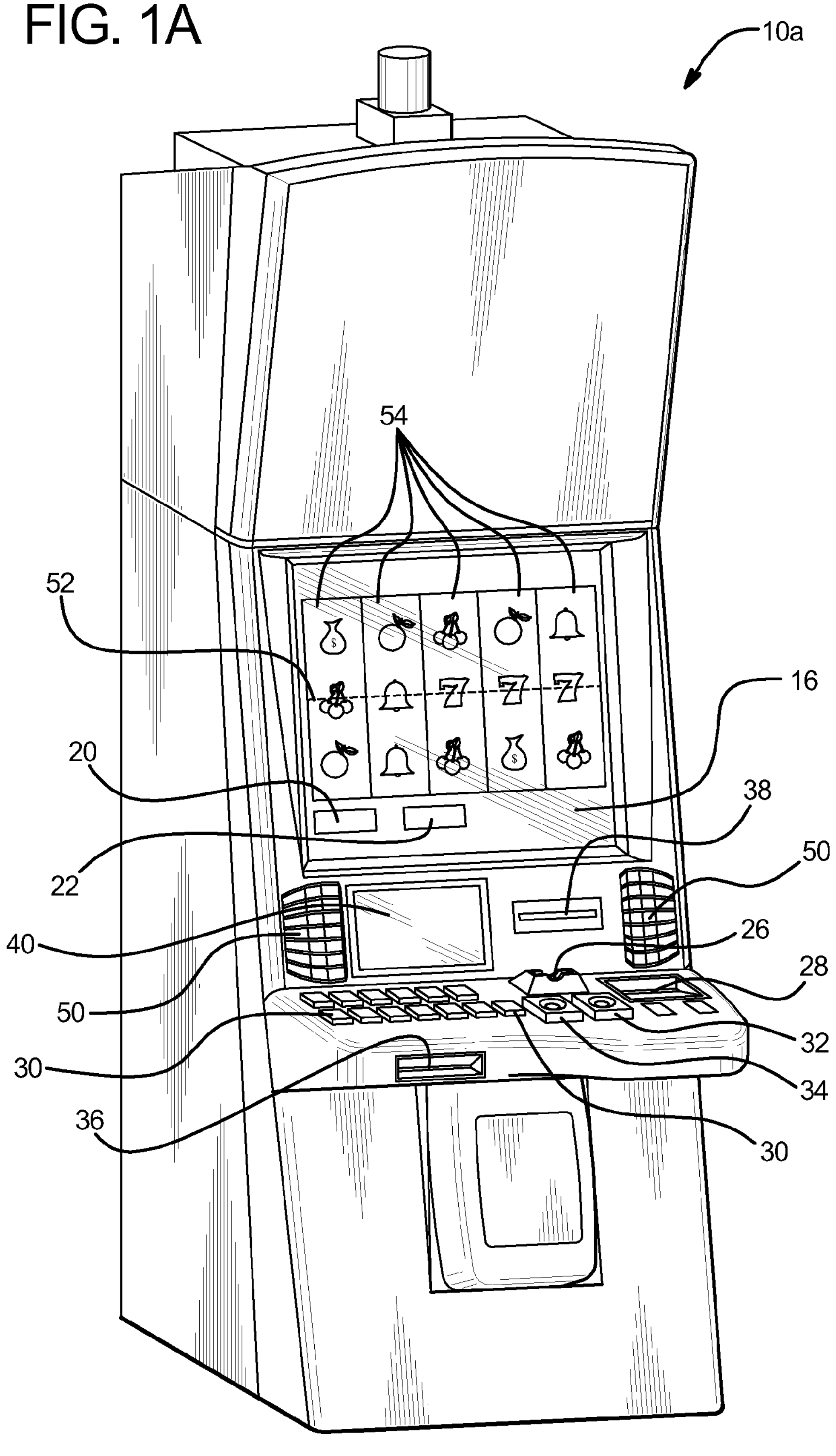
FIGS. 1A and 1B are perspective views of example alternative embodiments of the gaming device of the present disclosure.
Figure 1B:
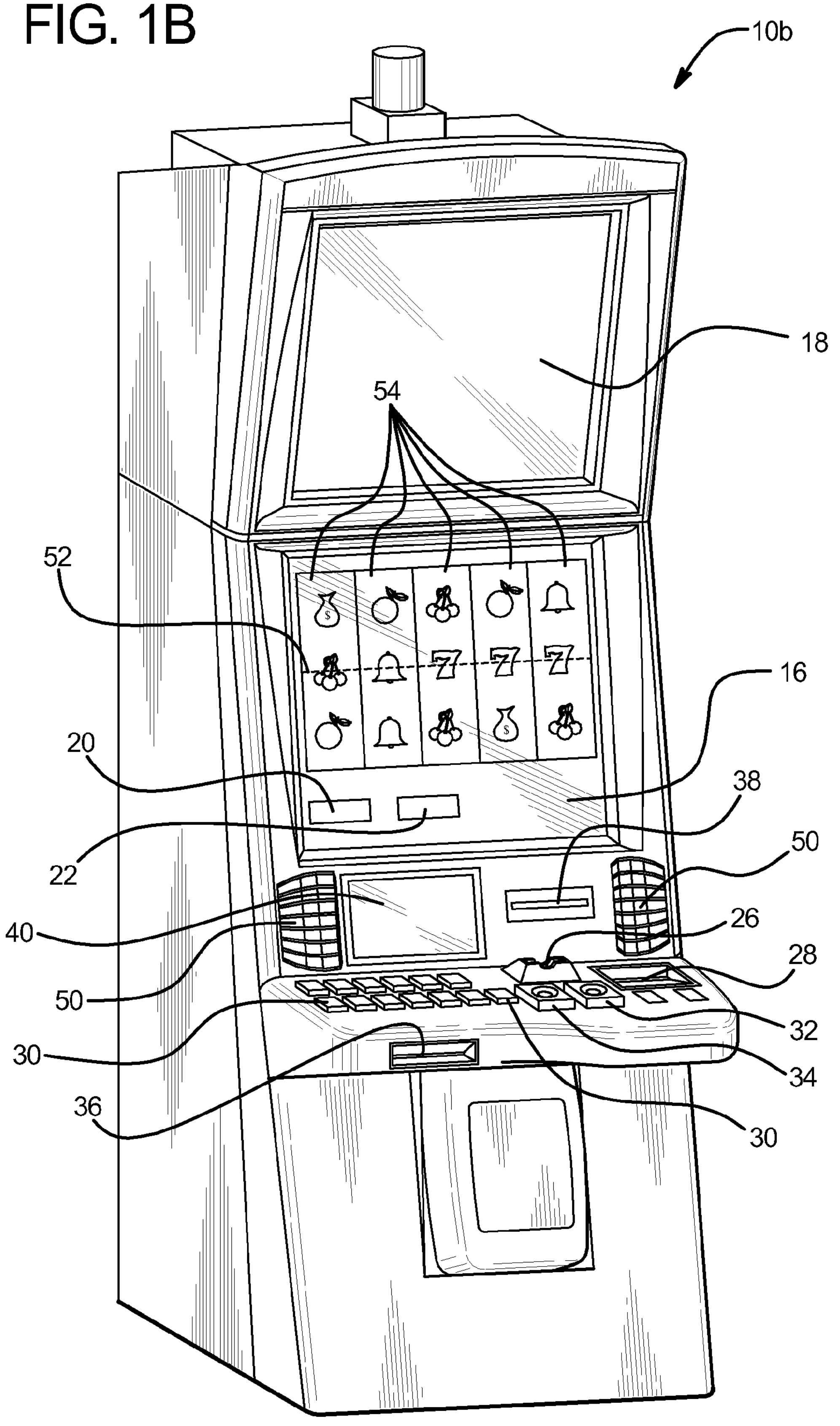

Referring now to the drawings, two example alternative embodiments of a gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing, or cabinet which provides support for a plurality of displays, inputs, controls, and other features of a conventional gaming machine. It is configured so that a player can operate it while standing or sitting. The gaming device can be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
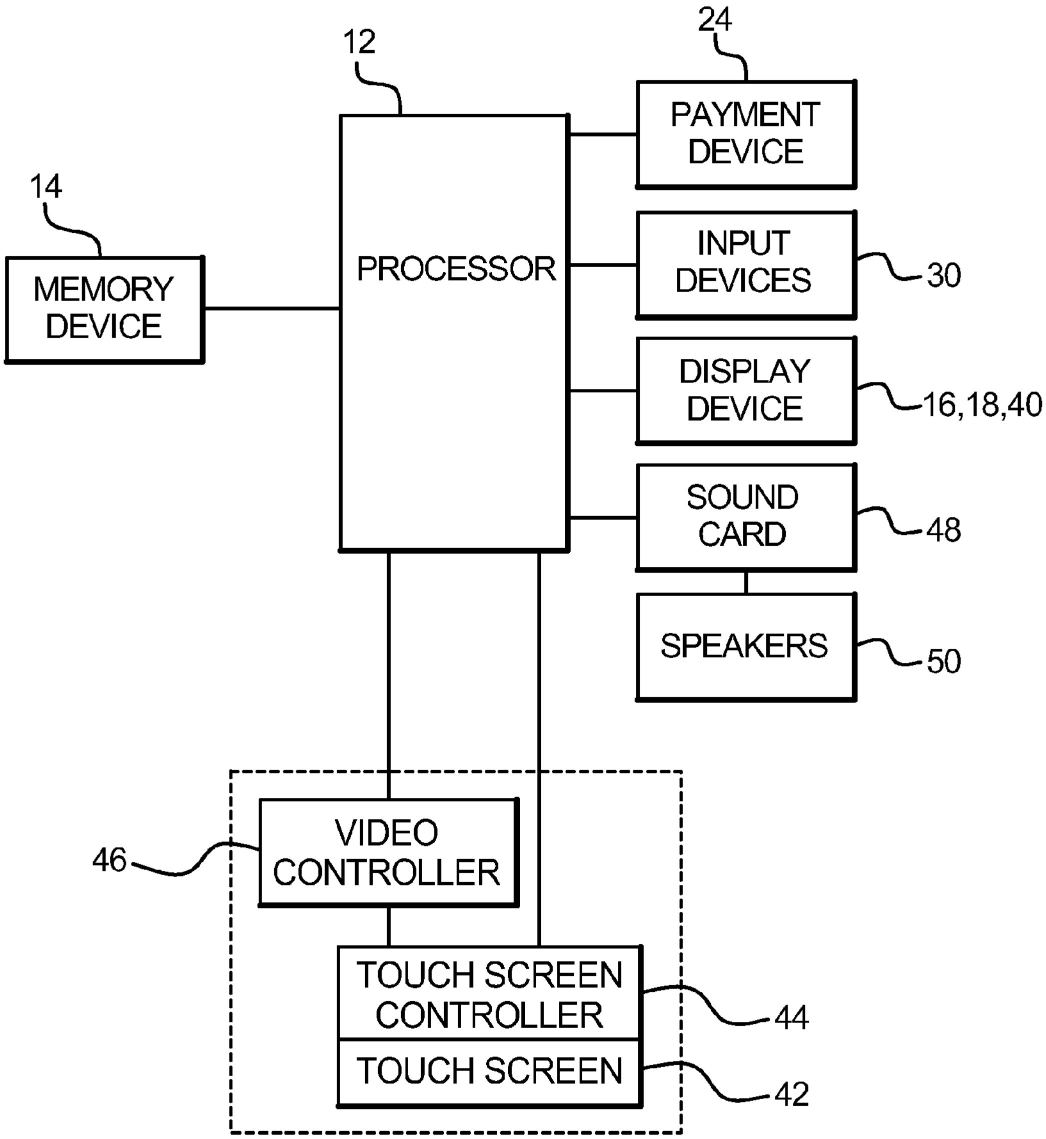
FIG. 2A is a schematic block diagram of one embodiment of an electronic configuration for one of the gaming devices disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information, and applicable game rules that relate to the play of the gaming device. In one embodiment, the memory device includes random access memory (RAM), which can include non-volatile RAM (NVRAM), magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD, or USB memory device. In other embodiments, part or all of the program code and/or operating data described above can be downloaded to the memory device through a suitable network.

In one embodiment, an operator or a player can use such a removable memory device in a desktop computer, a laptop computer, a personal digital assistant (PDA), a portable computing device, or another computerized platform to implement the present disclosure. In one embodiment, the gaming device or gaming machine disclosed herein is operable over a wireless network, for example part of a wireless gaming system. In this embodiment, the gaming machine may be a hand-held device, a mobile device, or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator, or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In one embodiment, as illustrated in FIG. 2A, the gaming device includes one or more display devices controlled by the processor. The display devices are preferably connected to or mounted on the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance, or the equivalent. In one embodiment, the gaming device includes a bet display 22 which displays a player's amount wagered. In one embodiment, as described in more detail below, the gaming device includes a player tracking display 40 which displays information regarding a player's play tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual, or video reels and wheels, dynamic lighting, video images, images of people, characters, places, things, faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels, or dice, configured to display at least one or a plurality of game or other suitable images, symbols or indicia.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket, or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals (or related data), and other relevant information. In another embodiment, a player may carry a portable device, such as a cell phone, a radio frequency identification tag, or any other suitable wireless device, which communicates a player's identification, credit totals (or related data), and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B, and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button, or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment, or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card, may be implemented in accordance with the gaming device disclosed herein.

In one embodiment, as mentioned above and as seen in FIG. 2A, one input device is a touch-screen 42 coupled with a touch-screen controller 44 or some other touch-sensitive display overlay to allow for player interaction with the images on the display. The touch-screen and the touch-screen controller are connected to a video controller 46. A player can make decisions and input signals into the gaming device by touching the touch-screen at the appropriate locations. One such input device is a conventional touch-screen button panel.

The gaming device may further include a plurality of communication ports for enabling communication of the processor with external peripherals, such as external video sources, expansion buses, game or other displays, a SCSI port, or a keypad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as by playing music for the primary and/or secondary game or by playing music for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized to provide any appropriate information.

In one embodiment, the gaming machine may include a sensor, such as a camera in communication with the processor (and possibly controlled by the processor), that is selectively positioned to acquire an image of a player actively using the gaming device and/or the surrounding area of the gaming device. In one embodiment, the camera may be configured to selectively acquire still or moving (e.g., video) images and may be configured to acquire the images in an analog, digital, or other suitable format. The display devices may be configured to display the image acquired by the camera as well as to display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering game as a primary or base game, with various embodiments of the selection game serving as a secondary or bonus game. The gaming machine or device may include some or all of the features of conventional gaming machines or devices. The primary or base game may comprise any suitable reel-type game, card game, cascading or falling symbol game, number game, or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 1B, a base or primary game may be a slot game with one or more paylines 52, with the disclosed selection game serving as a bonus game. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, displays the plurality of simulated video reels 54. Each reel 54 displays a plurality of indicia or symbols, such as bells, hearts, fruits, numbers, letters, bars, or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device that enables wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more than one or all of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of two cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to a quantity of awards being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two cards, with the disclosed selection game serving as a secondary or bonus game. Cards may be dealt as in a traditional game of cards or in the case of the gaming device, the cards may be randomly selected from a predetermined number of cards. If the player wishes to draw, the player selects the cards to hold via one or more input devices, such as by pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the number of credits the player wagered.

In another embodiment, a base or primary game may be a multi-hand version of video poker, with the disclosed selection game serving as a secondary or bonus game. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand against a payout table and awards are provided to the player.

In one embodiment, a base or primary game may be a keno game wherein the gaming device displays a plurality of selectable indicia or numbers on at least one of the display devices, with the disclosed selection game serving as a secondary or bonus game. In this embodiment, the player selects at least one but potentially a plurality of the selectable indicia or numbers via an input device such as a touch screen. The gaming device then displays a series of drawn numbers and determine an amount of matches, if any, between the player's selected numbers and the gaming device's drawn numbers.

The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or in a bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game, and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition occurs based on exceeding a certain amount of game play (such as number of games, number of credits, amount of time), or reaching a specified number of points earned during game play.

In another embodiment, the gaming device processor 12 or central server 56 randomly provides the player one or more plays of one or more secondary games. In one such embodiment, the gaming device does not provide any apparent reason to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy-in for a bonus game is needed. That is, a player may not purchase entry into a bonus game; rather they must win or earn entry through play of the primary game, thus encouraging play of the primary game. In another embodiment, qualification of the bonus or secondary game is accomplished through a simple "buy-in" by the player—for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
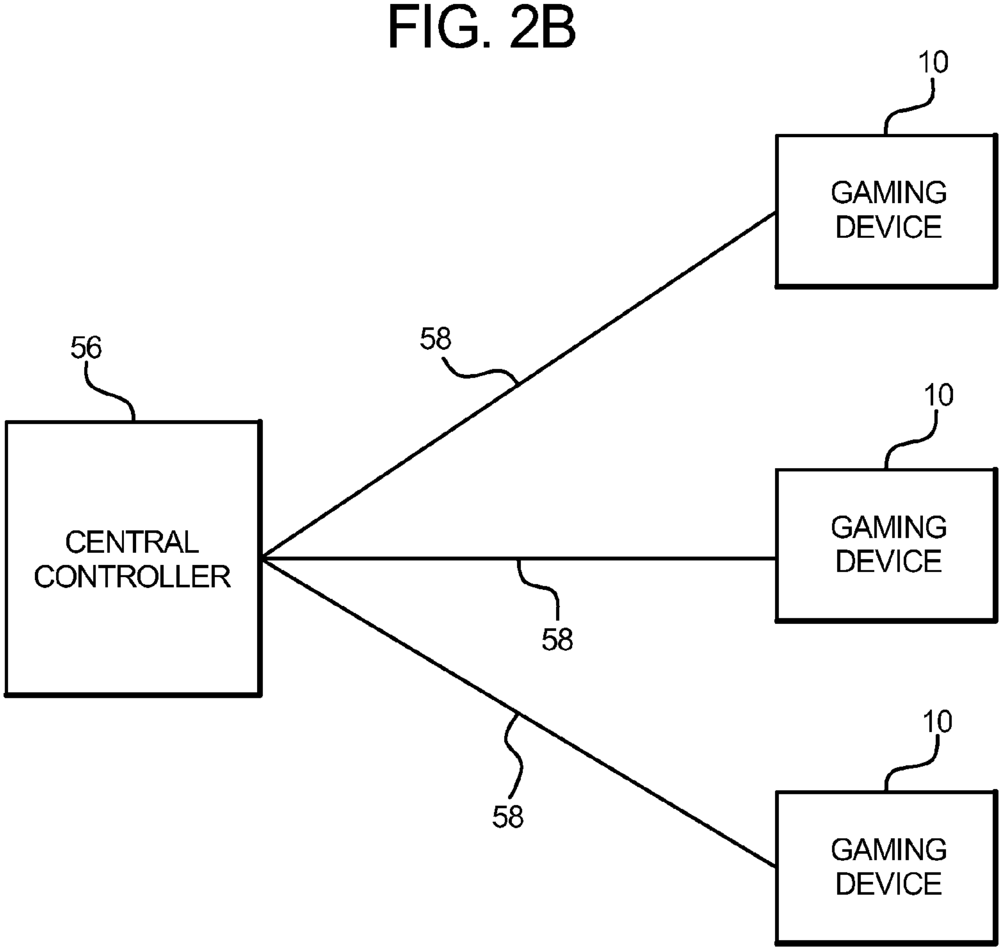
FIG. 2B is a schematic block diagram of one embodiment of a network configuration for a plurality of gaming devices disclosed herein.

In one embodiment, as illustrated in FIG. 2B, one or more of the gaming devices 10 are in communication with each other and/or at least one central server, central controller or remote host 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands, or any other suitable data or signal between the individual gaming device and the central server. The gaming device processor is operable to execute such communicated events, messages, or commands in conjunction with the operation of the gaming device. Moreover, the processor of the central server is designed to transmit and receive events, messages, commands, or any other suitable data or signal between the central server and each of the individual gaming devices. The central server processor is operable to execute such communicated events, messages, or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility, and the like.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any player's gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to one another.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer or other internet facilitator is available. The expansion in the number of computers and number and speed of internet connections in recent years increases opportunities for players to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server-based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, or downloading or streaming the game program over a dedicated data network, internet, or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be achieved by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as by playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Single Player Embodiments

Referring now to FIGS. 3A, 3B, 3C, 3D, 3E, 3F, 3G, and 3H, in one example single player embodiment, the present disclosure provides a shooting game, which is played as a primary game. In the illustrated embodiment, the shooting game includes a plurality of targets. Each of the targets 350*a*, 350*b*, 350*c*, 350*d*, and 350*e* is represented by the image of monster. Each of the targets 350*a*, 350*b*, 350*c*, 350*d*, and 350*e* is associated with an award value and a level of difficulty.

In one embodiment, different targets are associated with relatively different magnitudes of award values. In one such embodiment, each of the targets is associated with a different award value. In another embodiment, a plurality of the targets are associated with different award values. The level of difficulty pertains to the amount of damage required to destroy that target. In one embodiment, the award value associated with each of the targets is proportional to the level of difficulty associated with that target. For example, targets that require more damage to destroy are associated with larger award values than targets that are relatively easier to destroy (i.e., require less damage).

Figure 3A:
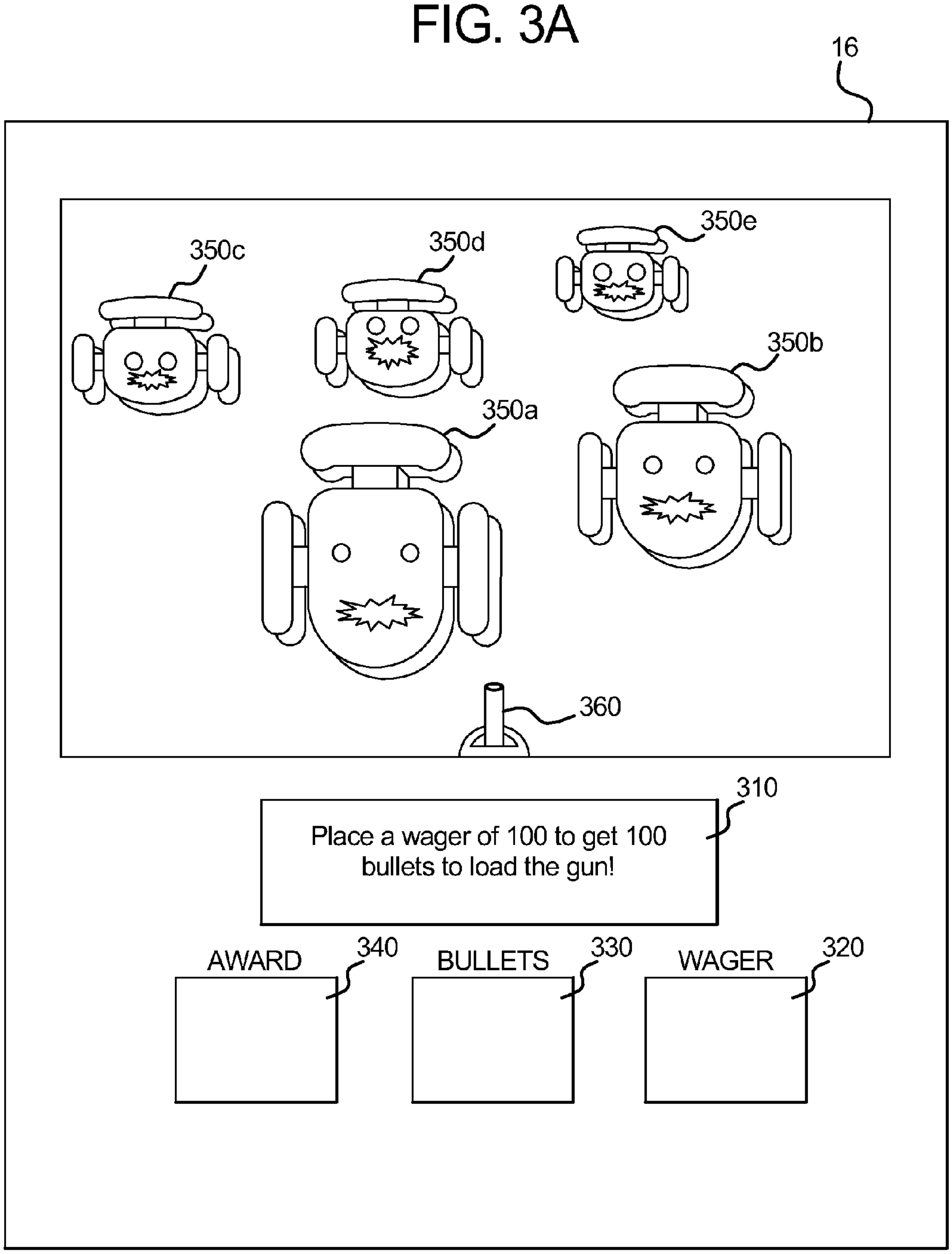
FIGS. 3A, 3B, 3C, 3D, 3E, 3F, 3G, and 3H illustrate screen shots for one player who is participating in a play of a game according to one single-player embodiment of the present disclosure.

As seen in FIG. 3A, the gaming device prompts the player to place a wager to obtain a designated number of projectiles, such as bullets. The player can subsequently use the provided bullets during the game to shoot one or more of the targets in attempt to collect one or more awards associated with the targets.

Figure 3B:
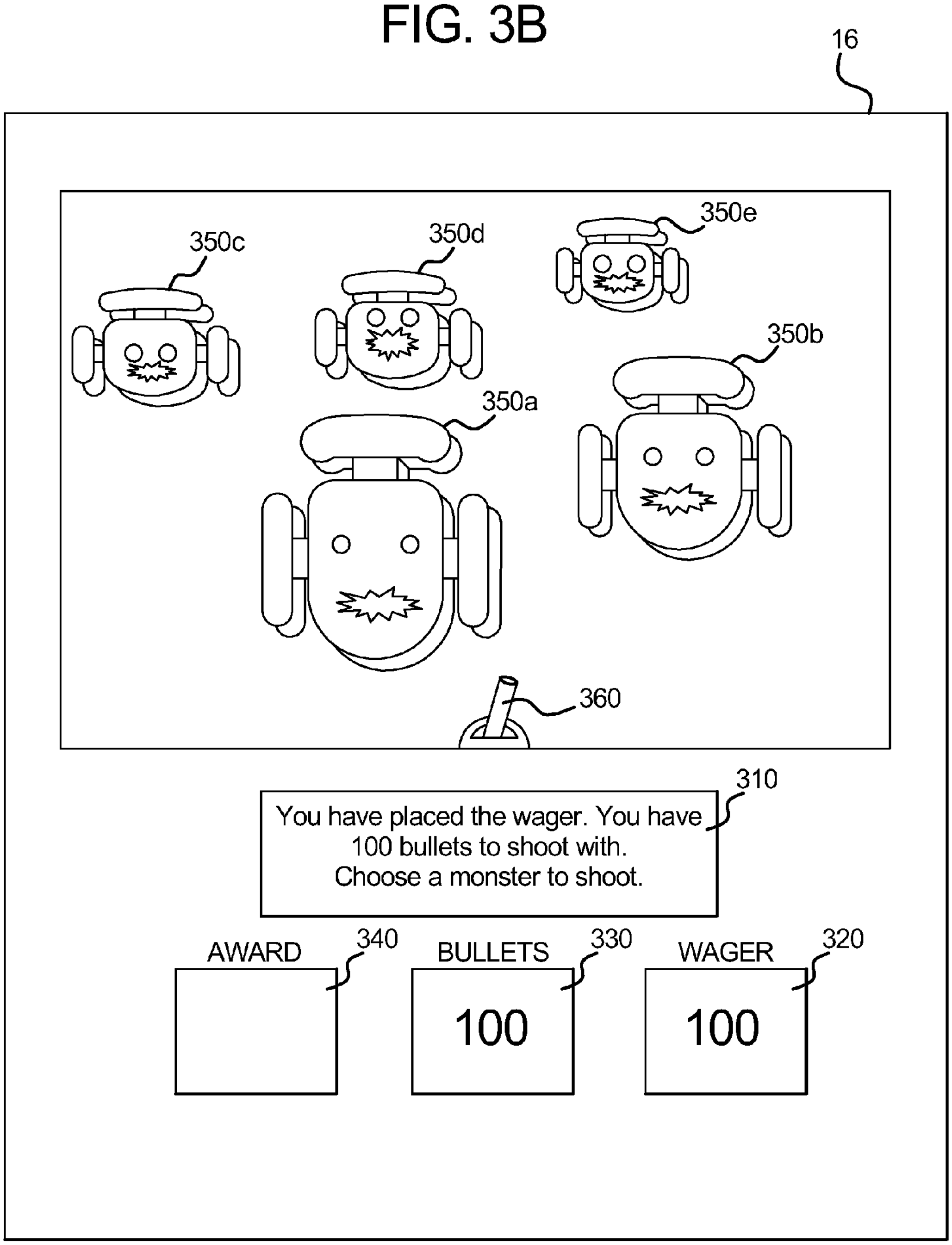

As seen in FIG. 3B, the player places a wager of 100 credits, and the gaming device provides the player with one hundred bullets to load the gun 360. Accordingly, the bullet meter 330 displays the number "100" indicating that the player has one hundred bullets remaining for the play of the game.

In the illustrated embodiment, upon placement of the wager, the gaming device provides a player with a designated number of bullets to load the gun 360. However, it should be appreciated that, in alternative embodiments, the gaming device could provide any suitable type of projectile, such as bullets, rockets, arrows, laser blasts, etc. In other embodiments, rather than providing a number of projectiles upon placement of the wager, the gaming device provides the player with a designated amount of energy or a designated amount of time for shooting. For example, the gaming device provides the player with a limited amount of time, such as one minute, during which the player can shoot at one or more of the targets in an attempt to collect one or more awards. In one embodiment, the number of projectiles that the player receives for the game is based on the wager amount placed. For example, a player receives more projectiles for a larger wager amount. In various alternative embodiments, the number of projectiles provided to the player is randomly determined, predetermined, determined based on player tracking, or determined in any other suitable manner.

In certain embodiments, the gaming device enables the player to choose which types of projectiles or, in some cases, which types of weapons the player wishes to use to shoot targets, thereby adding another element of strategy to the game. In one such embodiment, certain weapons may be associated with certain time constraints. For example, a given weapon may be more powerful (i.e., cause more damage to the target in a shorter amount of time or with fewer shots from that weapon), but it may require longer to reload than a less powerful weapon. In one embodiment, a player can earn or purchase upgrades which can be exchanged for better or more powerful projectiles and/or weapons. In one embodiment, a player can earn or purchase better perception or other improved attributes. For example, a player can earn or purchase the ability to see a larger quantity of targets in the game.

Referring again to FIG. 3B, now that the player is equipped with bullets, the gaming device enables the player to choose one of the targets 350*a*, 350*b*, 350*c*, 350*d*, and 350*e* to attack first in the game. To determine which target to attack, a player considers a variety of factors, such as the award value associated with a particular target, the difficulty level associated with the target, and the likelihood that the player will shoot and destroy the target with the available number of projectiles or in the provided amount of time, etc.

In one embodiment, the award value (i.e., what the target is worth) and the difficulty level (i.e., what it takes to destroy the target) associated with each of the targets are displayed to the player. In other embodiments, one of the award value and the difficulty level associated with each of the targets is displayed or conveyed to the player. In some embodiments, the gaming device displays or conveys information regarding the award value and/or difficulty level associated with only some of the targets, but not all of the targets. In one embodiment, the gaming device displays or conveys information regarding the award value associated with certain targets and displays or conveys information regarding the difficulty level associated with certain other of the targets. In different embodiments, the gaming device displays or conveys the exact award value and/or level of difficulty associated with one or more of the targets, or the gaming device displays ranges for the award value or difficulty level associated with one or more of the targets. In certain embodiments, different targets display different data or information. In various embodiments, certain types of data or information are displayed for all targets, a plurality of the targets, each of the targets, or none of the targets. In some embodiments, certain players are enabled to see specific types of data based on player-specific attributes, capabilities or powers. In one such embodiment, players can obtain such attributes, capabilities, or powers by: (i) purchasing them, (ii) finding and collecting them during the game, (iii) earning them during game play by completing one or more designated task, (iv) based on the player's wager, (v) based on player tracking, (vi) based on the player's standing in the game, or (vii) based on any other suitable criteria.

In one embodiment, the gaming device directly displays information regarding the award value and/or the difficulty level associated with each or a plurality of the targets to the player. For example, a target that is worth one hundred credits may have the number "100" displayed directly on or near that target. In other embodiments, rather than displaying the award value and/or difficulty level (or any other characteristic) associated with each or a plurality of the targets to the player, the gaming device conveys this information in another suitable manner.

In the illustrated embodiment, the targets 350*a*, 350*b*, 350*c*, 350*d*, and 350*e* have a variety of sizes. For example, some of the targets 350*a*, 350*b*, 350*c*, 350*d*, and 350*e* are represented by very small monsters and some are represented by very large monsters. The size of each monster representing a target provides information which enables the player to make inferences as to the amount of the award associated with that target and how difficult that target is to destroy. For example, a first target 350*a* is represented by a first monster that is approximately twice the size of a second monster which represents a second target 350*c*. Based on the relative sizes of the first and second monsters, a player can infer that the first target 350*a* may require about twice as much effort to destroy and is probably associated with an award that is twice as large as the second target 350*c*. Accordingly, without directly displaying the exact award value associated with each target or the exact amount of damage required to destroy that target, the gaming device provides information which can be used by the player to determine which target or targets to attack in the game and/or what order to attack one or more of the targets in.

The player can employ one or more different strategies when choosing which targets to attack and in what order. For example, the player may choose to use the provided number of bullets to attack many small, easy to destroy targets, even though those targets may be associated with smaller awards. Alternatively, the player could choose to attack a large target which is associated with a larger award in hopes that the player has enough bullets to destroy that large target. The player can alternate using different approaches and can employ a number of other strategies to add variety and excitement to the game. In various embodiments, the gaming device assists the player during play of the game by providing clues or suggested strategies.

Figure 3C:
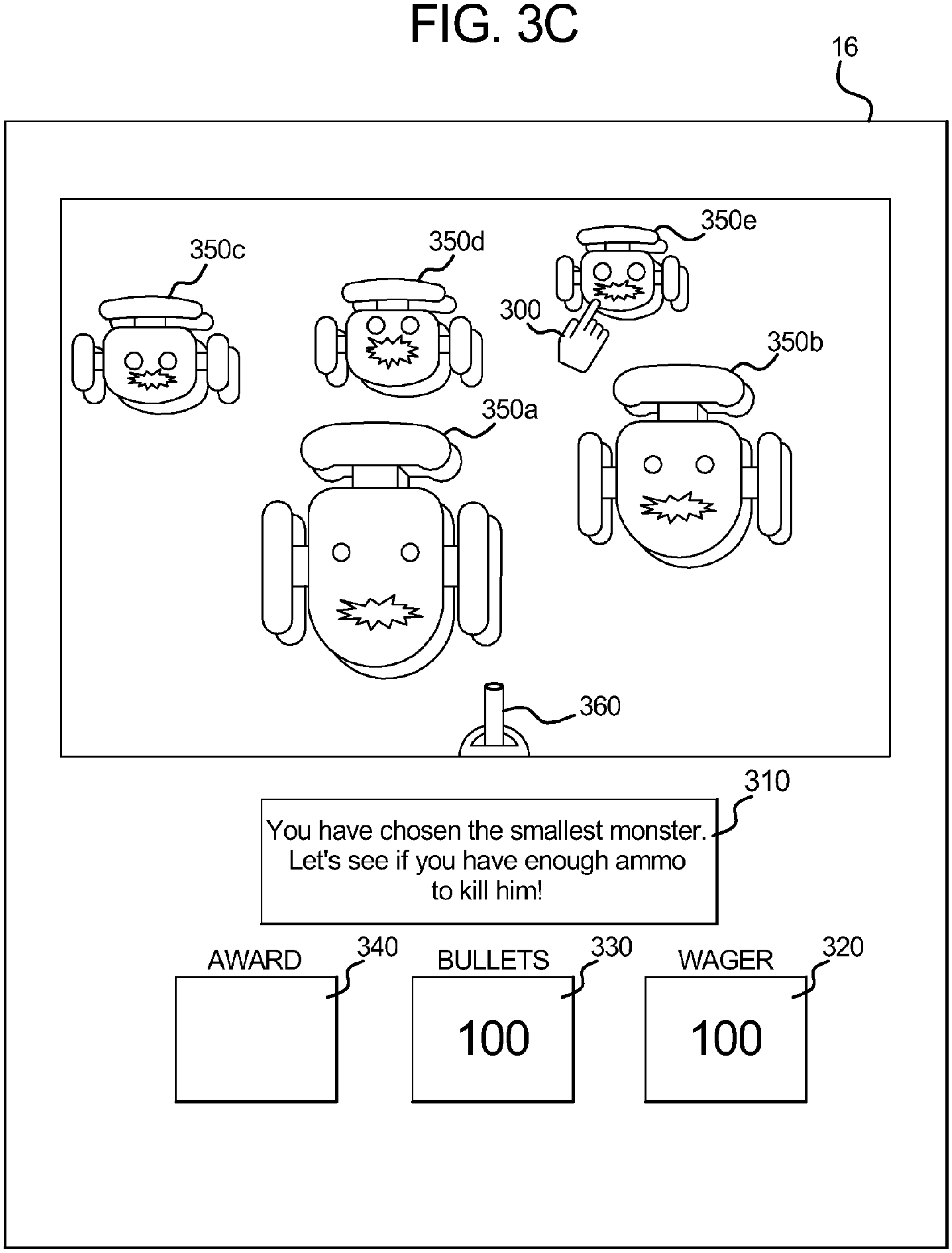

As seen in FIG. 3C, the player 300 chooses the target 350*e* to attack. In this embodiment, the screen or display 16 is a touch screen and the player selects a target to shoot by touching the image of the monster which represents that target. In other embodiments, the targets could be chosen by an avatar displayed by the gaming device and controlled by a player or in any other suitable manner.

Figure 3D:
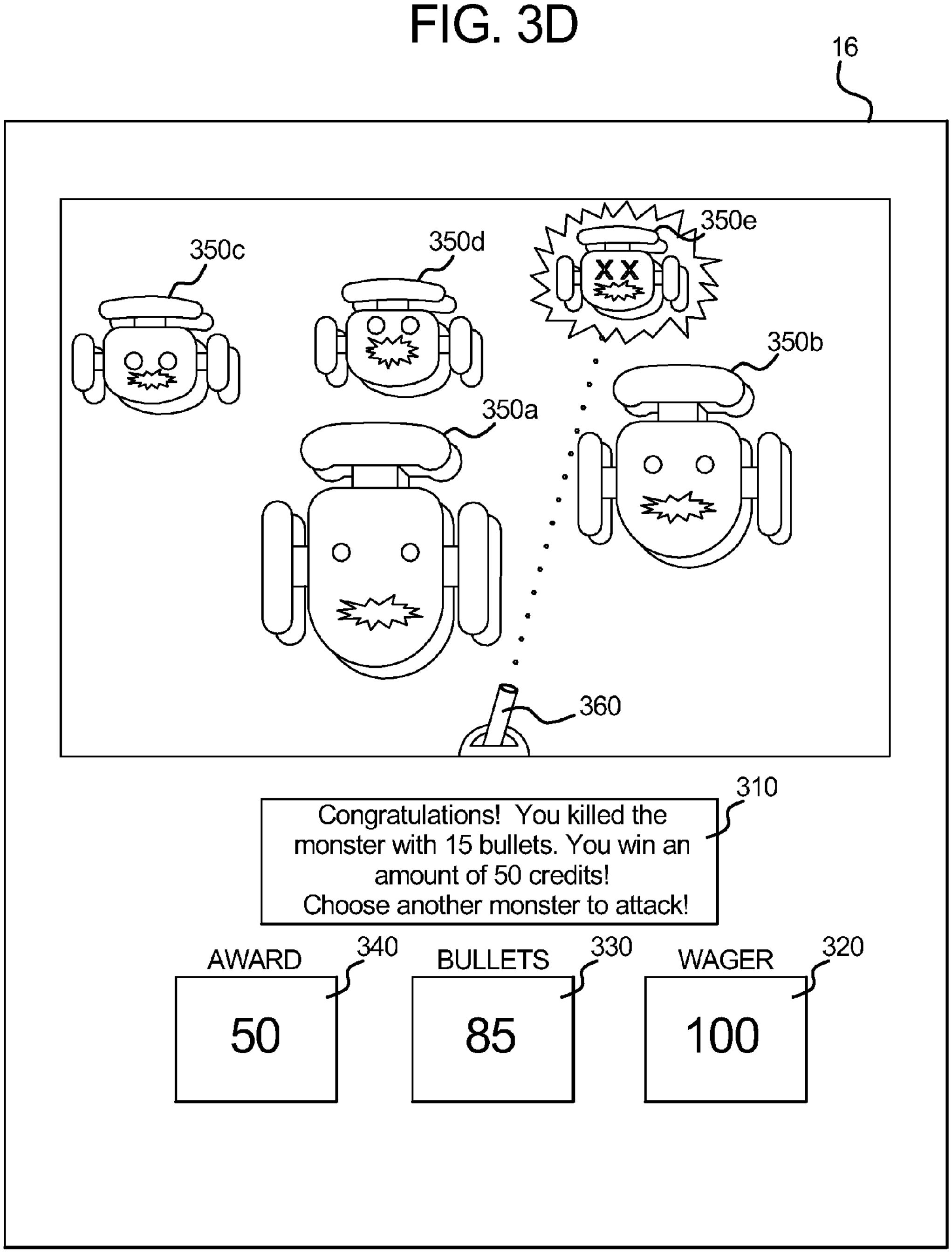

As illustrated in FIG. 3D, the gaming device displays a series of bullets being shot at the monster representing the target 350*e*. In some embodiments, each bullet shot requires a separate player input. In some embodiments, bullets automatically hit the target until there target is destroyed or until there are no bullets remaining or until the player deselects or disengages the target. In the example of FIG. 3D, after fifteen bullets have been shot, the monster explodes, indicating that that target 350*e* has been destroyed. The bullet meter 330 displays the number 85, since the player used fifteen of the initially provided one hundred bullets to destroy the target 350*e*. The gaming device provides the player with an award of fifty credits for destroying the target 350*e*, as indicated by the award meter 340.

In the illustrated embodiment, since the player destroyed the target 350*e*, the player wins the entire award (i.e., fifty credits) associated with that target 350*e*. In certain embodiments, in addition to winning the award associated with a particular target, the player wins an additional or supplemental award amount for destroying the target.

Since the player has eighty five bullets remaining, the gaming device prompts the player to choose another target to attack. At this point, the player can choose to attack one of the following targets: 350*a*, 350*b*, 350*c*, and 350*d*. The player cannot choose the target 350*e* because, in this embodiment, once a target is destroyed and the player obtains the award associated with that target, the target is off limits. In other embodiments, as each target is destroyed, the gaming system associates new awards with the targets. In such embodiments, players can attack the same targets more than once in the same play of the game. Moreover, since the awards associated with certain targets change periodically in such embodiments, the player must make strategic decisions regarding which target to attack. In one embodiment, once a target is killed or destroyed, the other displayed targets disappear, and a new set of targets is displayed. In one embodiment, the distribution of large and small targets which are displayed changes from round to round.

The number of bullets required to destroy the target 350*e* and the award associated with that target 350*e* (i.e., fifty credits) provide the player with information indicative of the general award values and difficulty levels for targets which are represented by monsters of that size.

Figure 3E:
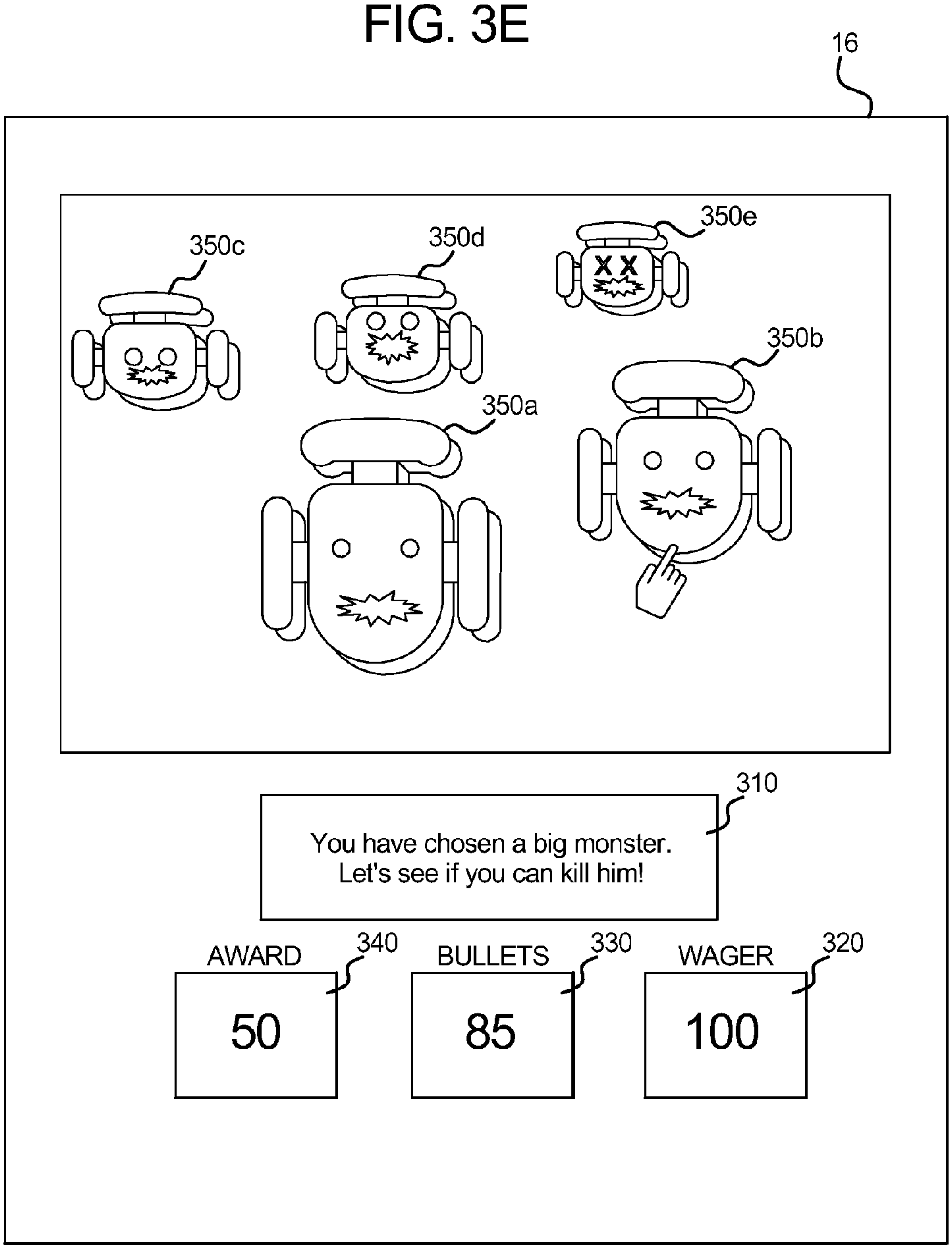

As illustrated in FIG. 3E, the player 300, seeking a larger award, chooses to attack another target 350*b*, which is represented by a much larger monster image, next. The player has eighty five bullets left, so the player is taking the risk that he will be able to destroy the target 350*b* with the remaining number of bullets.

Figure 3F:
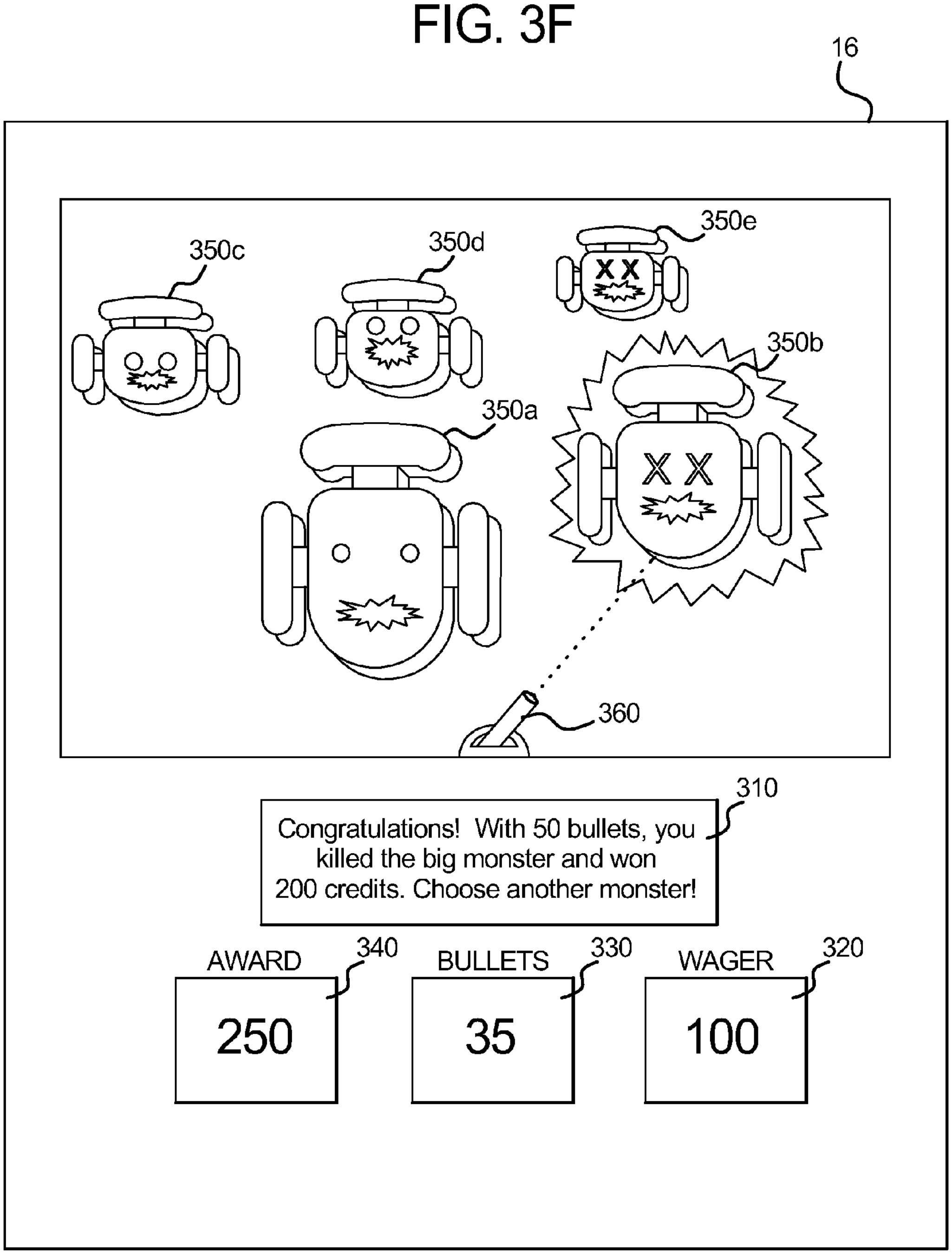

As seen in FIG. 3F, a series of bullets are shot at the target 350*b*. After fifty bullets are shot, the large monster representing the target 350*b* explodes. The target 350*b* is associated with an award of two hundred credits and thus, the gaming device provides the player with an additional two hundred credits. Accordingly, the award meter 340 is updated to reflect that the player has won a total of two hundred and fifty credits in the game. The number in the award meter 340 is now "250." As indicated by the bullet meter 330, the player has thirty five bullets remaining. Since the player still has thirty five bullets remaining in the game, the gaming device instructs the player to choose another one of the available targets 350*a*, 350*c*, and 350*d* to attack.

At this point in the game, the player must make another strategic decision. The player could use the remaining thirty five bullets to attack a few small targets, such targets 350*c* and 350*d*, which are represented by small monsters, or the player could try to destroy the target 350*a*, which is represented by the largest monster. Going for the target 350*a* represented by the largest monster is risky, given that the player only has thirty five bullets left, and it took 50 bullets to destroy the previous target 550*b*, which was represented by a monster that was comparable in size. However, the player has the potential to win a large award if the player successfully destroys the target 350*a* represented by the largest monster.

In certain embodiments, if the player needs more bullets as the game progresses, the player can purchase additional bullets. In one such embodiment, after the player has used all of the provided bullets, the player can pay for each additional shot the player takes beyond the initial provided number of bullets.

Figure 3G:
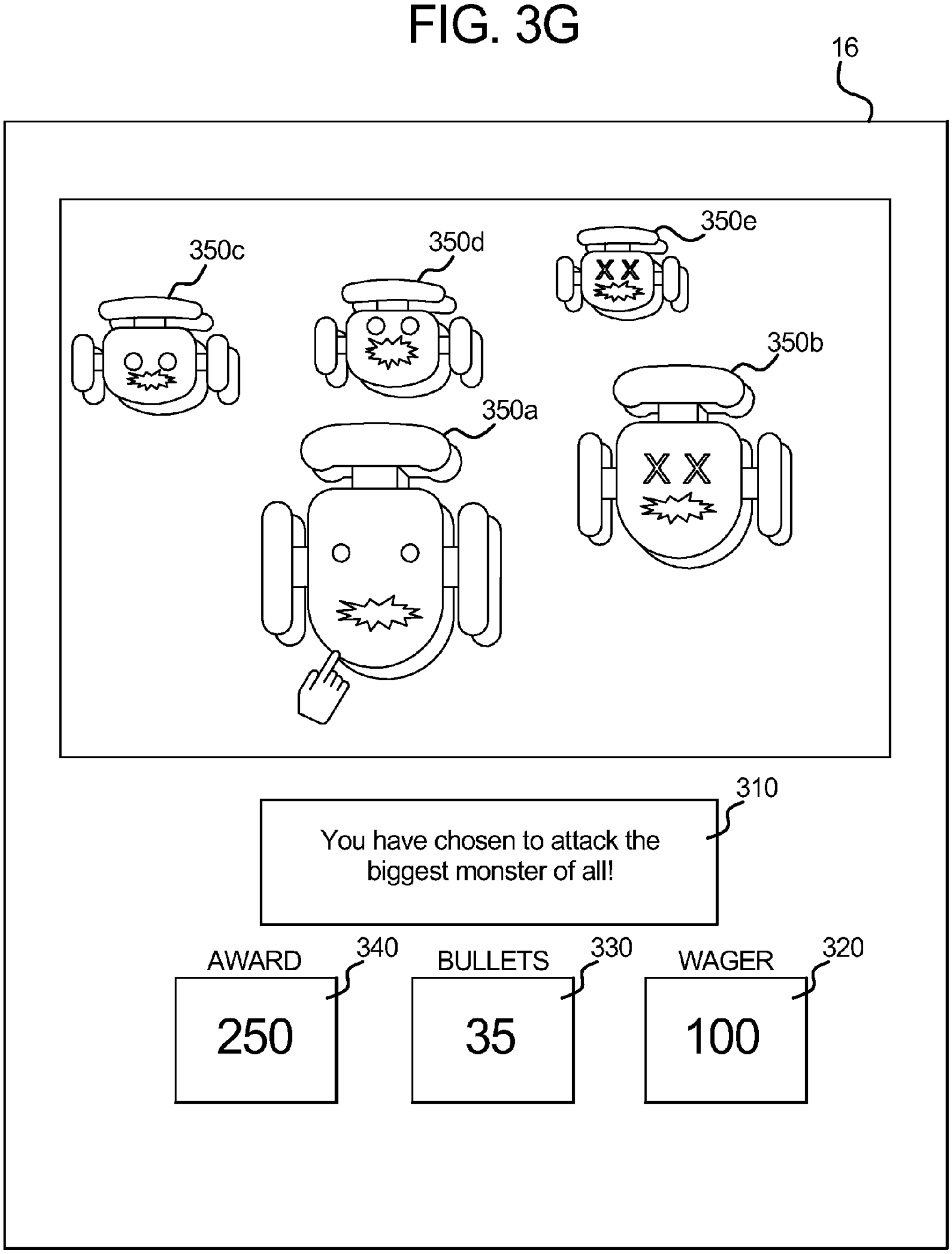
Figure 3H:
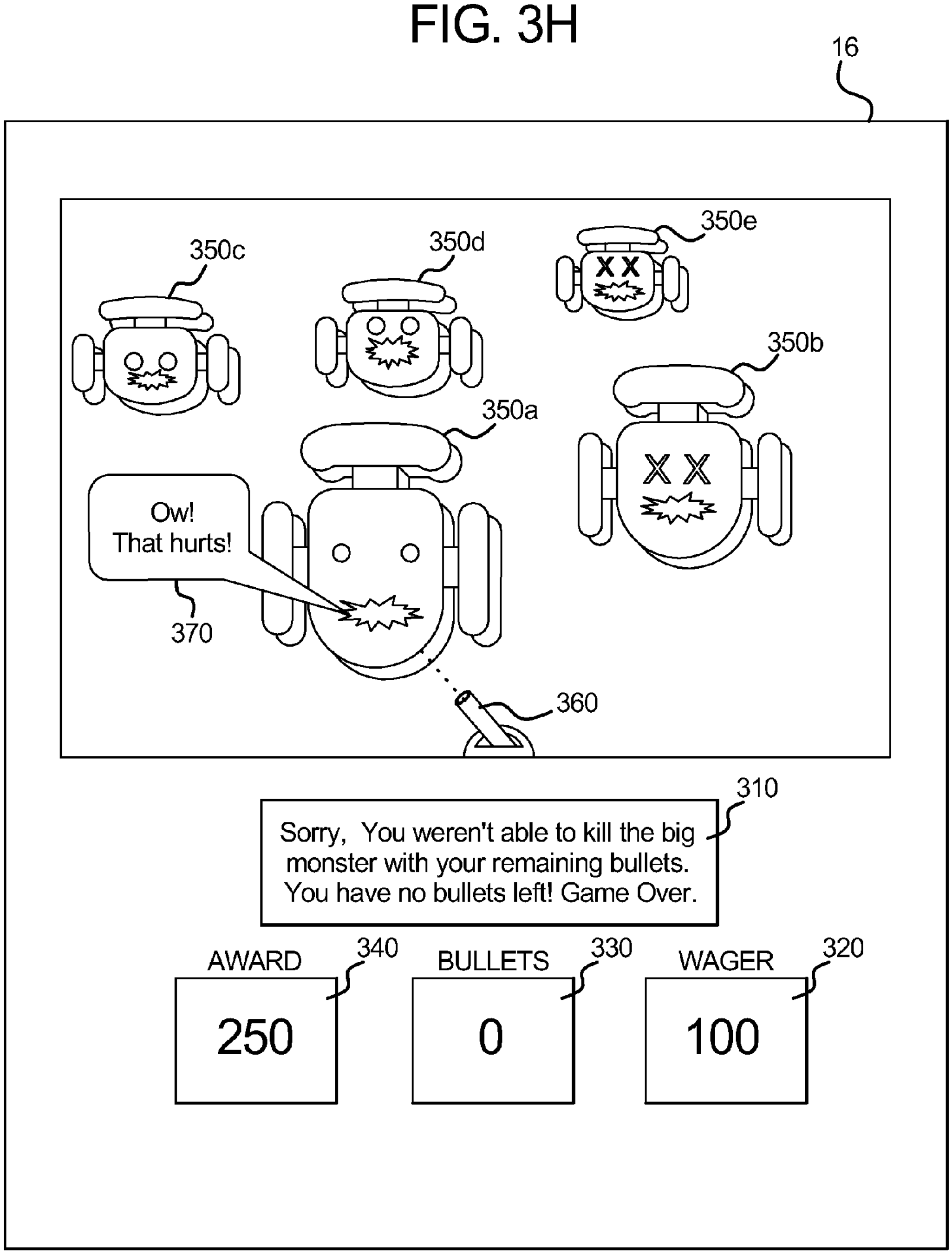

As illustrated in FIG. 3G, the player 300 chooses the target 350*a* to attack next. As seen in FIG. 3H, the gaming device displays a series of bullets shooting toward the target 350*a*. All of the remaining thirty five bullets are shot at the target 350*a*. The monster representing the target 350*a* is hurt, as indicated by the speech bubble 370, which states "Ow! That hurts!" However, the target 350*a* has not been destroyed by these shots. Thus, the gaming device does not provide the player with the award associated with this monster 350*a*. The player is out of bullets, as indicated by the bullet meter 330, and the game is over. The player won a total of two hundred and fifty credits for this play of the game, as indicated by the award meter 340.

In this example, the player made the choice to attack a target represented by a large monster in an attempt to win a large award. However, the player only had thirty five bullets left when he made that decision. If the player had chosen to attack a smaller, easier-to-destroy target, the player may have won a smaller award, instead of no award.

In certain embodiments, if a player does not successfully destroy a target, the player still receives an award for causing damage to the target. In one such embodiment, the award provided to the player for causing damage to but not destroying a target may include a portion of the award associated with the target. In such an embodiment, the portion of the award provided to the player is (i) determined based on a number of bullets or shots fired, (ii) determined based on an amount of damage caused, (iii) randomly determined, (iv) predetermined, (v) determined based on the player's wager, (vi) determined based on player tracking, (vii) based on any other suitable criteria, or (viii) determined based on a combination of these. In another embodiment, the player receives a consolation award for causing damage to but not destroying the target, which is not necessarily related to the award associated with the monster. In such an embodiment, the amount of the consolation award may be determined in any suitable manner. In one embodiment, the game includes a reveal feature which, at the end of the game, reveals to a player what it would have taken to destroy one, a plurality or each of the targets and/or the awards that the player could have won.

Although in this embodiment, the awards associated with the plurality of targets include respective numbers of credits, in various other embodiments, the awards associated with one or more of the targets could include: (a) a number of activations of a base game; (b) a number of activations of a bonus game; (c) an additional number of bullets; (d) extra time for shooting; (e) replays of the game; (f) improved ability to move or navigate through the game, in terms of distance, speed and/or efficiency; (g) improved target data acquisition; (h) improved environment information acquisition, such as but not limited to the ability to see a larger play area of the game, the ability to get a view of the entire play area of the game, the ability to detect targets which are not in current the play area of the game, and the ability to see obscured or otherwise invisible objects; (i) improved ability to block other players; (j) priority selection of targets over other players; (k) improved ability to attack and/or take ammunition from other players; (l) improved defense and/or lower susceptibility to attacks by other players; (m) an improvement and/or restoration of health and/or energy; (n) any other suitable award; and (o) any combination of these. In another embodiment, instead of awards, the gaming device awards a designated number of points for destroying or damaging each target. In such an embodiment, the player can subsequently redeem the points for various awards.

Thus, in one embodiment, the present disclosure provides a game in which a player can use strategy to make decisions which have a direct impact on the player's chance of obtaining one or more awards in a game. It should be appreciated that, although this embodiment was described as a shooting game, the same game principle could be implemented by the gaming device using other themes.

It should be also appreciated the shooting game of this embodiment may be provided as a primary or base game operable upon placement of a wager, or a secondary or bonus game which is triggered in any suitable manner.

Multiplayer Embodiments

Referring now to FIGS. 4A, 4B, 4C, 4D, 4E, 4F, and 4G, in one embodiment, the game is a multiplayer shooting game, which is played as a primary game. In this embodiment, upon placement of a wager, each of a plurality of players is provided with a number of projectiles for shooting one or more targets associated with the game. It should be appreciated that the game of this embodiment may also be implemented as a multiplayer secondary or bonus game which can be triggered in any suitable manner.

Referring generally to FIGS. 4A, 4B, 4C, 4D, 4E, 4F, and 4G, the game display 416 displays a target window 412, a summary table 410, and a message box 420 for communicating instructions and game updates to the players participating in the multiplayer game. In various embodiments in which players engage in group play, the game display could be: (a) a large central display; (b) a plurality of individual displays; (c) a large central display and a plurality of individual displays; (d) any combination of these; and (e) any other suitable displays. In one such embodiment, one or more players are not located at the same physical premises (such as via play in an online gaming environment).

The target window 412 includes a plurality of targets 480*a*, 480*b*, 480*c*, 480*d*, 480*e*, and 480*f*, each of the targets represented by an image of a monster. Each of the targets 480*a*, 480*b*, 480*c*, 480*d*, 480*e*, and 480*f* is associated with an award of a designated number of credits and a level of difficulty. In the illustrated embodiment, the number of credits associated with each of the targets is displayed directly on that monster. For example, the target 480*b* on the lower right portion of the target window 412 is associated with an award of 600 credits. It should be appreciated that information pertaining to the award, the level of difficulty, or both the award and level of difficulty associated with one or more of the targets may be displayed or conveyed in any suitable manner.

The summary table 410 keeps track of a variety of game parameters, including the wager placed 430 by each player, the number of bullets 440 that each player has in his arsenal at any given point, the target (i.e., the monster) that each player is currently attacking 450, the targets destroyed 460 (i.e., the monsters killed) by each player, and the credits won 470 by each player.

Figure 4A:
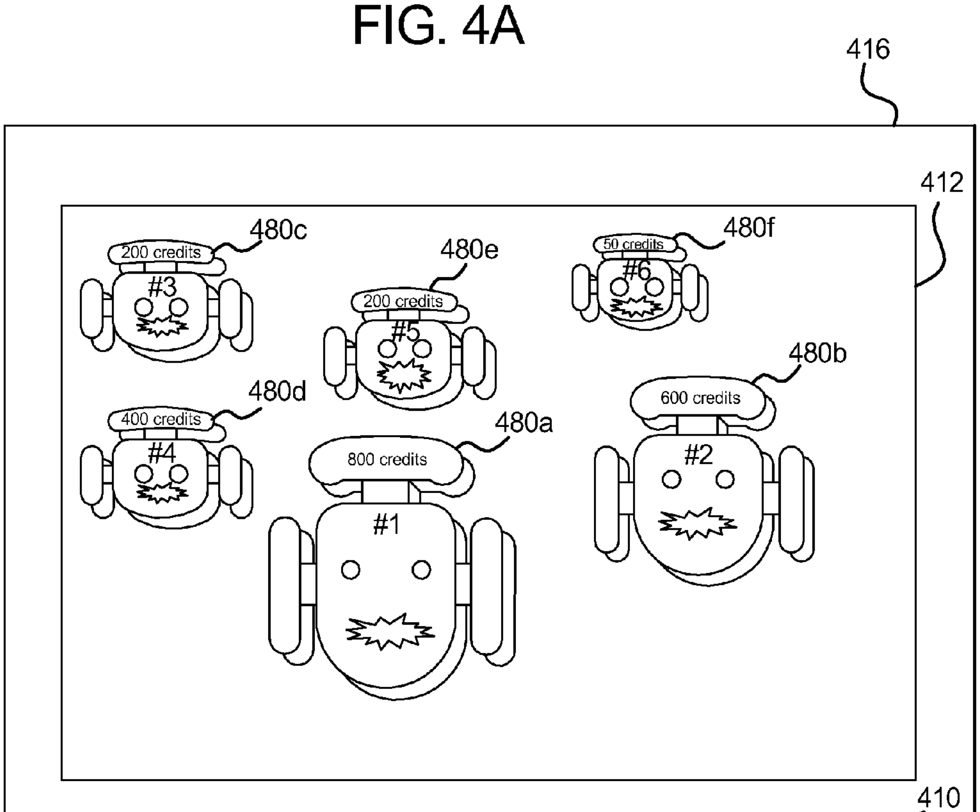

Referring now to FIG. 4A, Player one, Player two, and Player three have each placed the wager of 100 credits, as indicated by the message box 420. The gaming device provides each of the three players with five hundred bullets upon receiving the wager. It should be appreciated that although in this embodiment, each of the players received five hundred bullets, in various other embodiments, the gaming device provides players with other numbers of bullets upon placement of a wager.

As also indicated in the message box 420, the gaming device prompts each player to select one of the plurality of targets 480*a*, 480*b*, 480*c*, 480*d*, 480*e*, and 480*f* to attack. Each player's goal is to destroy or cause a sufficient amount of damage to one or more of the targets, such that the player can win one or more awards associated with the attacked targets. The gaming device reminds the players that they can choose to attack targets individually or in teams of two or more players. That is, players can work together in attempt to destroy certain targets which may require two or more players to destroy.

When selecting which target to attack, each player must consider: (1) whether he has enough bullets to destroy a target associated with a certain award value or difficulty level; (2) whether to go for a target that is associated with a large award but is more difficult to destroy, or one or more easier-to-destroy targets which are associated with one or more smaller awards; and (3) whether to attack a target with another player or a team of players. Working together in teams can help players to destroy one or more targets that they might otherwise not be able to destroy on their own with the provided number of bullets, or can help players to destroy targets more quickly. This involves a relatively unique, non-trivial amount of strategic decision-making.

Figure 4B:
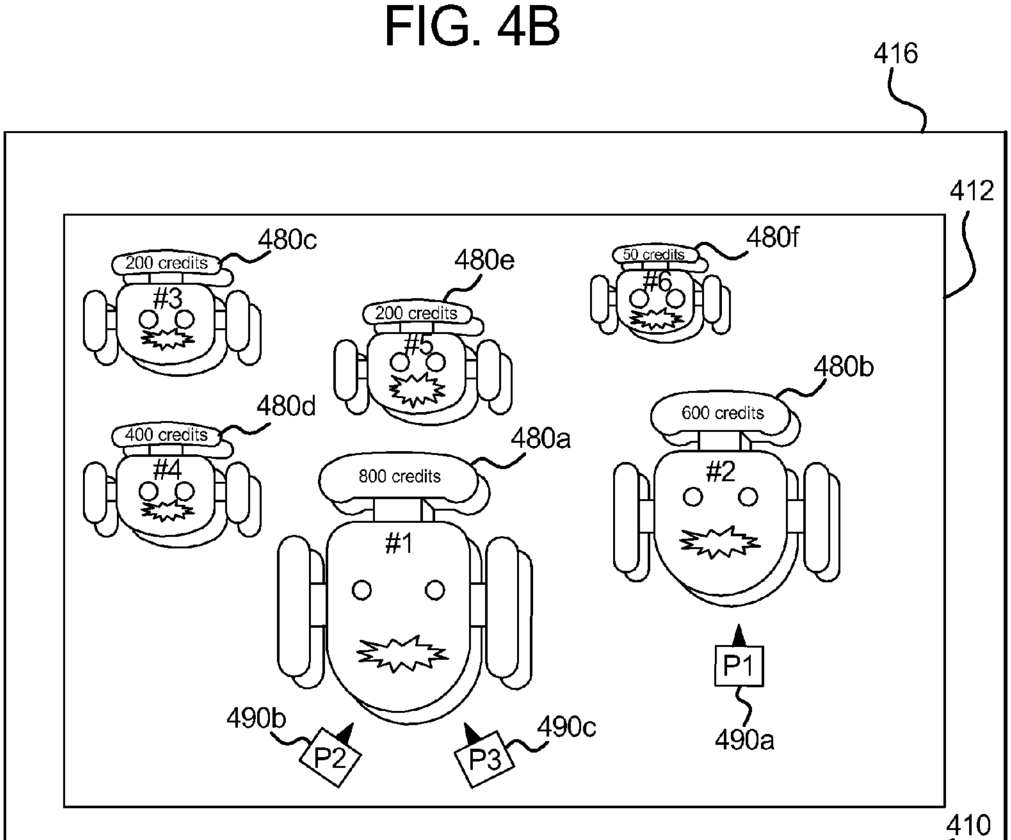

As seen in FIG. 4B, approximately five seconds later, each player inputs a selection by touching one of the targets on the game display (not illustrated). After each player selects one of the targets, an avatar representing that player appears on the game display. More specifically, each player avatar is aimed at the target selected by the player corresponding to that player avatar. As indicated by the summary table 410, player one has selected the #2 target 480*b* associated with the award of six hundred credits. Thus, the avatar 490*a* representing Player one is aimed at the #2 target 480*b*. Player two and Player three each selected the #1 target 480*a* associated with the award of eight hundred credits. Thus, the avatar 490*b* representing Player two is aimed at the #1 target 480*a*, as is the avatar 490*c* representing Player 3. Players 2 and 3 will work together in an attempt to take down the #1 target 480*a*.

Figure 4C:
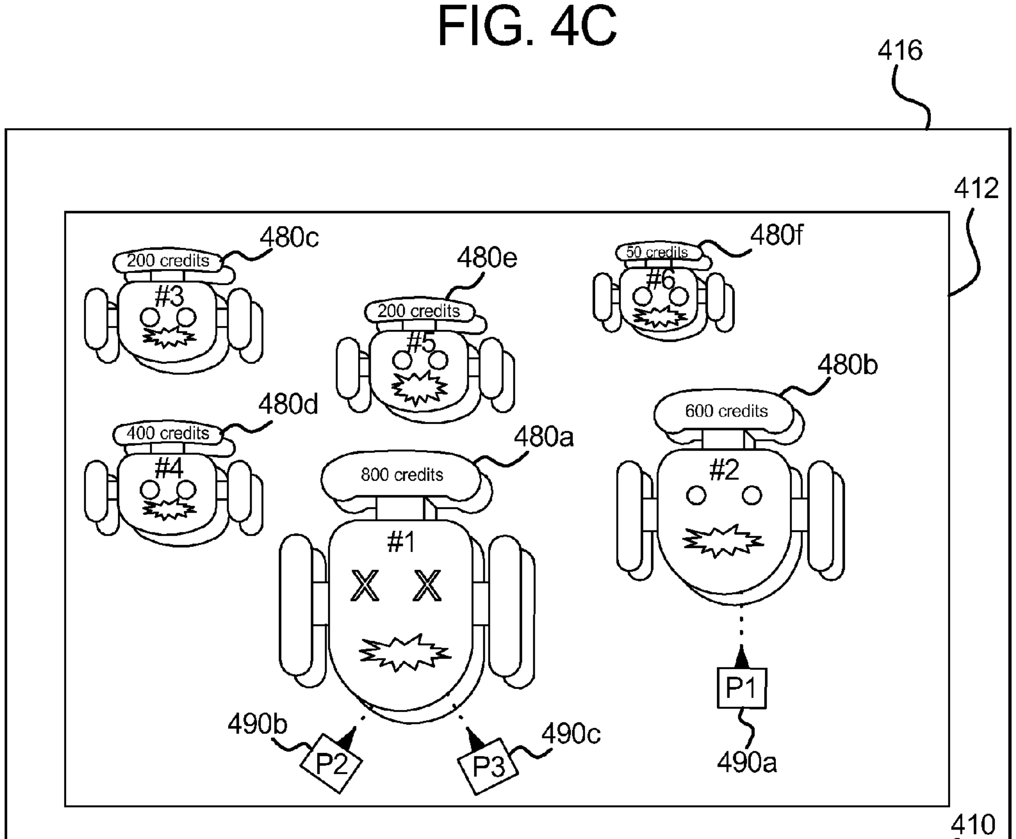
Figure 4E:
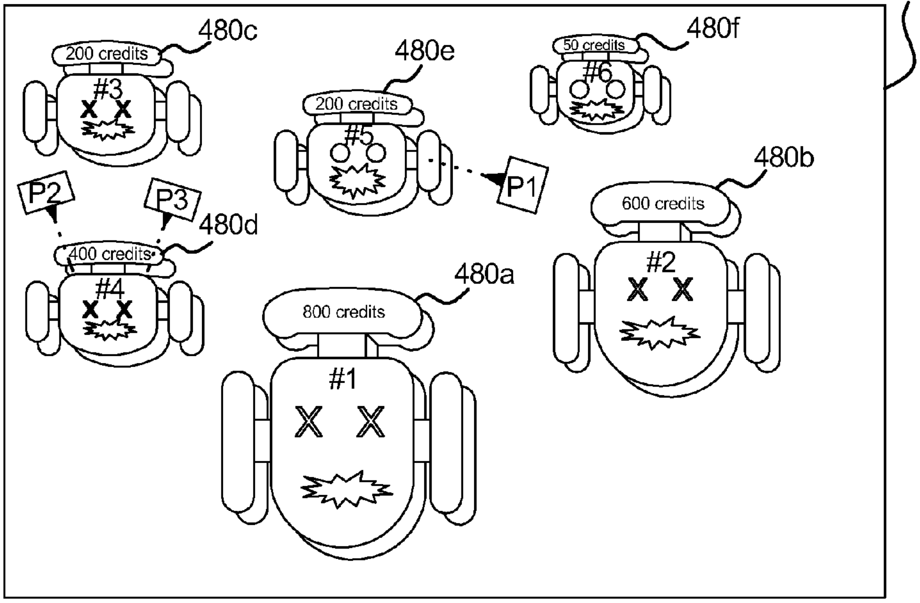

As illustrated in FIG. 4C, after approximately 10 seconds, several bullets have been fired. Player two has expended two hundred of the initially provided five hundred bullets. Player three has also expended two hundred of the initially provided five hundred bullets. With the combined four hundred bullets, Players two and three successfully destroyed the #1 target 480*a*, which is associated with an award of eight hundred credits. The monster representing the target 480*a* has X's over his eyes, indicating that the target 480*a* has been destroyed.

In one embodiment, when players work as a team to destroy a target, the players on the team share the award associated with that target. In various alternative embodiments, the players share the award: (i) evenly amongst the players of the team; (ii) based on the relative number of projectiles spent by each player to destroy the target (i.e., the relative contribution of each player); (iii) based on the relative damage caused by each player to the target; (iv) based on time (e.g., players who shot earlier projectiles and/or caused earlier damage to the target are provided with a larger portion of the award than players who contributed later); (v) based on prior winnings in the game; (vi) based on the amount wagered by each player; (vii) based on player tracking; (viii) based on any other suitable criteria; and (ix) based on any combination of these. In another embodiment, the player who shoots the projectile which ultimately kills or destroys the target wins the award associated with the target. In one such embodiment, the other players of the team may be provided with supplemental or consolation awards. In one embodiment, the player who shoots the projectile or bullet that ultimately destroys the target (i.e., the last bullet) wins an additional award on top of the award won for the relative contribution of that player. In one embodiment, a player's status determines the amount or portion of the award that is available to that player if the player's team destroys a target. For example, if a team of players destroys a target, platinum players receive a larger portion of the award associated with that target, while bronze players are entitled to a smaller portion of the award.

As seen in FIG. 4C, Players two and three have each won an award of four hundred credits for their relative contribution to destroying the #1 target 480*a*. As indicated in the message box 420, the gaming device instructs Players two and three to move their avatars 490*b* and 490*c*, respectively, to another target by touching one of the other targets 480*b*, 480*c*, 480*d*, 480*e*, and 480*f*. Player one chose to attack a target (i.e., the #2 target 480*b*) represented by a relatively large monster on his own. Even though Player one has already used three hundred of the five hundred initially provided bullets, Player one has not yet destroyed the #2 target 480*b*. Thus, Player one has not yet won an award in the game, as indicated by the summary table 410. The gaming device encourages Player one to keep shooting at the #2 target 480*b* or move to another target. In the illustrated embodiment, Player one used the provided bullets faster than the other players. However, it should be appreciated that, in other embodiments, players may shoot bullets at the same or substantially the same rate.

As illustrated in FIG. 4D, another 5 seconds have elapsed and, after using another 25 bullets, Player one has finally destroyed the #2 target 480*b*. Thus, Player one wins the award of six hundred credits associated with the #2 target 480*b*. Since Player one destroyed the #2 target 480*b* without any assistance from any other player, Player one wins the entire six hundred credits. Player one still has one hundred and seventy five bullets remaining in the game, as indicated by the summary table 410.

Players two and three decided to approach the #3 target 480*c* as a team. In the five seconds that elapsed after their victory over the #1 target 480*a*, Players two and three were able to kill the #3 target 480*c* in the same amount of time it took for Player one to finish off the #2 target 480*b*. Thus, Players two and three each win half of the award associated with the #3 target (i.e., Players two and three each win two hundred credits). As indicated by the summary table 410, Players two and three each have a total award of five hundred credits for the game, and each have two hundred bullets remaining. The gaming device instructs all of the players to choose another target to attack, as indicated in the message box 420.

After another ten seconds has elapsed in the game, Player one has moved and has been shooting bullets at the #5 target 480*e*. Players two and three are still using the team approach and have been shooting the #4 target 480*d*. At this point, Player one has expended one hundred and twenty five bullets shooting the #5 target 480*e*. However, Player one has not yet destroyed the #5 target 480*e*. Players two and three have expended one hundred and twenty five bullets each shooting the #4 target 480*d*. This is enough to destroy the #4 target 480*d*, which is associated with an award of four hundred credits. Thus, Players two and three each win another two hundred credits. As indicated by the summary table, Players two and three each have a total of seven hundred credits for the game and have surpassed Player one in credits for the first time in the game (i.e., Player one has six hundred credits which he earned by killing the #2 target 480*b*).

The gaming device instructs Players two and three to choose another target to attack. There are two available target left in the game—the #5 target 480*e*, which is currently being attacked by Player one and is worth two hundred credits, and the #6 target 480*f*, which is worth fifty credits.

Players two and three have several options at this point. They can attack the #6 target 480*f* as a team. One drawback associated with this approach is that the #6 target 480*f* is not worth very many credits. If Players two and three successfully kill the #6 target 480*f* as a team, the award will be even smaller because it will be split between them based on their relative contributions to destroying that target.

Another approach would be to split up—one player could join Player one in attacking the #5 target 480*e* and the other player could attack the #6 target 480*f* on his own. However, it is uncertain how much damage Player one has already caused to the #5 target 480*e*. If Player one has caused a large amount of damage to the #5 target 480*e* relative to the other player who subsequently joins him in the attack, the subsequently-joining player may only win a relatively small award.

A further approach would be for both Players two and three to join Player one in attacking the #5 target 480*e*. It should be appreciated, however, that if too many players are working together as a team to destroy one target, this means that the award associated with that target will be divided over a larger number of team members once the target is destroyed. It may not be worth it to a player to attack a target if the award will be divided among a large number of players. Thus, players must not only determine which target to attack based on the target's award and level of difficulty, but they must also consider the number of other players playing for the same award at the same time. This adds a further element of strategy to the game.

In addition to the above strategies, other approaches could be employed. In any case, Players two and three must decide whether they wish to go their separate ways and compete against each other for the remaining awards, or continue to work together.

Figure 4F:
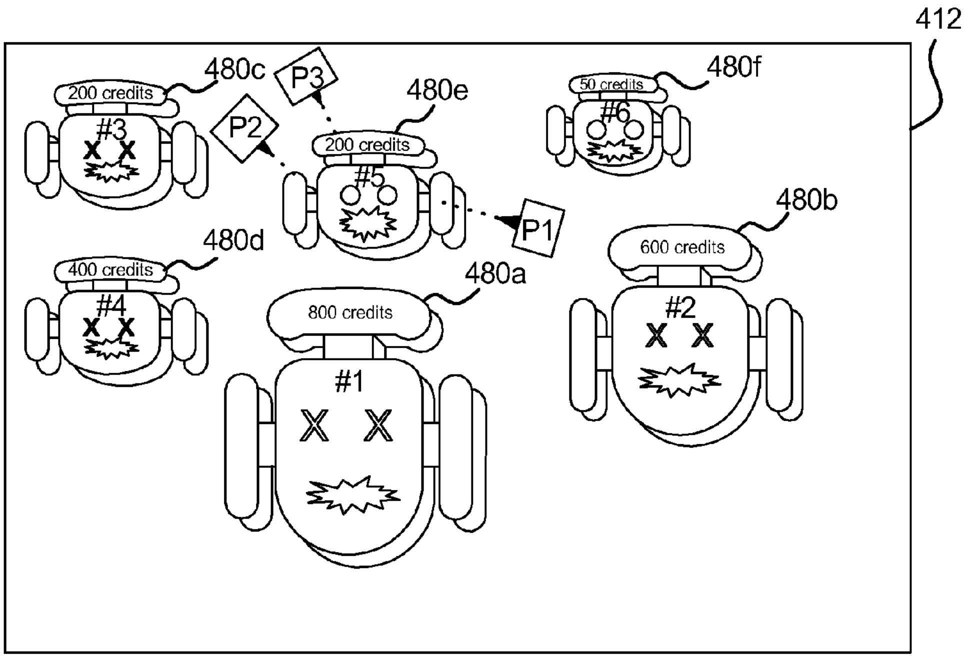

As illustrated in FIG. 4F, Players two and three both decided to join Player one by attacking the #5 target 480*e*. After five seconds elapse, the three players successfully kill the #5 target 480*e*. Player one is now out of bullets (i.e., Player one expended his last one hundred and seventy five bullets shooting the #5 target 480*e*), and Players two and three each have twenty five bullets remaining in the game (i.e., each of Players two and three expended fifty bullets shooting the #5 target 480*e*). The #5 target 480*e* is associated with an award of two hundred credits. Since Player one was the biggest contributor in destroying the #5 target 480*e*, Player one receives a larger portion of the award. More specifically, as indicated in the message box 420, Player one wins one hundred of the total two hundred credits, and Players two and three each win fifty of the remaining one hundred credits. It should be appreciated that, although Player one did not expend exactly twice as many bullets as Players two and three combined, Player one receives a larger award since player one was the first player attacking the #5 target 480*e*.

Figure 4G:
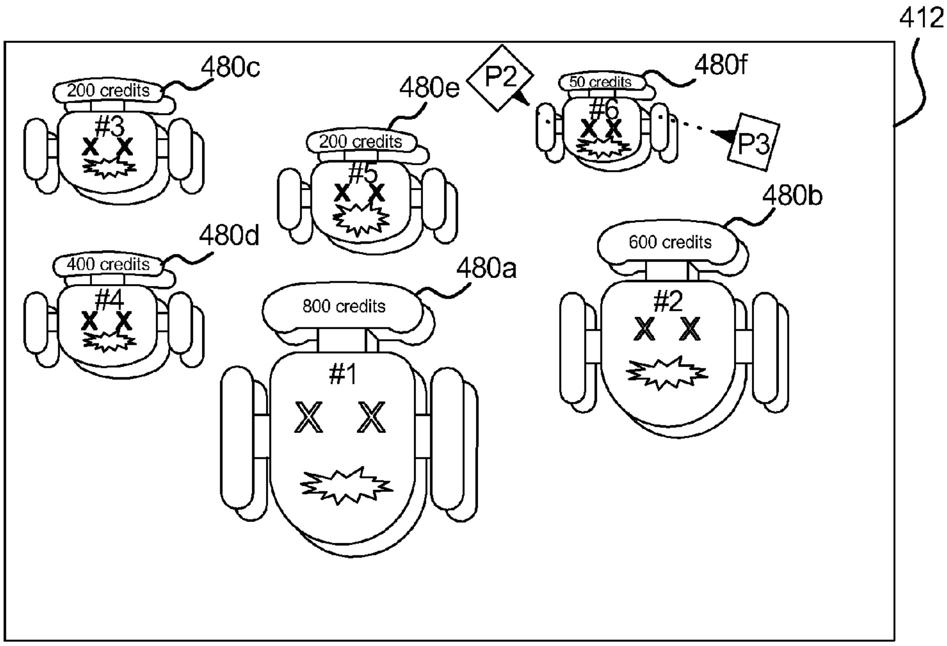

In FIG. 4G, Players two and three choose to move their player avatars 490*b* and 490*c* to the last remaining target, the #6 target 480*f*. As indicated in the message box 420, the gaming device congratulates Players two and three for successfully destroying the #6 target 480*f*. For this victory, Players two and three each win an additional twenty five credits. As indicated by the summary table, by working together, Players two and three were able to destroy (or help destroy) five of the six targets (i.e., the #1, #3, #4, #5, and #6 targets). Players two and three each obtained a total award of seven hundred and seventy five credits in the game. Player one on the other hand, did not kill as many targets. Player one only defeated the #2 target 480*b* and the #5 target 480*e*. However, since the #2 target 480*e* was one of the biggest and most valuable (i.e., worth a large number of credits) targets in the game, Player one still won a large award.

Thus, the present disclosure provides a game in which players can incorporate strategy and choice in determining which awards they want to play for and which teams they want to join to pursue those awards. This enables players to have an active role while gaming and to make decisions which directly affect their ability to win awards in the game.

In certain multiplayer embodiments, the game is divided into multiple tiers of rounds where the top players from one round advance to a higher value round in a tournament ladder fashion. Such a tournament round could offer player versus player competition where awards are based on final tournament ranking. Non-advancing players would remain in the lowest level tier.

Ongoing Bonus Game Embodiments

Referring generally to FIGS. 5A, 5B, 5C, 5D, 5E, 5F, and 5G, in one embodiment, the game of the present disclosure includes an ongoing bonus game in which one or more players may participate upon suitably qualifying to do so. Eligible or qualified players may enter the ongoing bonus game while it is in progress, play the bonus game, and then exit the bonus game when they please or when a termination event with respect to that player occurs. After a player has exited the ongoing bonus game, the bonus game continues, such that the player can re-enter the bonus game, as long as that player remains eligible or qualified to do so or later becomes qualified to enter the bonus game again. In this manner, the ongoing bonus game is continuously going on, regardless of whether players are playing the bonus game or not.

In this embodiment, the bonus game is played concurrently with a primary game. Thus, a player can see and remain excited by the bonus game while playing the primary game. This is also exciting because the player is a featured player seen by everyone participating in or observing the game.

In the embodiment illustrated in FIGS. 5A, 5B, 5C, 5D, 5E, 5F, and 5G, the ongoing bonus game includes a gaming world, universe, or environment 530. A plurality of eligible or qualified players can enter the virtual game world 530 to play the bonus game at any designate time.

Figure 5A:
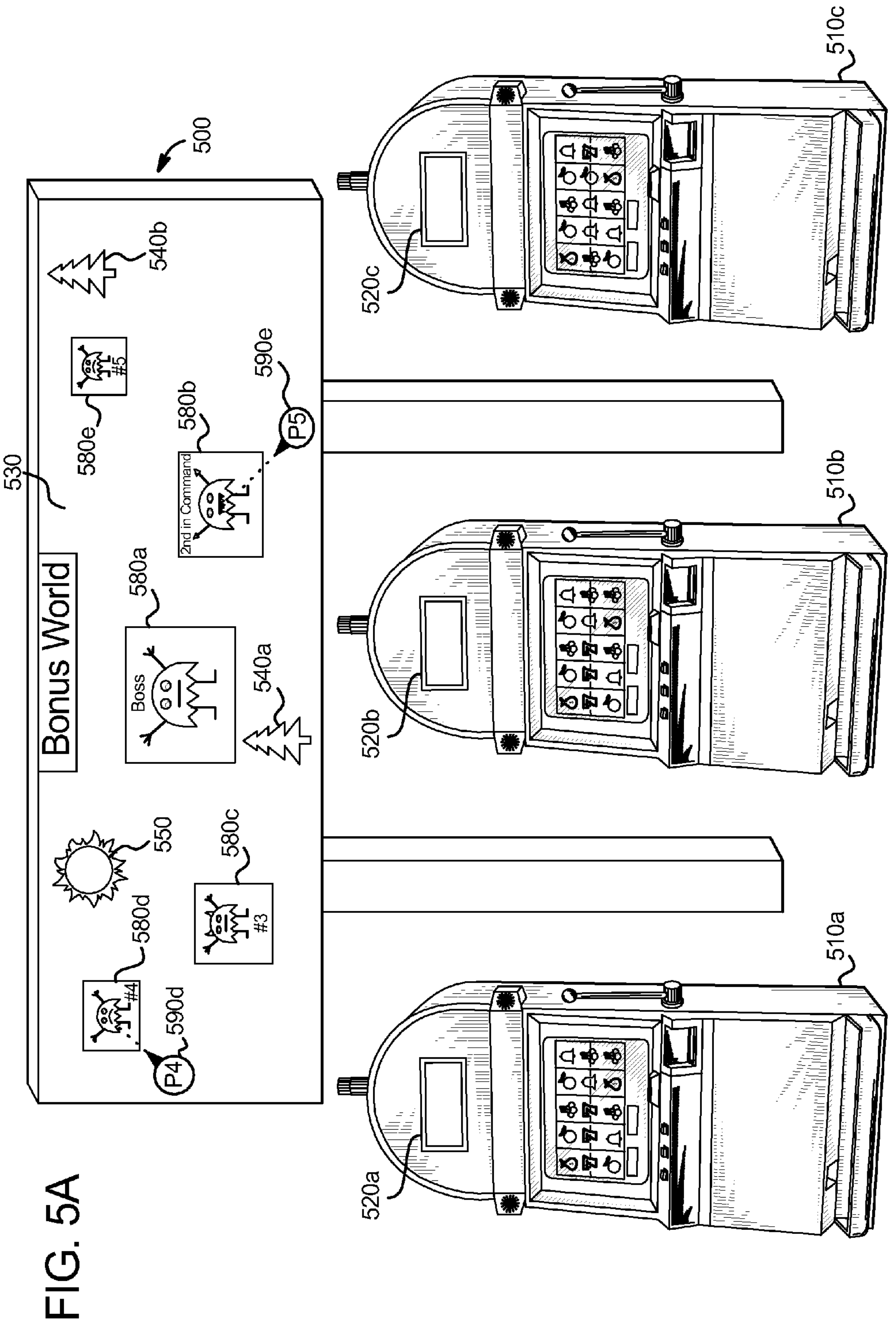
FIGS. 5A, 5B, 5C, 5D, 5E, 5F, and 5G illustrate one example embodiment of the present disclosure where a plurality of gaming devices are associated with a common or shared display configured to display a bonus game.

Referring now specifically to FIG. 5A, in one embodiment, the gaming system includes a plurality of gaming devices, including at least gaming devices 510*a*, 510*b* and 510*c*, and a central display 500 which displays the game world 530 to all players playing at the gaming devices of the gaming system. Each of the gaming devices 510*a*, 510*b* and 510*c* also includes an additional secondary display 520*a*, 520*b* and 520*c*, respectively, which displays information relating to the ongoing bonus game to the player playing at that gaming device.

As the players play the primary games of their respective gaming devices 510*a*, 510*b* and 510*c*, each player may become eligible to participate in the ongoing bonus game upon the occurrence of suitable triggering events, as discussed below. When a player becomes eligible to participate in the ongoing bonus game, the gaming system provides the player with a designated number of bullets. Once a player has bullets, the player can enter the game world 530. If an eligible player chooses to enter the game world 530, a player avatar representing that player to appears in the game world 530. The player can cause his respective avatar to move around in the game world 530, using the provided bullets to shoot at one or more of a plurality of targets 580*a*, 580*b*, 580*c*, 580*d*, and 580*e* in the game world 530. In this example, each of the plurality of targets 580*a*, 580*b*, 580*c*, 580*d*, and 580*e* in the game world 530 is represented by an image of a monster.

As seen in FIG. 5A, each of the plurality of targets 580*a*, 580*b*, 580*c*, 580*d*, and 580*e* in the game world 530 is associated with an award of a designated number of credits and a level of difficulty. In the illustrated embodiment, the players playing at the gaming devices 510*a*, 510*b*, and 510*c* can see the available targets in the game world 530. In certain embodiments, information relating to one or more of the award value and difficulty level associated with each of the targets is displayed or conveyed in any suitable manner to one or more of the players. The players can also see two other player avatars 590*d* and 590*e* in the game world. These avatars 590*d* and 590*e* represent Player four and Player five (i.e., players who are playing at other gaming devices, which are not illustrated) who were already in the game world when Player one and Player two qualified for the bonus game. The players can also see other elements in the game world, such as a sun 550 and some trees 540*a* and 540*b*. In certain embodiments, these other elements serve a variety of purposes, such as providing atmosphere and perspective, providing places where player avatars can hide (i.e., avatars can hide behind the trees), and to show movement of targets or other player avatars in the game world. For example, based on the positions of the targets relative to the sun, players can see how certain targets are moving in the game world.

In certain embodiments, certain players can only see certain portions of the virtual game world. That is, certain players can only see targets and other player-agents that are within a specific portion of the virtual game world. In one such embodiment, different players can see different portions or different amounts of the virtual game world. In one such embodiment, which portions or how much of the virtual game world each player can see is based on player tracking.

Referring again to FIG. 5A, in the illustrated embodiment, the triggering event is an event associated with the primary game. More specifically, when three "7" symbols are generated on an active payline in the primary game of a particular gaming device, the player playing at that gaming device receives a designated number of bullets to use in the bonus game. In FIG. 5A, the triggering event has occurred at the gaming devices 510*a* and 520*a*. Thus, the players playing at the gaming devices 510*a* and 510*a* are now eligible to participate in the bonus game.

Figure 5B:
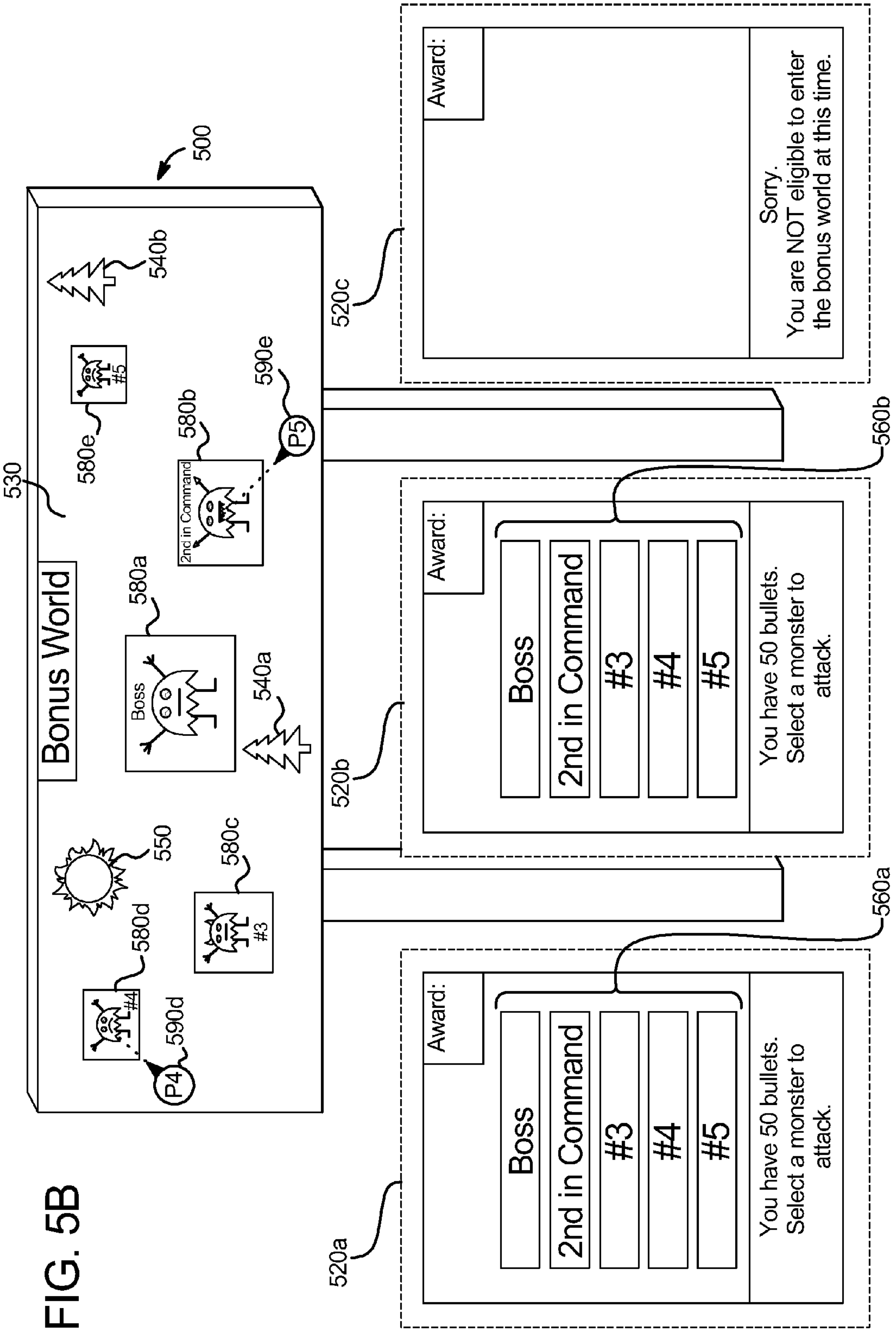

In FIG. 5B, the secondary display devices 520*a* and 520*b* of the gaming devices 510*a* and 510*b* each display a message indicating to the player playing at that gaming device that they have fifty bullets to use in the bonus game. The secondary display device 520*c* of the gaming device 510*c* indicates that the player playing at that gaming device 510*c* is not eligible to participate in the bonus game since the triggering event did not occur on that gaming device 510*c*.

It should be appreciated that, in other embodiments, bullets are provided to a player without regard to the activities which occur in the primary game. For example, in various alternative embodiments, a player playing at one of the gaming devices of the gaming system may receive a number of bullets for the bonus game: (i) at designated time intervals; (ii) as a bonus award associated with a play of another game; (iii) randomly; (iv) based on player tracking; (v) based on the player's wager level; (vi) based on the player's rate of play of the primary game; (vii) based on any other suitable criteria; or (viii) based on a combination of these. It should be appreciated that providing the player with bullets for the bonus game regardless of any event or outcome that occurs in the primary game increases the player's enjoyment and level of excitement, in particular in part because a positive component of the bonus game can be provided when a losing outcome in the primary game is provided and vice versa.

In one embodiment, the number of bullets provided to each player is the same. In other embodiments, the number of bullets provided to each player or a plurality of players may be different. In one embodiment, bullets for use in the bonus game are provided based on a rate associated with the number of times the primary game is played. For example, a player may receive ten bullets for the bonus game each time the primary game is played, every other time the primary game is played or based on any other suitable predetermined or randomly determined frequency of plays of the primary game. In various alternative embodiments, the number of bullets provided to each player may be predetermined, randomly determined, based on player tracking, based on the player's wager, based on any other suitable criteria, or based on a combination of these. In one embodiment, the number of bullets provided to a player for use in the bonus game is determined based on a primary game outcome. In one such example embodiment, one or more primary game outcomes may trigger the bonus game, and each of the primary game outcomes corresponds with a different number of bullets awarded to the player for use in the bonus game.

In FIG. 5B, the secondary display devices 520*a* and 520*b* of the gaming devices 510*a* and 510*b* each display a plurality of selections 560*a* and 560*b*, respectively. Each of the selections corresponds to one of the available targets 580*a*, 580*b*, 580*c*, 580*d*, and 580*e* in the game world. Player one and Player two, who are playing at the gaming devices 510*a* and 510*b*, respectively, are prompted to make a selection of one of the targets 580*a*, 580*b*, 580*c*, 580*d*, and 580*e* to attack in the bonus game. In this embodiment, each of the secondary displays 520*a*, 520*b* and 520*c* is a touch screen and each player makes monster selections by touching one of the plurality of selections 560*a* and 560*b* on that player's respective touch screen.

Figure 5C:
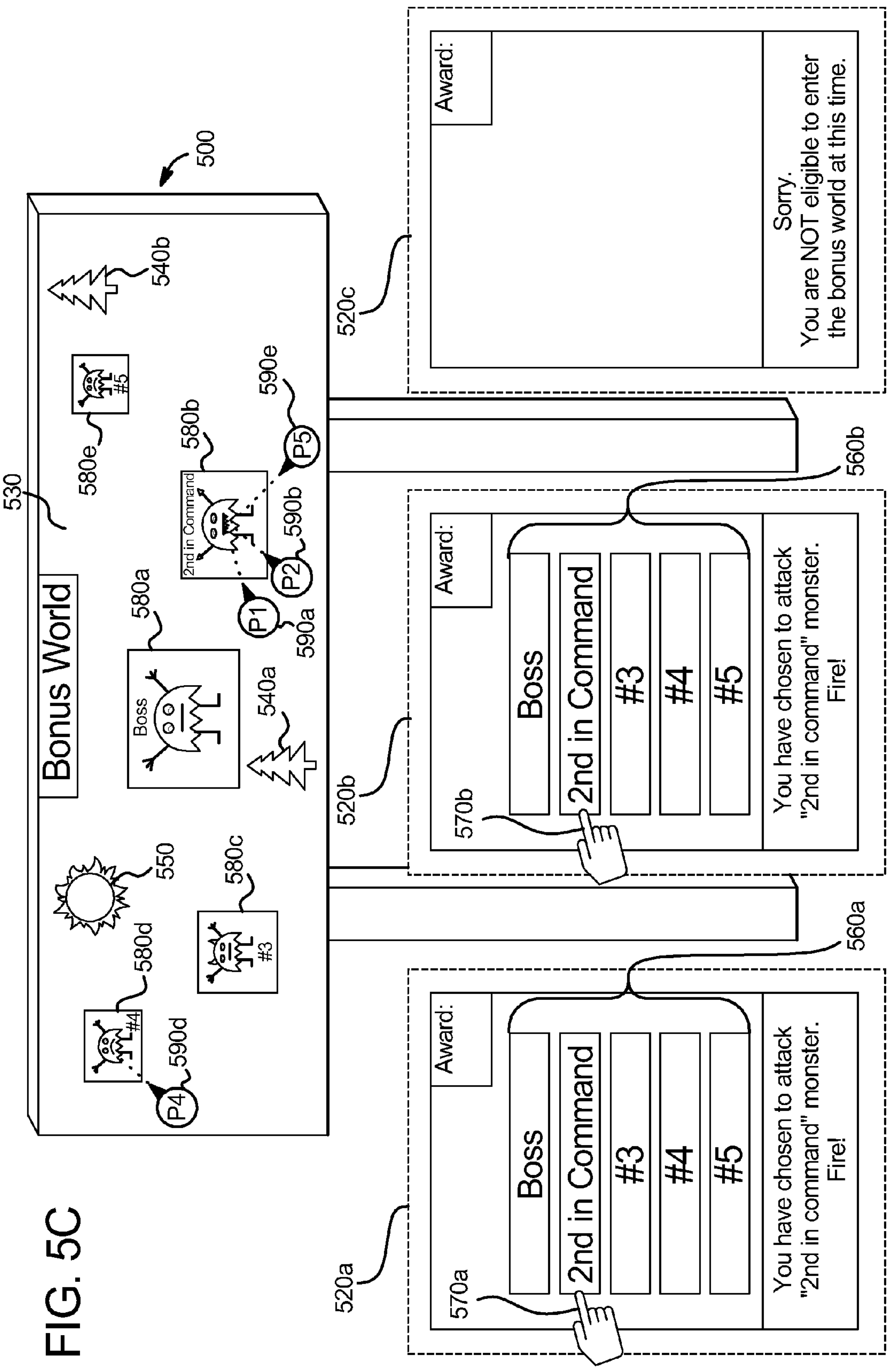

As seen in FIG. 5C, Players one 570*a* and Player two 570*b* have each chosen to enter the game world 530 by choosing one of the selections on his respective secondary display 520*a* and 520*b*. Player one 570*a* has selected to attack the target 580*b*, represented by the "2nd in Command" monster. Player two 570*b* has also selected to attack the target 580*b*. Thus, a player avatar 590*a* representing Player one and a player avatar 590*b* representing Player two are displayed in the game world 530. The player avatars 490*a* and 490*b* representing Players one and two, respectively, are aimed at the target 580*b*, which is represented by the "2nd in Command" monster.

As illustrated in FIG. 5C, a player avatar 590*d* representing Player four is aimed at the #4 target 580*d*. A player avatar 590*e* representing Player 5 is aimed at the target 580*b* represented by the "2nd in Command" monster. Thus, Players one and two will be shooting at the target 580*b* as a team with the Player five. Teaming up with other players enables players to obtain the greatest chance of destroying a target and thus winning an award. This enables players to have an active role while gaming and to make decisions which directly affect their ability to win a awards in the game.

As seen in FIG. 5C, the player avatars are all shooting bullets at the targets at which they are aimed. In one embodiment, once a player selects a target to attack, the player's avatar begins shooting bullets at that target. The player's avatar continues to shoot at the target until the target is destroyed or until the player runs out of bullets. If a player has bullets remaining after shooting and destroying a target, the player can shoot another target. The player can continue shooting at targets in the game world until that player runs out of bullets. It should be appreciated, however, that in various other embodiments, the player can remain in the game world (i) for a limited amount of time; (ii) until no awards remain in the game; (iii) until obtaining one or more awards which cause the termination of that player's participation in the game; (iv) until the player's avatar is killed by a monster or by a player; or (v) according to any other suitable criteria.

Figure 5D:
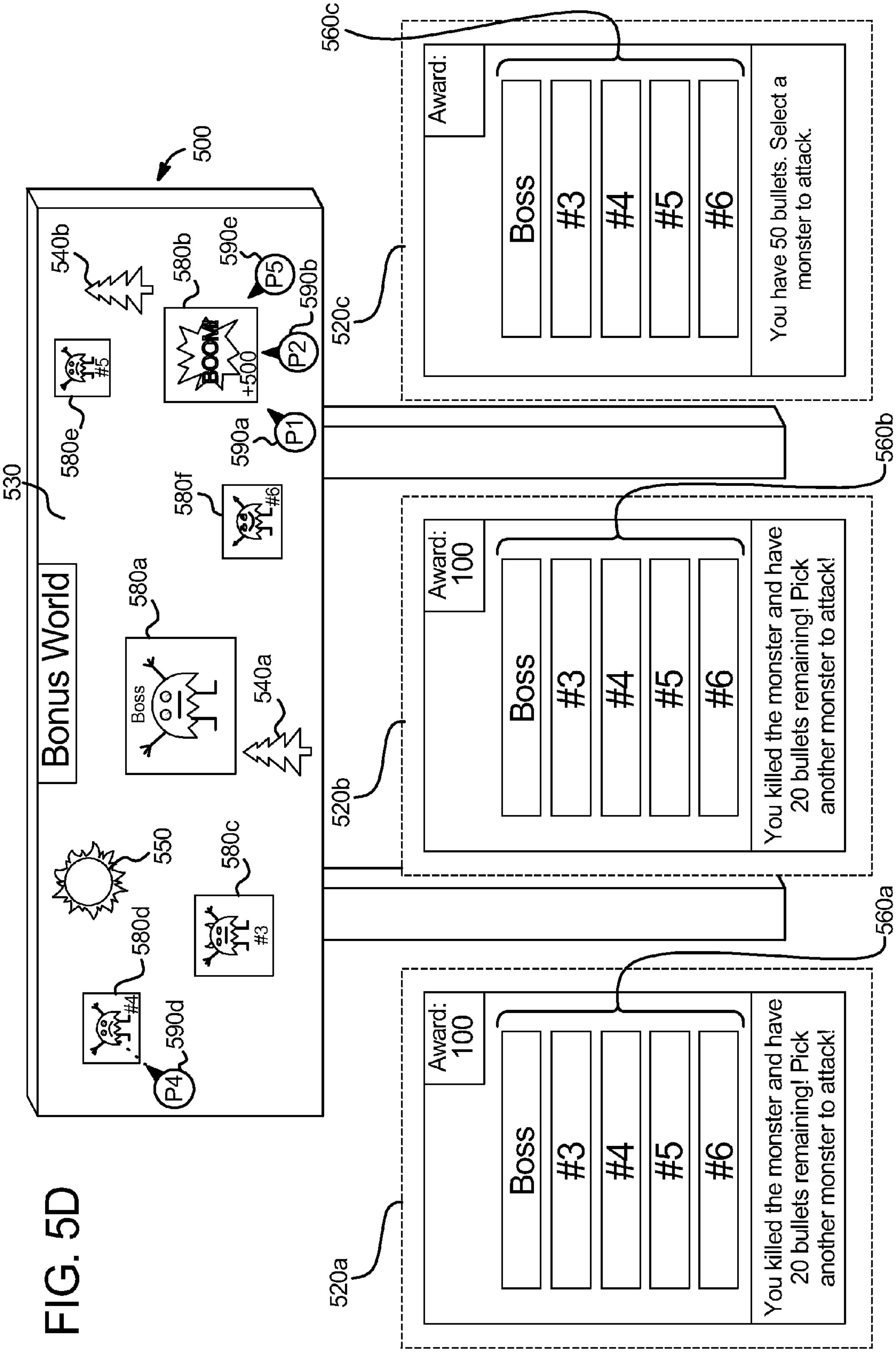

As seen in FIG. 5D, the secondary display devices 520*a* and 520*c* of gaming devices 510*a* and 510*b* indicate to Players one and two that they, with the help of Player five, have destroyed the target 580*b* (i.e., the target represented by the 2nd in Command monster). As seen in the game world 530, the 2nd in Command monster has disappeared, and in its place is a big explosion and the number "+500". This indicates that the target 580*b* was associated with an award of five hundred credits. Players one and two are each awarded one hundred credits of the total five hundred credit award. This is because the Player five (i.e., the player represented by player avatar 590*e*) was shooting the target 580*b* prior to Player one and player two entering the bonus game, and thus, Player five caused more damage to that target 580*b*. As indicated by the secondary display devices 520*a* and 520*b*, Players one and two each have twenty bullets remaining to use in the bonus game. Thus, Players one and two are prompted to choose another target to attack in the bonus game.

In addition to the activities of Players one and two in the game world 530, other things are also going on. For example, Player four (the player represented by player avatar 590*d*) is still shooting at the #4 target 580*d*. A new target, the #6 target 580*f*, has also appeared in the bottom portion of the game world 530, thereby providing another award that the players participating in the bonus game can play for.

In some embodiments, certain targets may be initially invisible and are revealed when they are encountered by certain players or by players who have special capabilities. For example, a player may have an enhanced sighting capability which enables that player to see a target that would otherwise be obscured. In one embodiment, certain targets are only visible or become visible to certain players who have completed some type of task or action or who have overcome one or more obstacles. In one embodiment, one or more targets may be initially visible but are not targetable because they are blocked by a barrier. In one such embodiment, a player who wishes to shoot at such a target must damage or eliminate the barrier. That is, players can target barriers and can try to destroy barriers to get to the target or targets hidden behind them. In one such embodiment, once a player destroys a barrier and gains access to new targets (i.e., potential opportunities to win awards), that player will have chance to pursue the new targets exclusively, without risk of other players simultaneously attacking the same targets. In one such embodiment, the player may pursue or attack the new targets exclusively for a certain period of time. In such embodiments, the other players cannot take advantage of the new targets which were initially blocked by the barrier.

As also seen in FIG. 5D, the player playing at the gaming device 510*c* (i.e., Player three) has now qualified to participate in the bonus game, as indicated by the message displayed by the secondary display device 520*c* of the gaming device 510*c*. Player three is provided with fifty bullets which he can use in the bonus game. Player three is prompted to select a target by choosing one of the selections on the touch screen.

Figure 5E:
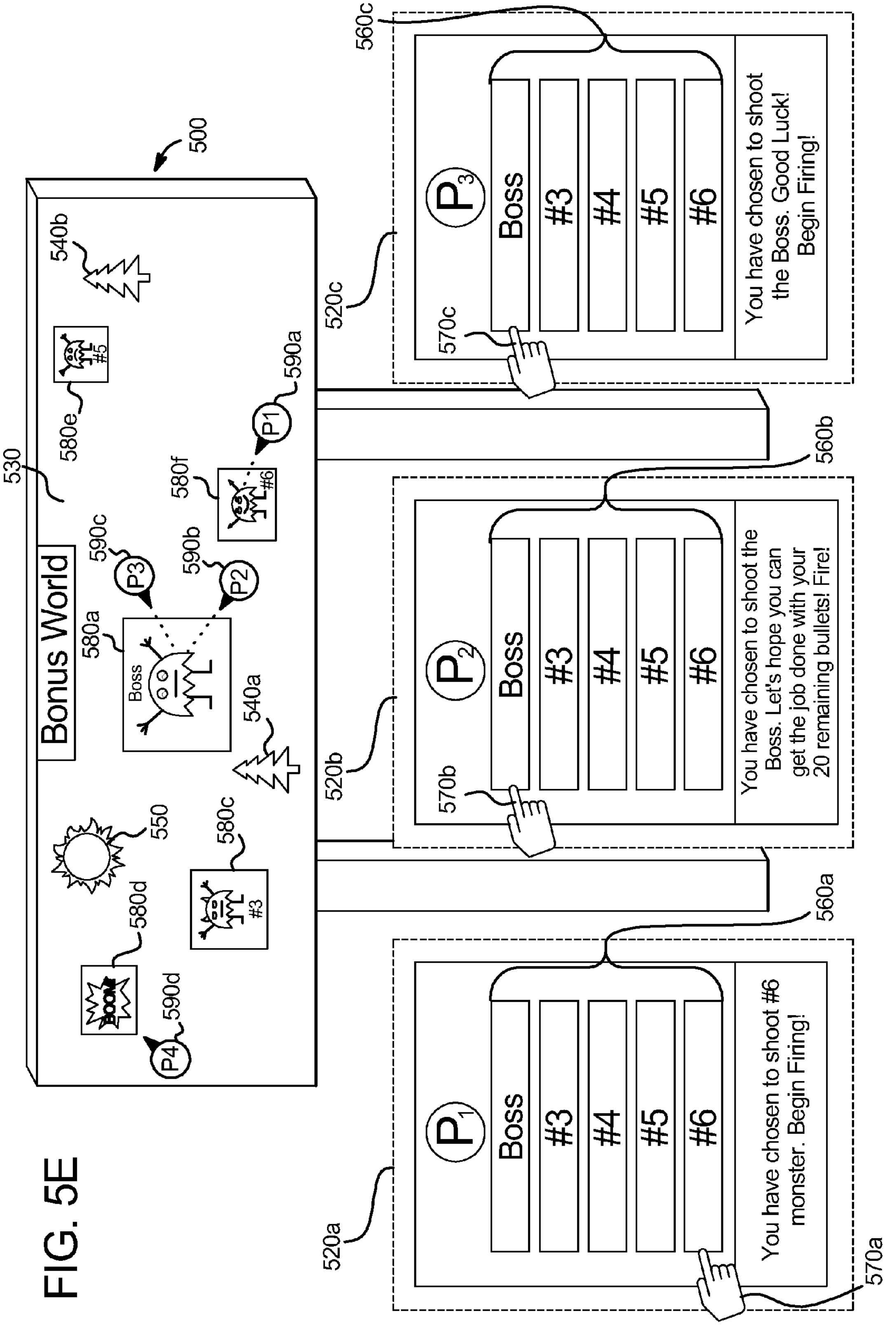

As illustrated in FIG. 5E, Player three 570*c* has selected the target 580*a*, which is represented by a "Boss" monster. Thus, a player avatar 590*c* representing Player three appears in the game world 530 and is aimed at the target 580*a* (i.e., the "Boss" monster). Based on the monster's name, it can be inferred that this monster is the most difficult to defeat, and as a result, is probably associated with a large award. In certain embodiments, each or a plurality of the targets are associated with characters that convey information regarding the rank of the target. For example, a Boss monster may be the leader, or the highest ranking, of all the monsters. In one such embodiment, by defeating the Boss monster, a player or team of players wins the awards associated with one or more of the other lower-ranking monsters in addition to the award associated with the Boss monster. In other embodiments, a player or team of players that destroys the Boss monster wins the entire game, or wins the awards associated with all of the other monsters in addition to the award associated with the Boss monster.

As seen in FIG. 5E Player two 570*b* has also chosen to attack the target 580*a*. Thus, the player avatar 590*b* representing Player two moves until the avatar 590*b* is aimed at the Boss monster. Player one 570*a* has chosen to attack the #6 target 580*f*.

Although Player two was previously on a team with Player one when they attacked the target 580*b* (i.e., the 2nd in Command monster), Players two and three will now work as a team to take down the target 580*a* (i.e., the Boss monster). It should be appreciated that players can form and change teams during the bonus game in any suitable manner.

Player four (i.e., the player represented by the player avatar 590*d*) has just killed the #4 target 580*d*, as indicated by the big explosion that has taken the place of the #4 target 580*d*.

Figure 5F:
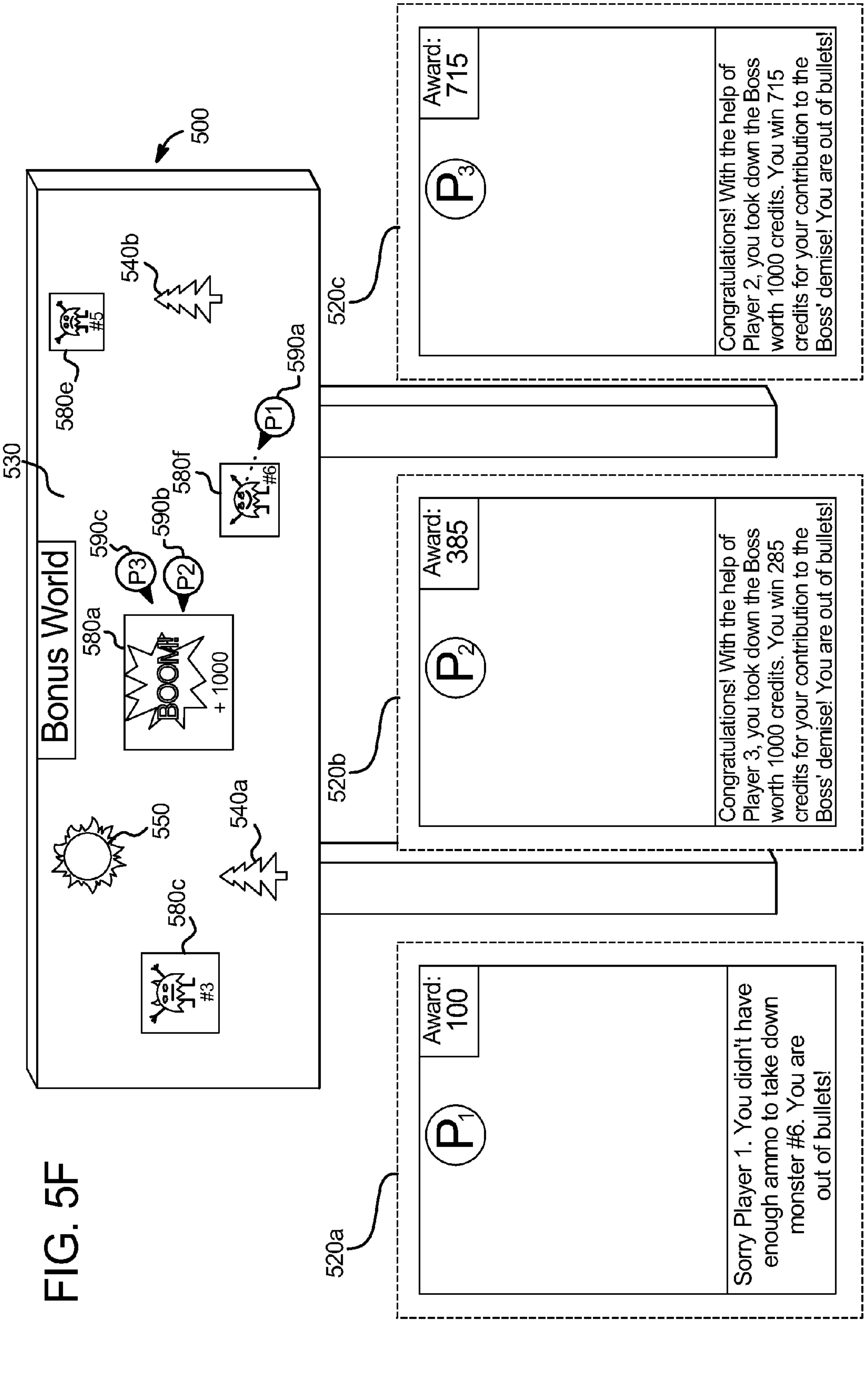

Referring now to FIG. 5F, the player avatar 490*a* representing Player one is no longer shooting bullets at the #6 target 580*f*. Player one is out of bullets, and did not have enough to destroy the #6 target 580*f*. The secondary display device 520*a* of gaming device 510*a* displays a message to Player one indicating that he is out of bullets. For Player one's bonus game session, he won a total award of one hundred credits. Player one can resume playing the primary game of his gaming device 510*a*.

As seen in FIG. 5F, the Boss monster has exploded and the number "+1000" is displayed in its place. Player two and Player three share the one thousand credit award associated with the Boss monster, since they worked together to destroy it. As indicated by the secondary display device 520*b* of gaming device 510*b*, Player two receives two hundred and eighty five credits of the total one thousand credits for helping to kill the Boss monster. Player three receives seven hundred and fifteen credits of the total one thousand credits for helping to kill the Boss monster, as indicated by the secondary display device 520*c* of gaming device 510*c*. Players two and three receive a portion of the award associated with the Boss monster, based on the relative contribution of each player. Since Player three shot fifty bullets at the Boss monster and Player two shot twenty bullets at the Boss monster, Player three receives a larger portion of the award.

Players one, two and three are all out of bullets. Therefore, the bonus game ends with respect to each of Players one, two, and three.

Figure 5G:
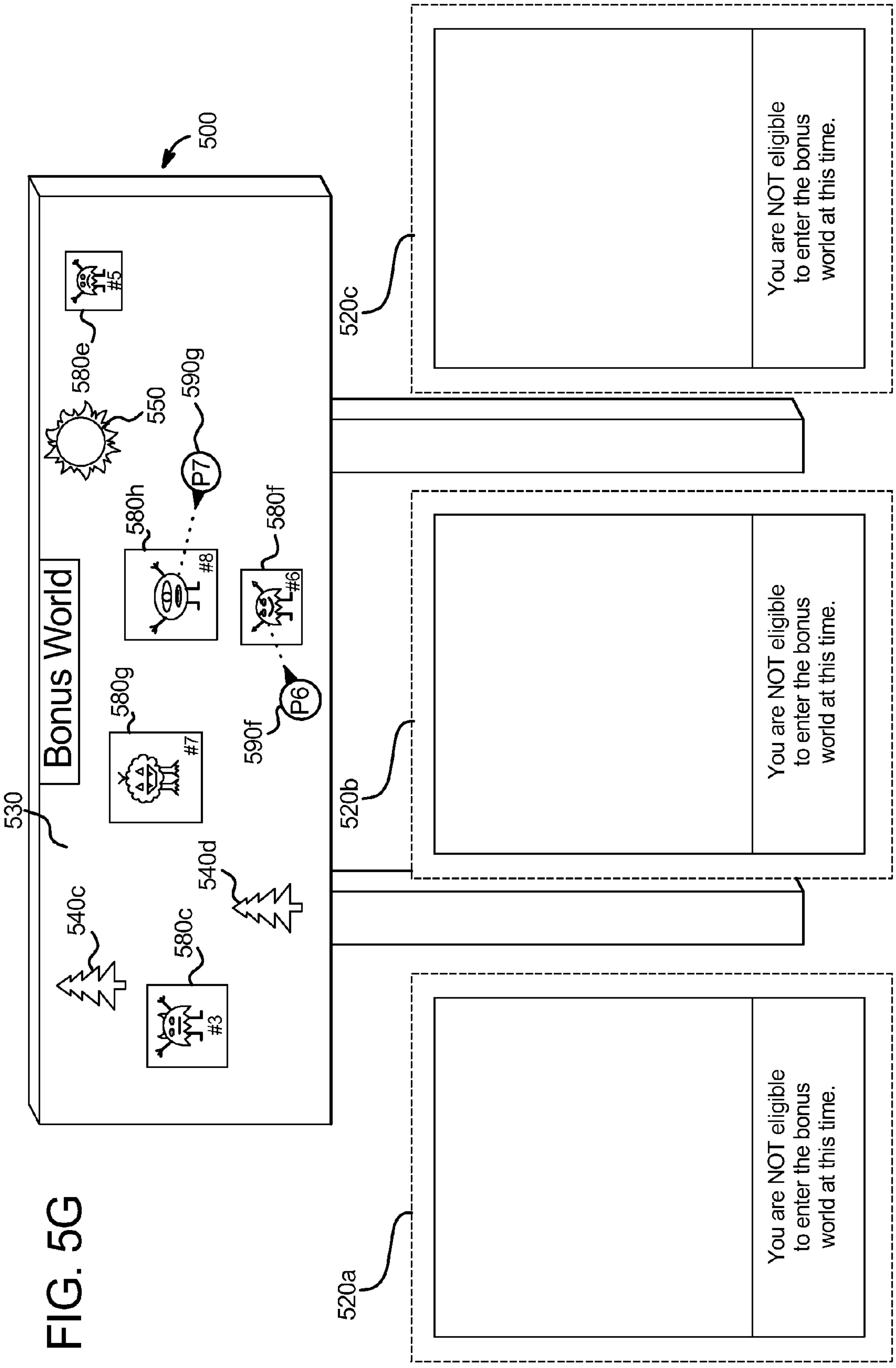

As seen in FIG. 5G, the player avatars representing players one, two, and three 590*a*, 590*b*, and 590*c*, respectively, are no longer in the game world 530. The secondary displays 520*a*, 520*b* and 520*c* indicate that Players one, two, and three are not eligible to enter the bonus game at this time.

Although Players one, two, and three are not playing in the bonus game, a number of changes have occurred in the game world. For example, two other player avatars 590*f* and 590*g* are present in the game world 530. Two new monsters, representing the #7 target 580*g* and the #8 target 580*h*, have invaded the bonus world. Additionally, based on the location of the sun 550 and two new trees 540*c* and 540*d* which are visible in the game world, it appears that the targets have moved to a different part of the game world 530. In the example of FIGS. 5A to 5G, the Boss monster was destroyed and, thus, is no longer displayed in the bonus world. In various other embodiments, once a Boss monster is destroyed, a new Boss monster enters the bonus world or one of the remaining monsters becomes the Boss monster, such that there is always at least one Boss monster available in the bonus world.

Thus, the present disclosure, in one embodiment, provides an ongoing bonus game, which is always on and ever-changing based on the activities of other players who are already there. In such embodiments, the ongoing bonus game is continuously occurring and changing whether or not there are players in the game world or not.

In one embodiment, the player must place a side wager with the primary game wager to be able to shoot at targets in the bonus game. In one embodiment, a player can only shoot at targets in the bonus game if that player has won in the primary game. In one such embodiment, the bonus game is activated during a credit roll up (i.e., the player can shoot at targets during a credit roll-up). More specifically, if a player wins credits in a play of a primary game, a transfer of any credits won to the player's credit meter occurs. Only after the credits won by the player have transferred to the player's credit meter can the player cash out to obtain those credits. While any credits won by the player are transferring to the player's credit meter, there is a significant amount of down-time during which the player typically is sitting at the gaming device and watching the credit transfer, but not actively playing on the gaming device. Accordingly, the bonus game of this embodiment, is activated during the credit roll-up, which eliminates gaming down-time and enhances the player's overall gaming experience.

It should be appreciated that, although the above embodiments are described as a bonus game, the ongoing, extended, or persistence game may be provided as a primary or base game operable upon placement of a wager. Further, the game in alternative embodiments may be provided in a single-player format or in a multiplayer format.

Multiplayer Matrix Game Embodiments

Referring now generally to FIGS. 6A, 6B, 6C, 6D, 6E, 6F, 6G, 6H, 6I, and 6J, one alternative embodiment of the present disclosure provides a multiplayer game which includes a matrix 600 or map divided into a plurality of sectors 602*a*, 602*b*, 602*c*, and 602*d*. A plurality of awards are located at various points on the matrix. In certain embodiments, the awards are displayed to the players such that each player can see information relating to one or more of the location of the award on the matrix and the value of the award. A plurality of players playing at a plurality of gaming machines are each provided with a number of collectors which can be placed on the map in attempt to collect one or more of the awards. That is, each of the players applies a number of his or her provided collectors to one or more of the awards on the matrix. After all of the players have placed their collectors on the matrix, a determination is made as to whether each player will get to collect any awards.

In the example of FIGS. 6A, 6B, 6C, 6D, 6E, 6F, 6G, 6H, 6I, and 6J, four players are playing a game having a spaceship-asteroid theme. FIGS. 6A, 6B, 6C, 6D, 6E, 6F, 6G, 6H, 6I, and 6J show screen shots for one of the four players (i.e., Player one) playing the game. Although this example employs a spaceship-asteroid theme, it should be appreciated that other themes are possible.

In the illustrated embodiment, the game occurs in phases. In a first phase of the game, the gaming system enables each of the four players to place his or her spaceships onto the matrix 600. After all of the players have placed their spaceships on the matrix 600, the second phase of the game begins. In the second phase, a determination is made as to whether any of the players will get to collect any awards.

Figure 6A:
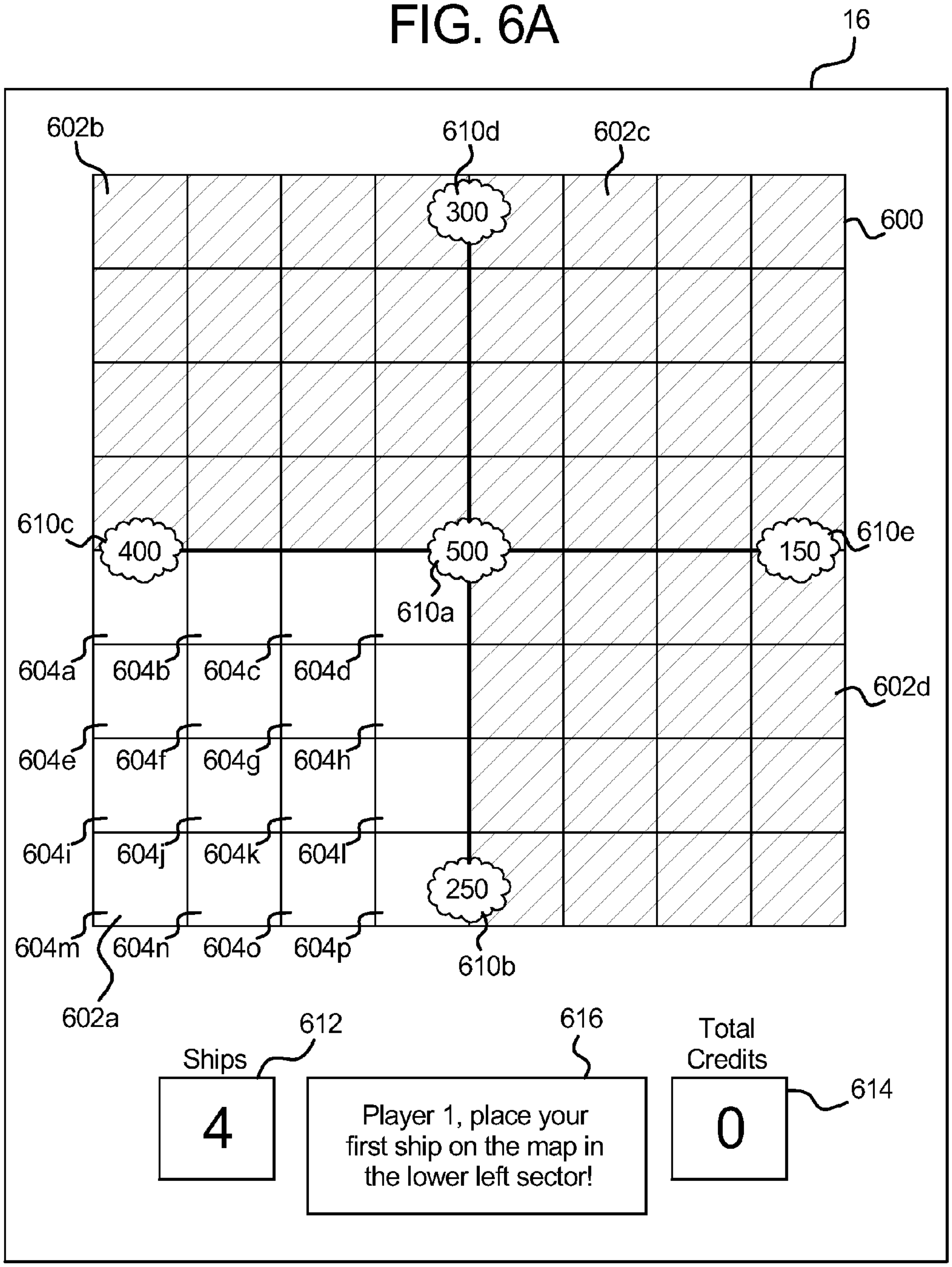
FIGS. 6A, 6B, 6C, 6D, 6E, 6F, 6G, 6H, 6I, and 6J illustrate screen shots for one player who is participating in a game according to one multiplayer embodiment of the present disclosure.

Referring now to FIG. 6A, each of the sectors 602*a*, 602*b*, 602*c*, and 602*d* of the matrix 600 includes a plurality of spaces. For example, sector 602*a* is associated with sixteen spaces 604*a*, 604*b*, . . . 604*p*. In the illustrated embodiment, sectors 602*b*, 602*c*, and 602*d* each include sixteen spaces, as well. It should be appreciated that the matrix 600 may include any number of sectors, each including any number of spaces.

A plurality of asteroids 610*a*, 610*b*, 610*c*, 610*d*, and 610*e* are positioned on the matrix 600. In the illustrated embodiment, each of the asteroids 610*a*, 610*b*, 610*c*, 610*d*, and 610*e* is associated with an award which is displayed on that asteroid. In various embodiments, each of the asteroids may be positioned on a designated one of the plurality of the spaces or between two or more of the spaces. For example, as seen on FIG. 6A, a first asteroid 610*a* associated with an award of 500 credits is located in the center of the matrix, such that the asteroid 610*a* overlaps with one space of each of the four sectors 602*a*, 602*b*, 602*c*, and 602*d* of the matrix 600.

In FIG. 5A, the first phase of the game begins. As indicated by the ship meter 612, the first player has four spaceships to place on the matrix 600 during the first phase of the game. When placing spaceships, players want to position their spaceships so as to shoot asteroids and other players' ships, both of which reward the player with credits. In one embodiment, a player cannot destroy his own spaceships. In another embodiment, a player can destroy his own spaceships, but he wins no award for destroying his own spaceships.

As indicated by the message box 616, Player one is prompted to place his first spaceship in the lower left sector 602*a*. The other sectors 602*b*, 602*c*, and 602*d* are shaded to indicate to Player one that he cannot place a spaceship in one of these sectors 602*b*, 602*c*, and 602*d* at this time. Meanwhile, Players two, three, and four are prompted to place their first spaceships in one of the other sectors 602*b*, 602*c*, and 602*d* (not illustrated).

When placing spaceships, each player places one spaceship in a particular one of the sectors. Each player is placing a spaceship in a different sector. In this manner, players' ships do not overlap with one another. In one embodiment, instead of a player selecting a space for his spaceship, the player selects one of the asteroids, and that player's spaceship is automatically placed within reach of that asteroid. In one embodiment, if a player fails to place a ship in a sector within a designated amount of time, then that player's spaceship is randomly placed in one of the available spaces in that sector.

Figure 6B:
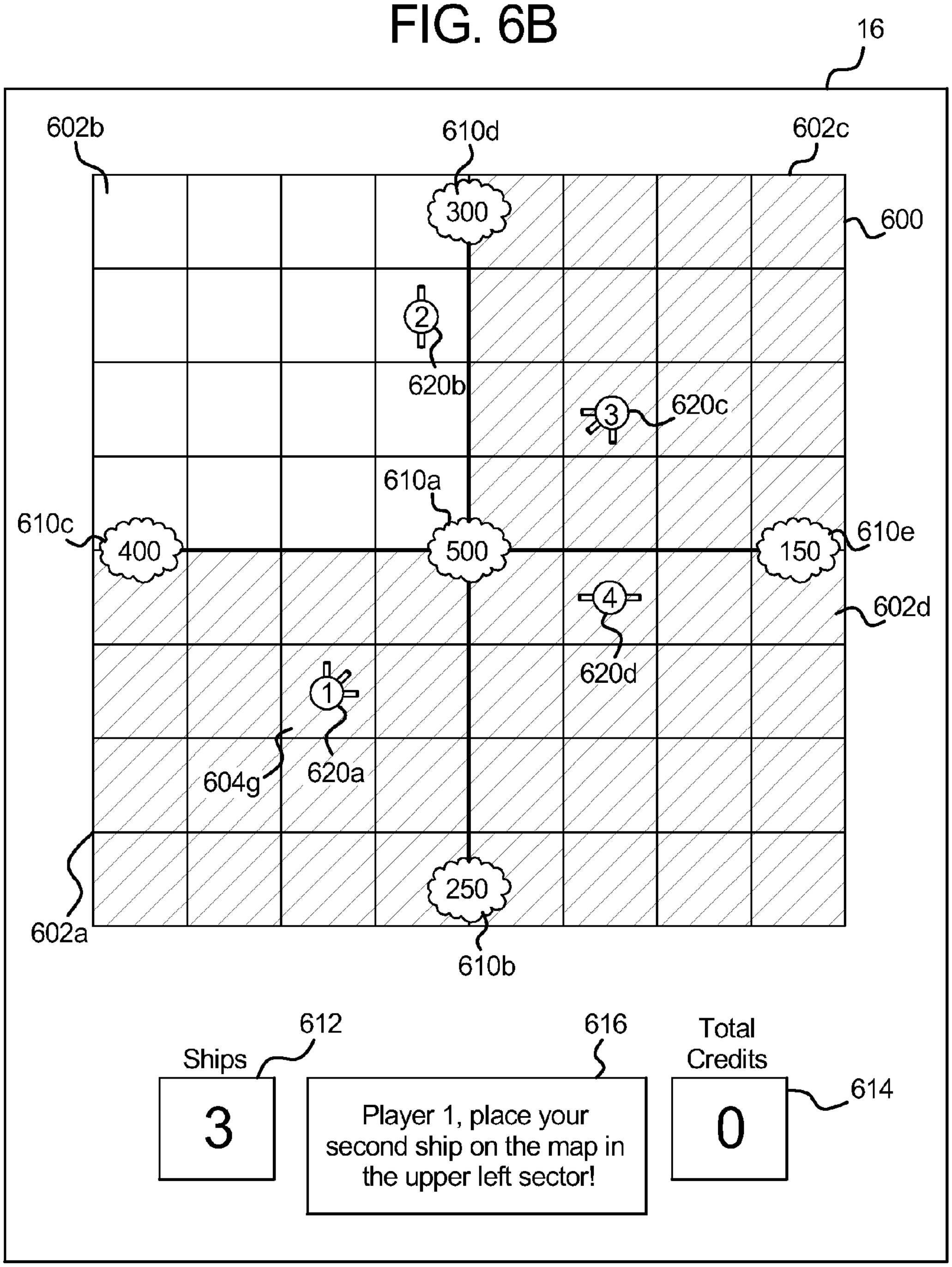

As seen in FIG. 6B, Player one placed his first spaceship 620*a* in one of the spaces (i.e., space 604*g*) of the lower left sector 602*a* of the matrix 600. Player one's first ship 620*a* is marked with the number "1" and has three guns. In one embodiment, each spaceship includes a plurality of guns. In this example, each player is provided with two spaceships having two guns and two spaceships having three guns. The order and orientation of these spaceships are randomly determined. The game randomly picks spaceships for each player to place on the matrix 600, but each spaceship always has guns which are pointed in directions that make sense for the particular sector in which that spaceship is being placed.

As indicated by the message box 616, Player 1 is prompted to place his second spaceship in the upper left sector 602*b*. Meanwhile, Players 2, 3, and 4 are prompted to place their second spaceships in one of the other sectors 602*a*, 602*c*, and 602*d* (not illustrated). At this point, all players can see where each player placed his first spaceship. As illustrated in FIG. 6B, Player one can see three other spaceships 620*b*, 620*c*, and 620*d* on the matrix 600, which belong to Players two, three, and four, respectively. The spaceships belonging to Players two, three, and four are marked with the numbers "2," "3," and "4" respectively.

Figure 6C:
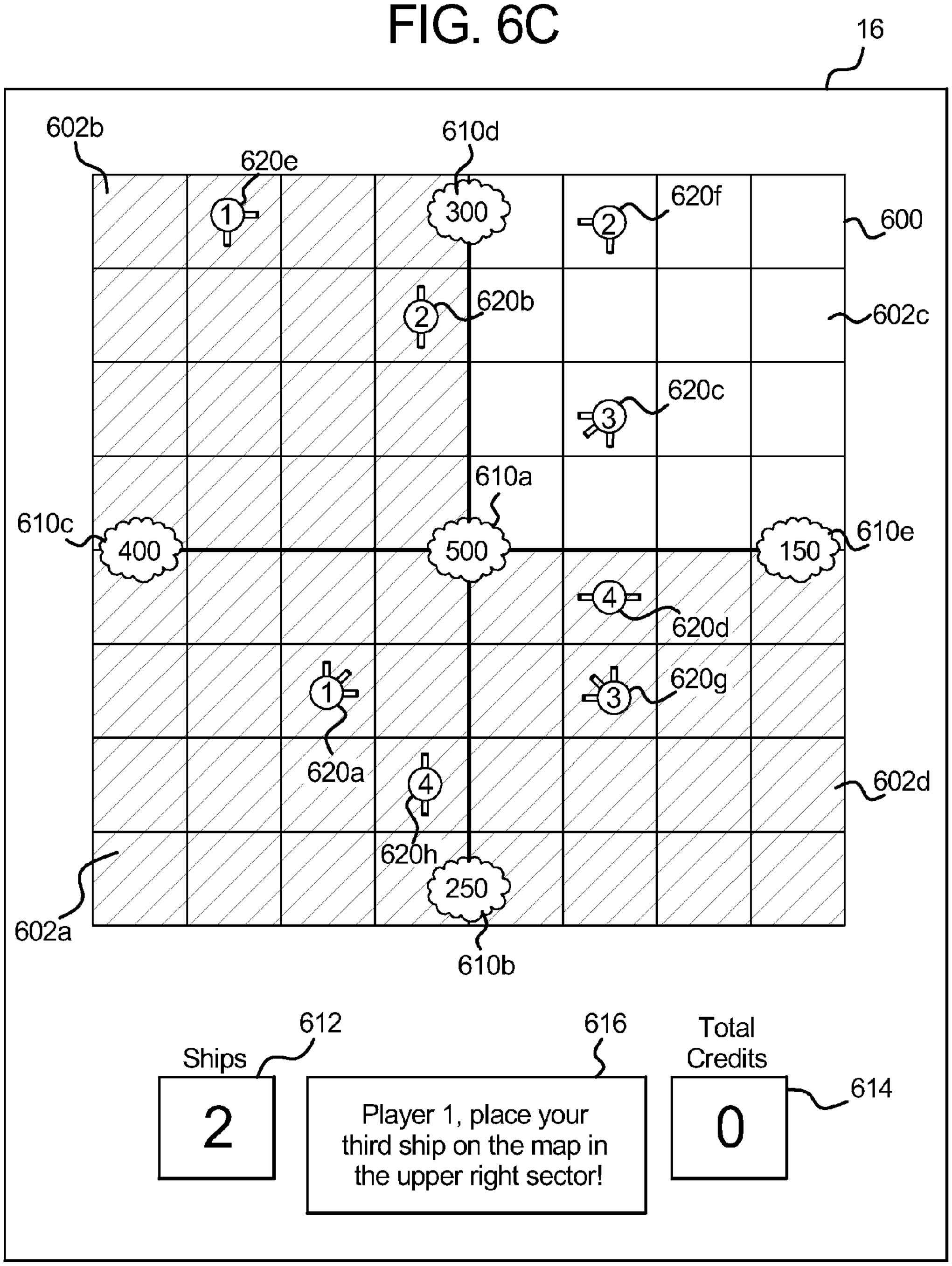

In FIG. 6C, Player one is prompted to place his third spaceship in the upper right sector 602*c*, as indicated by the message box 616. Meanwhile, Players two, three, and four are prompted to place their third spaceships in one of the other sectors 602*a*, 602*b*, and 602*d* (not illustrated). At this point, all players can see where each player placed his first two spaceships.

Figure 6D:
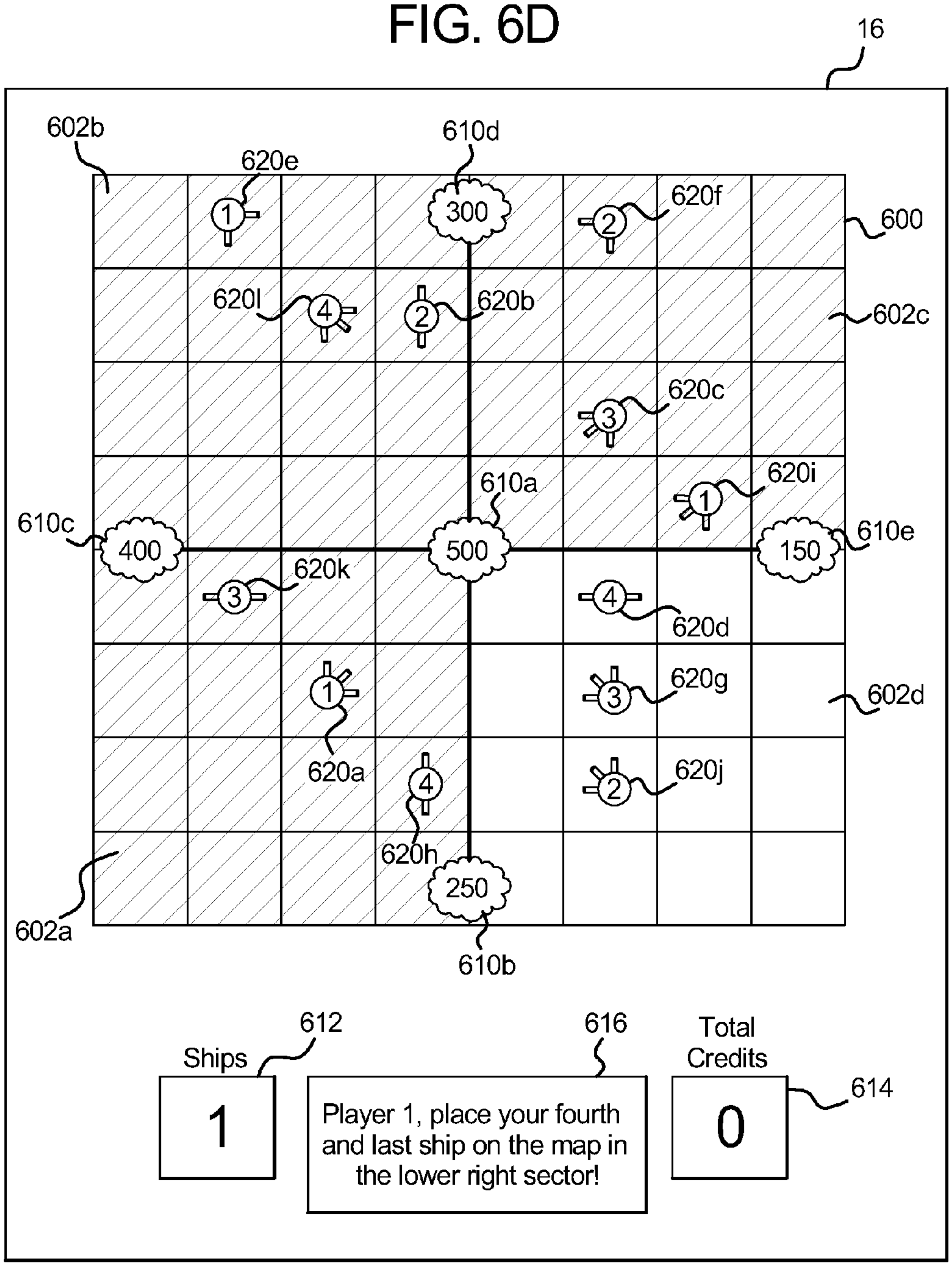

In FIG. 6D, Player one is prompted to place his last spaceship in the lower right sector 602*d*, as indicated by the message box 616. Meanwhile, Players two, three, and four are prompted to place their last spaceships in one of the other sectors 602*a*, 602*b*, and 602*c* (not illustrated). At this point, all players can see where each player placed his first three spaceships.

Figure 6E:
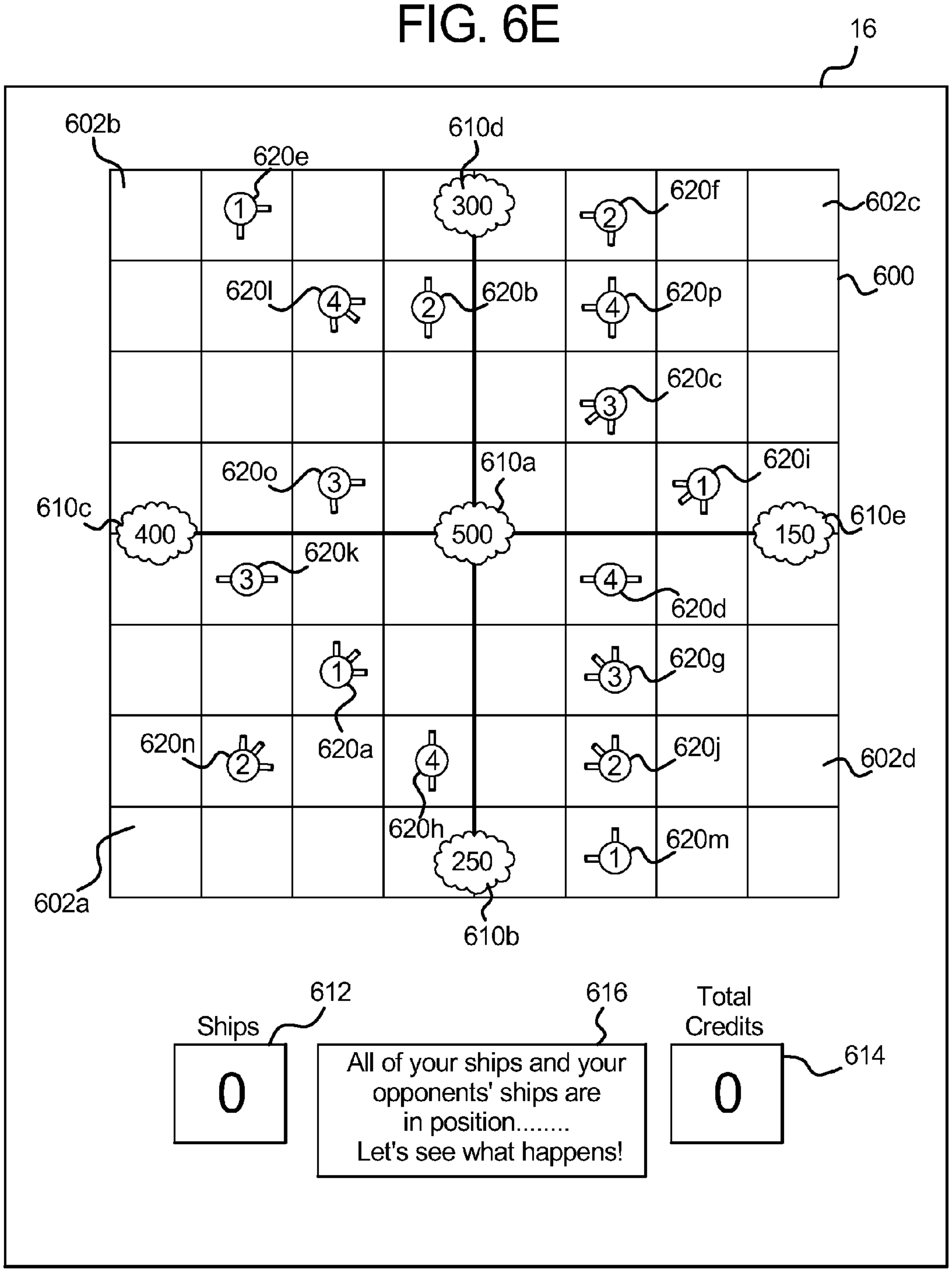

As seen in FIG. 6E, all of the players have placed their four spaceships on the matrix 600. All players can see where all ships are located on the matrix 600.

Since all of the player spaceships are now on the matrix 600, the second phase of the game commences. In the second phase, the sectors are resolved in a random order to determine which of the players will get to collect any awards. In the second phase, the game randomly picks an order for resolving the various sectors. The game randomly determines the order in which spaceships fire. For example, one sector is chosen and all spaceships positioned in that sector fire at once. Players win credits when their spaceship shoots asteroids or other players' ships. Some spaceships may be destroyed as a result of the ships' fire.

It should be appreciated that the order in which sectors are resolved is important in various embodiments. In such embodiments, players will experience a great deal of suspense waiting to see which sectors fire in which order.

Figure 6F:
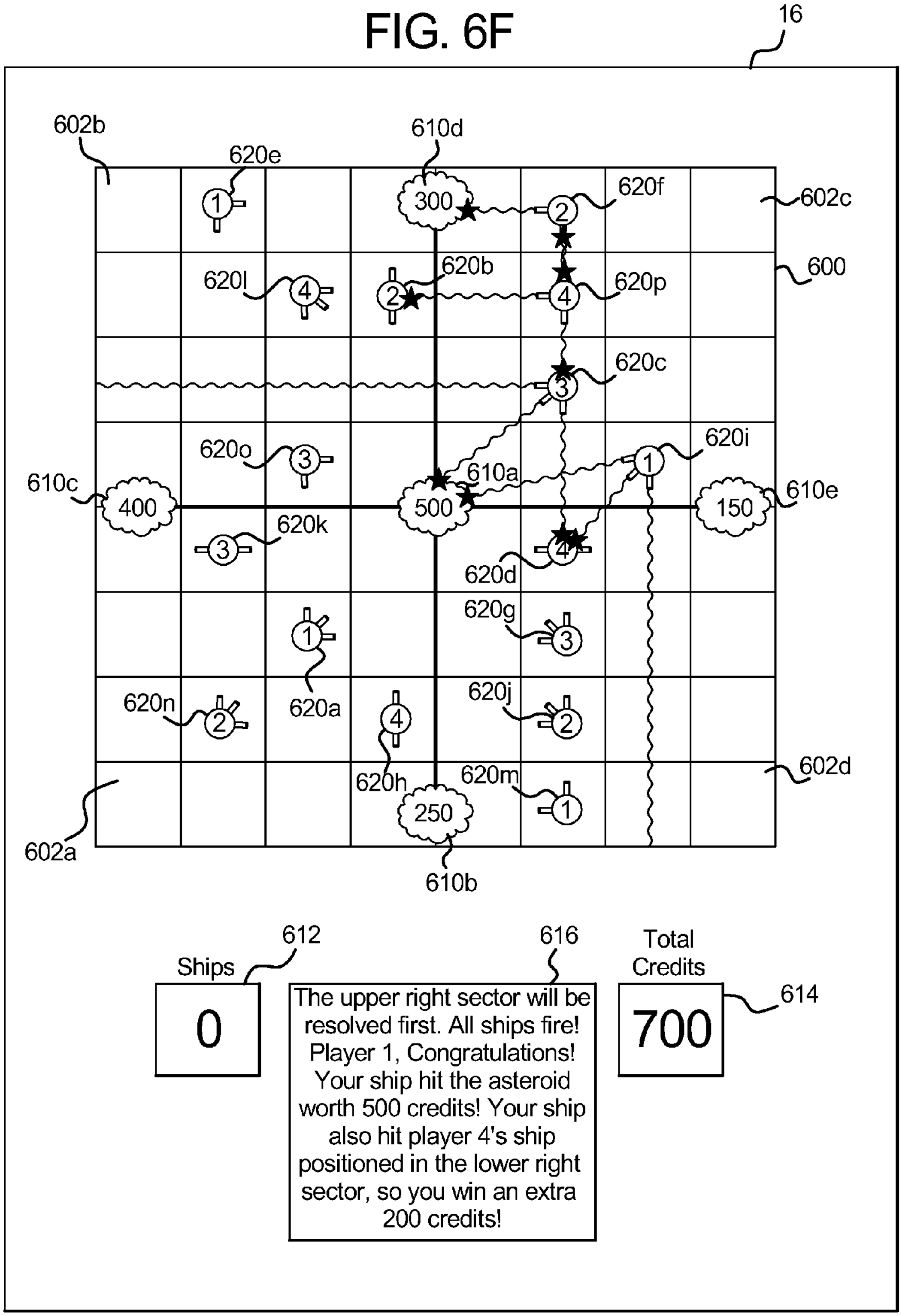

Referring now to FIG. 6F, the upper right sector 602*c* is resolved first, as indicated in the message box 616. All spaceships in this sector 602*c* fire at once. Player one's spaceship 620*i* in the upper right sector 602*c* hits the asteroid 610*a*, which is associated with an award of five hundred credits. In addition, Player one's spaceship 620*i* hits one of Player four's spaceships 620*d* positioned in the lower right sector 602*d*. Certain spaceships in other sectors have also been destroyed. As indicated in the message box 616, Player one wins five hundred credits for hitting the asteroid 610*a* and an additional two hundred credits for hitting Player four's ship 620*d*. This results in a total win for Player one of seven hundred credits. Accordingly, the credit meter 614 displays the number "700."

In one embodiment, the award won by a player for hitting another player's ship is based on the number of guns that other player's ship has. For example, a player wins an award of 200 credits for hitting a ship with two guns. The player wins an award of 300 credits for hitting a ship that has three guns. In various alternative embodiments, the award provided to a player for hitting another ship is predetermined, randomly determined, determined based on player tracking, or based on any other suitable criteria.

It should be appreciated that, since Player one's ship 620*i* hit Player four's ship 620*d*, Player four will not have a ship in the lower right sector 602*d* when it is time for that sector to be resolved. This eliminates Player four's chance to collect any awards when the lower right sector 602*d* is resolved.

Figure 6G:
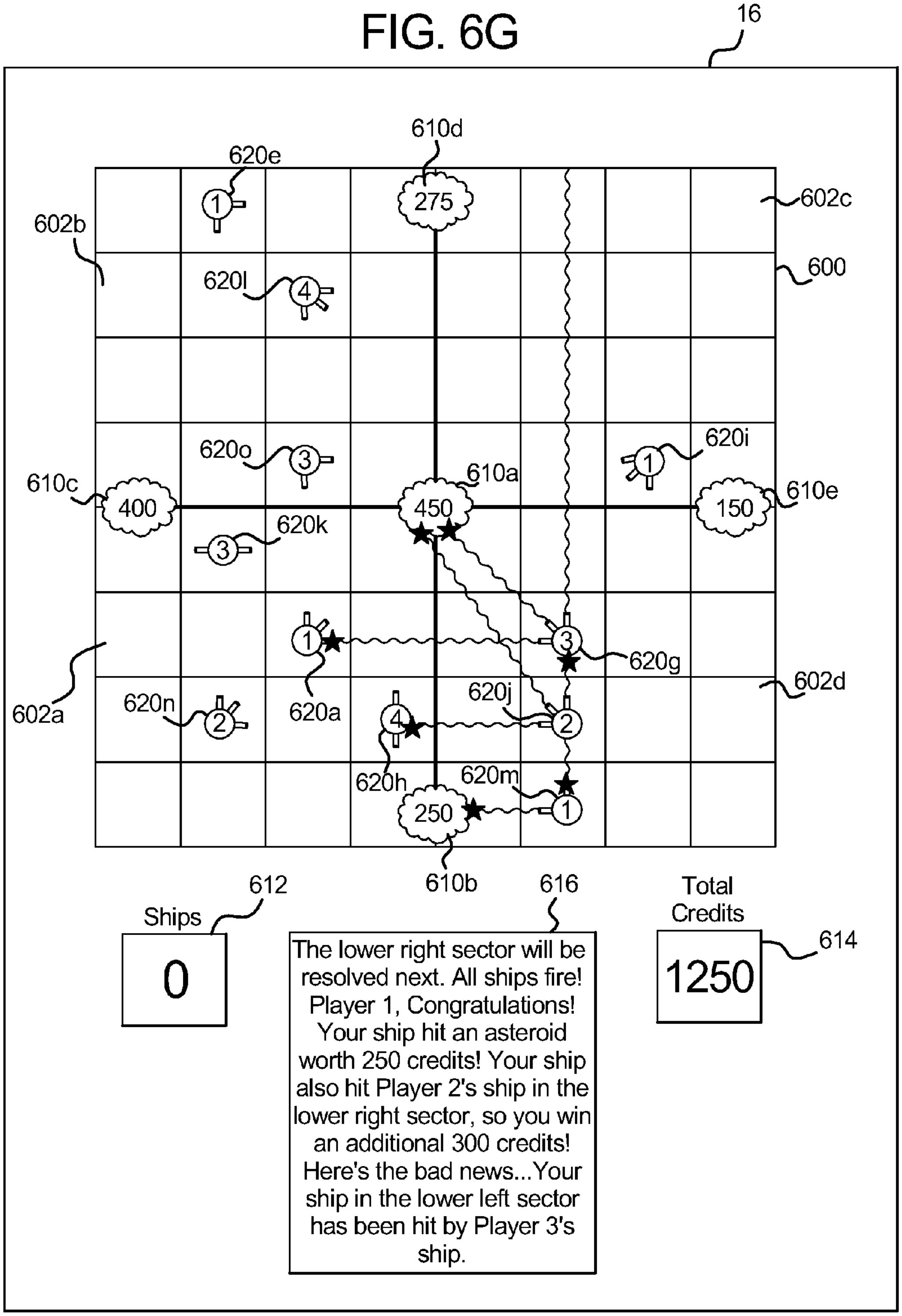

In FIG. 6G, the lower right sector 602*d* is resolved. All spaceships not previously destroyed fire at once in that sector. Again, players win credits when their spaceship shoots asteroids or other players' ships.

In the illustrated embodiment, each time an asteroid is hit, it loses 25 credits of value. Thus, as illustrated in FIG. 6G, the asteroid 610*a* now displays an award of 450 credits instead of 500 credits because this asteroid 610*a* was hit by Player one's ship 620*i* and by Player three's ship 620*c*. In another embodiment, the asteroids are destroyed after getting hit. In other embodiments, the positions and values of the asteroids may change from one play of the game to another play of the game. In one embodiment, each player redeems awards based on the distance between that player's ship and a destroyed asteroid. That is, each player who participates in destroying a particular asteroid gets a portion of the award associated with that asteroid based on the distance between that player's ship from the asteroid. For example, a player who's ship was positioned farther away from an asteroid receives a larger portion of the award associated with that asteroid than a player who's ship was positioned closer to the asteroid. In one embodiment, player ships share each asteroid. That is, there is no blocking or stealing.

In FIG. 6G, Player one's spaceship 620*m* hits the asteroid 610*b* associated with an award of two hundred and fifty credits. Player one's ship 620*m* also hits Player two's ship 620*j*. As indicated in the message box 616, Player one wins two hundred and fifty credits for hitting the asteroid 610*b* and another three hundred credits for hitting Player two's ship 620*j*. Accordingly, the credit meter 614 is updated to reflect that Player one now has a total of 1250 credits in the game (i.e., 700 credits from the resolution of the upper right sector 602*c* plus 550 credits from the resolution of the lower right sector 602*d*). Unfortunately, Player one's ship 620*a* in the lower left sector 602*a* has been hit by one of Player three's ships 620*g*.

Figure 6H:
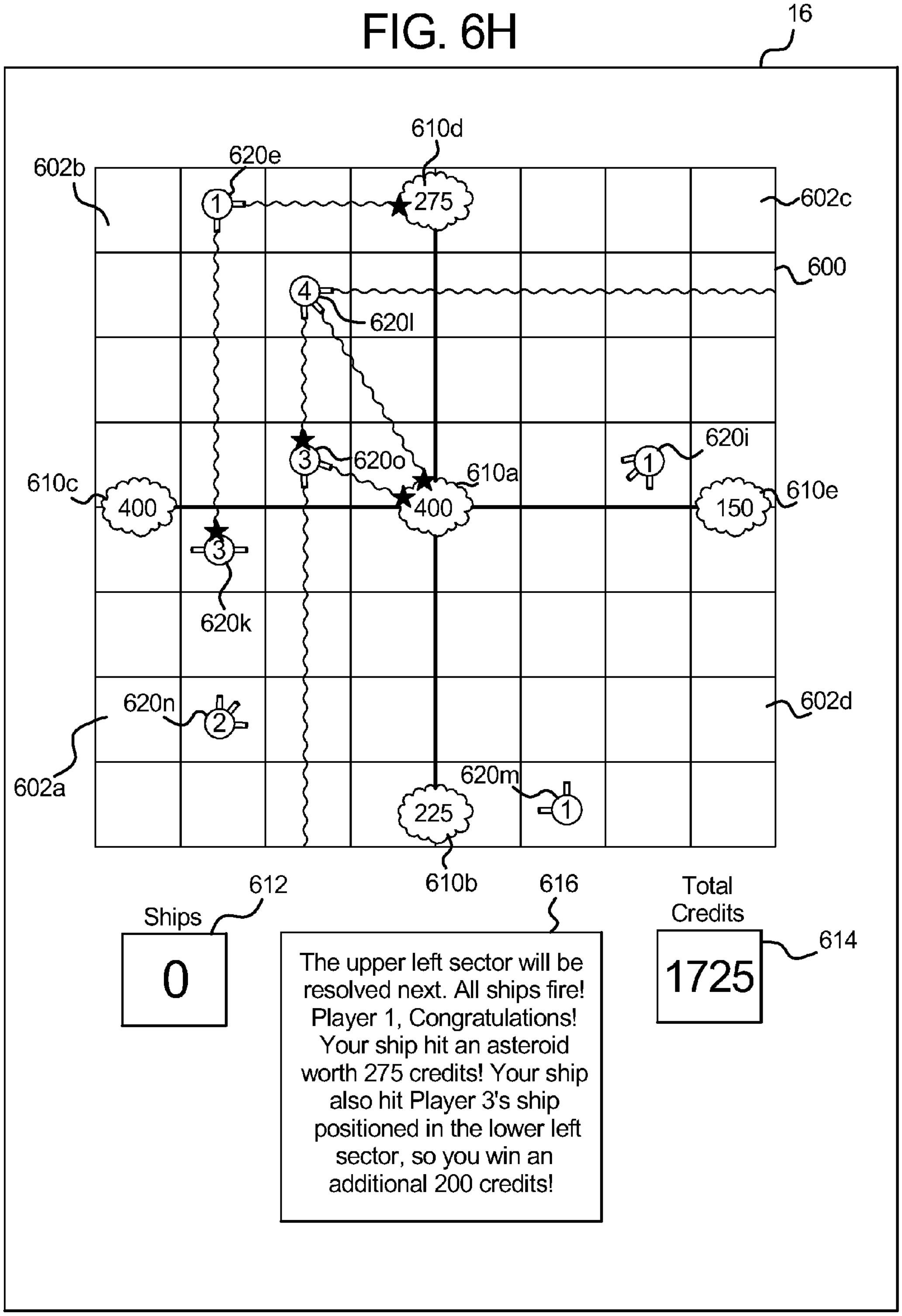

As illustrated in FIG. 6H, the upper left sector 602*b* is resolved next. All spaceships in this sector 602*b* fire at once. For Player one, his spaceship 620*e* hits the asteroid 610*d*, which is associated with an award of two hundred and seventy five credits. Player one's ship 620*e* also hits one of Player three's spaceships 620*k*. Player one wins two hundred and seventy five credits for hitting the asteroid 610*d* and another two hundred credits for hitting Player three's spaceship 620*k*. Accordingly, the credit meter 614 shows the number "1725" (i.e., 1250 plus 475) to reflect the total number of credits won by Player one in the game.

Figure 6I:
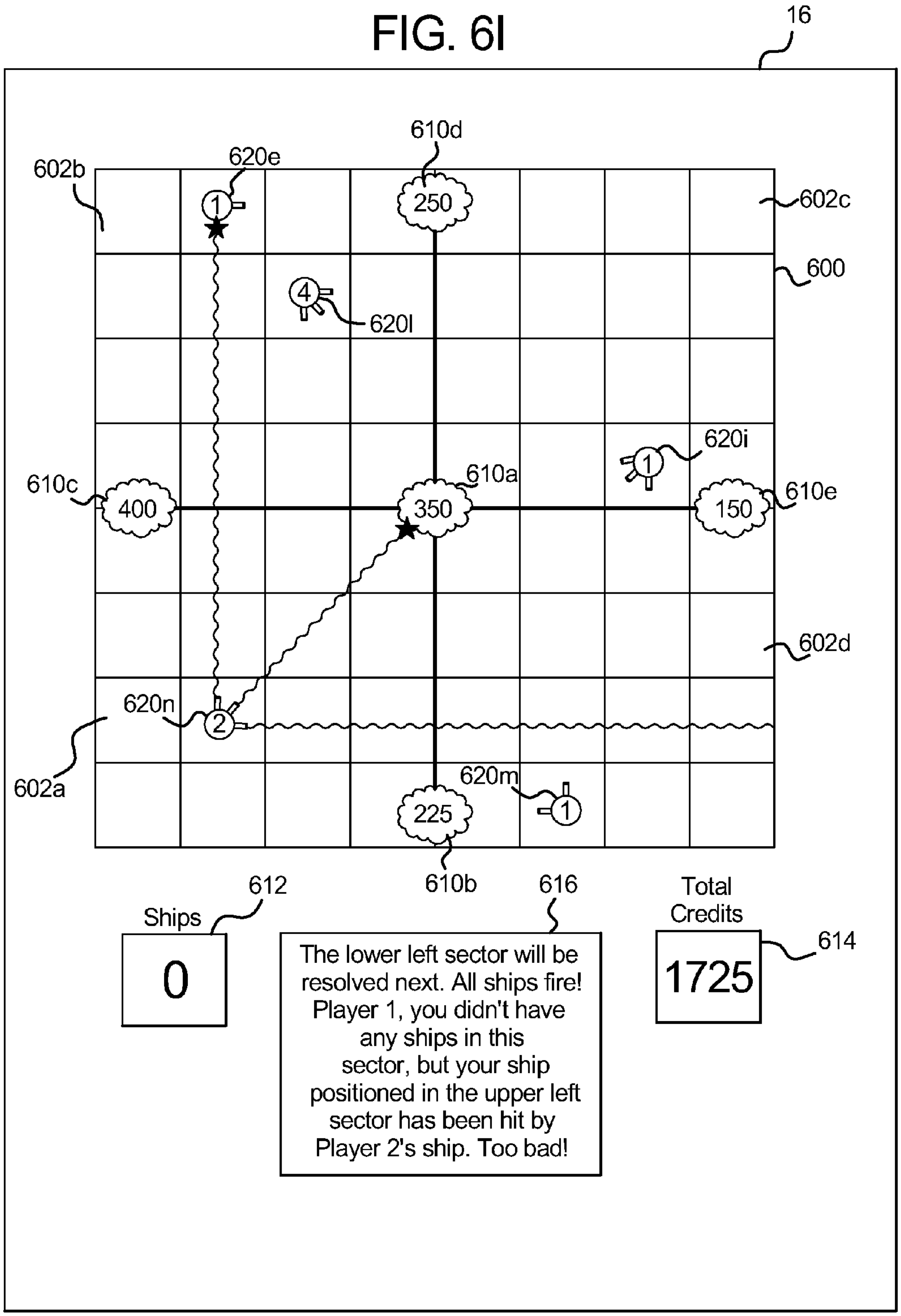

In FIG. 6I, the bottom left sector 602*a* is resolved. All spaceships in this sector 602*a* fire at once. Unfortunately for Player one, he has no spaceships remaining in this sector 602*a*. Thus, Player one cannot win any credits. Only Player 2 wins an award in this round, since Player two's spaceship 620*n* hit the asteroid 610*a*.

Figure 6J:
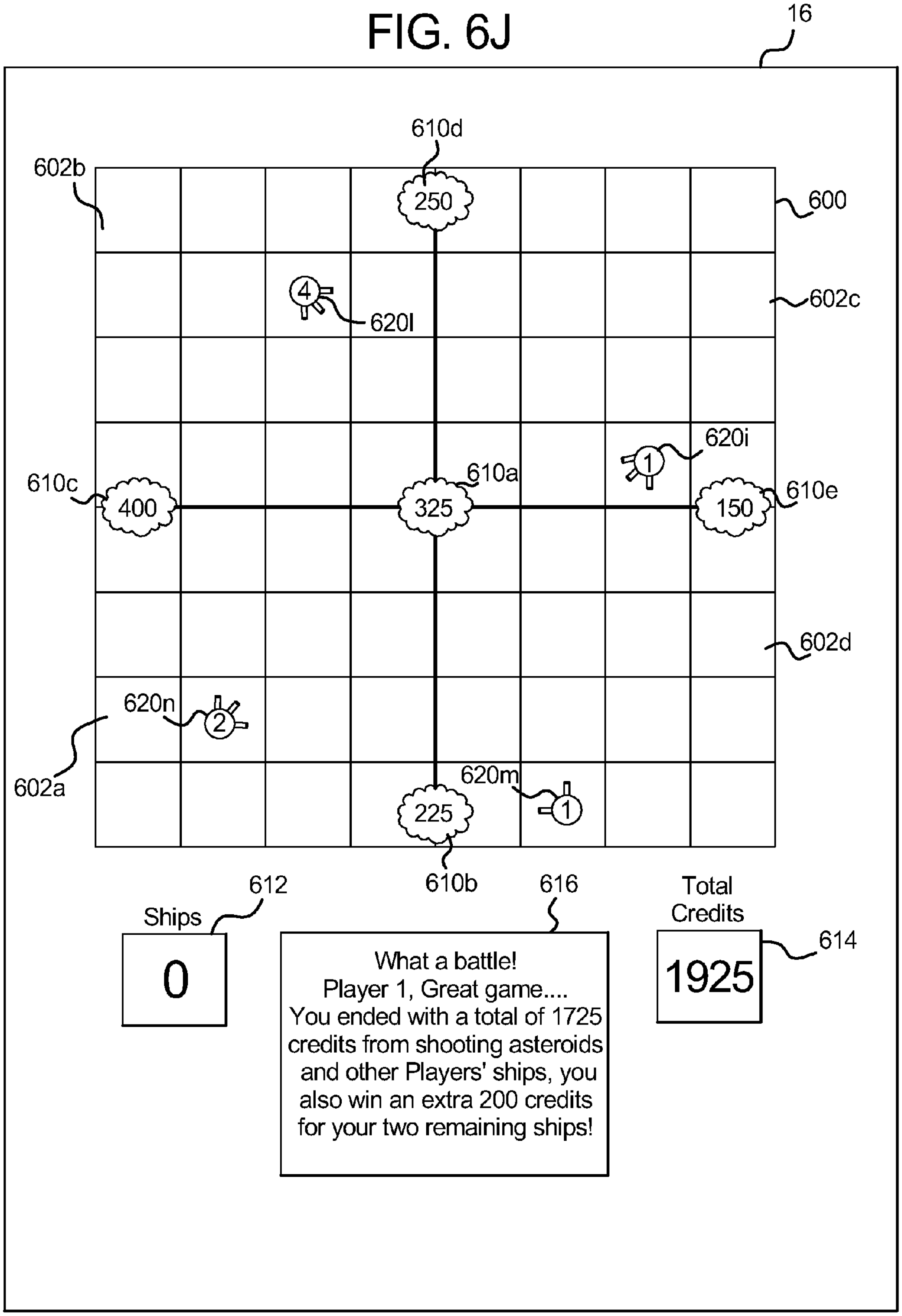

As illustrated in FIG. 6J, each of the sectors 602*a*, 602*b*, 602*c*, and 602*d* has been resolved. Only a handful of spaceships 620*i*, 620*l*, 620*m*, 620*n* remain on the matrix. Two of the remaining spaceships 620*i* and 620*m* belong to Player one. In certain embodiments, at the end of the game, players receive an extra award for each spaceship they have left on the map. In the illustrated example, Player one receives 100 credits for each of the remaining spaceships 620*i* and 620*m*. Overall, Player one won 1925 credits in the game, as indicated by the credit meter 614. In various embodiments, a player can earn a bonus or additional award for destroying as least one spaceship from all other players or for destroying at least a designated number of spaceships.

In one embodiment, one or more players playing the game are not located at the same physical premises (such as via play in an online gaming environment). In one embodiment, the game can be played over the Internet or other suitable data network.

Although in the illustrated example, the game is a multi-player game, the game can also be implemented as a single player game, where the player is fighting against a number of computer-controlled players.

It should be appreciated that each of the foregoing examples are for illustrative purposes and that any of the features of any of the examples or other disclosure herein may be combined in any manner.

It should also be appreciated that although a variety of game themes were used in this disclosure, they were used for illustrative purposes. A variety of game themes may be implemented with the present invention.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

at least one display device;

at least one input device;

at least one processor; and at least one memory device which stores a plurality of instructions, which when executed by the at least one processor, cause the at least one processor to operate with the at least one display device and the at least one input device to:

(a) enable a player to place a wager to participate in a play of a game, said game having a plurality of targets, each target associated with an award and an amount of damage required to destroy said target;

(b) for each target, cause a display of information relating to the award associated with said target and the amount of damage required to destroy said target;

(c) provide the player with a number of projectiles for said play of the game;

(d) enable the player to input a selection of one of said targets;

(i) enable the player to attack the selected target using said projectiles;

(ii) determine an amount of damage caused to the attacked target;

(iii) provide a portion of the award associated with the attacked target to the player, said portion of the award based on the amount of damage caused, wherein:

(A) if the amount of damage caused to the attacked target reaches the amount of damage required to destroy the attacked target, the portion of the award associated with the attacked target includes a full amount of said award; and (B) if the amount of damage caused to the attacked target does not reach the amount of damage required to destroy the attacked target, the portion of the award associated with the attacked target includes less than the full amount of said award;

(iv) if the player has at least a designated number of projectiles remaining:

(A) enable the player to input another selection of one of said targets to attack in said play of the game, and (B) repeat (i) to (iv) until a terminating event occurs; and (v) when the terminating event occurs, terminate said play of the game for the player.

2. The gaming system of claim 1, wherein the number of projectiles provided to the player is predetermined.

3. The gaming system of claim 1, wherein the number of projectiles provided to the player is based on the wager placed by the player.

4. The gaming system of claim 1, which includes a plurality of different types of projectiles, and wherein each different type of projectile causes a different amount of damage to at least one attacked target.

5. The gaming system of claim 1, wherein an additional award for reaching the amount of damage required to destroy said target is provided to the player.

6. The gaming system of claim 1, wherein the amount of damage required to destroy the attacked target is randomly determined.

7. The gaming system of claim 1, wherein the amount of damage caused to the attacked target is randomly determined.

8. The gaming system of claim 1, wherein the terminating event occurs when the player has a designated quantity of usable projectiles remaining.

9. The gaming system of claim 8, wherein the designated quantity is zero.

10. The gaming system of claim 1, wherein the terminating event occurs randomly.

11. A method of operating a gaming system, said method comprising:

(a) enabling a player to place a wager to participate in a play of a game, said game having a plurality of targets, each target associated with an award and an amount of damage required to destroy said target;

(b) for each target, causing at least one processor to execute a plurality of instructions stored in at least one memory device to operate with at least one display device to cause a display of information relating to the award associated with said target and the amount of damage required to destroy said target;

(c) providing the player with a number of projectiles for said play of the game;

(d) enabling the player to input a selection of one of said targets, (i) enabling the player to attack the selected target using said projectiles;

(ii) causing the at least one processor to execute the plurality of instructions to determine an amount of damage caused to the attacked target;

(iii) providing a portion of the award associated with the attacked target to the player, said portion of the award based on the amount of damage caused, wherein:

(A) if the amount of damage caused to the attacked target reaches the amount of damage required to destroy the attacked target, the portion of the award associated with the attacked target includes a full amount of said award; and (B) if the amount of damage caused to the attacked target does not reach the amount of damage required to destroy the attacked target, the portion of the award associated with the attacked target includes less than the full amount of said award;

(iv) if the player has at least a designated number of projectiles remaining:

(A) enabling the player to input another selection of one of said targets to attack in said play of the game, and (B) repeating (i) to (iv) until a terminating event occurs; and (v) when the terminating event occurs, causing the at least one processor to execute the plurality of instructions to terminate said play of the game for the player.

12. The method of claim 11, which includes causing the at least one processor to execute the plurality of instructions to predetermine the number of projectiles to provide to the player.

13. The method of claim 11, which includes causing the at least one processor to execute the plurality of instructions to determine the number of projectiles to provide to the player based on the wager placed by the player.

14. The method of claim 11, which includes providing a plurality of different types of projectiles, wherein each different type of projectile causes a different amount of damage to at least one attacked target.

15. The method of claim 11, wherein an additional award for reaching the amount of damage required to destroy said target is provided to the player.

16. The method of claim 11, which includes causing the at least one processor to execute the plurality of instructions to randomly determine the amount of damage required to destroy the attacked target.

17. The method of claim 11, which includes causing the at least one processor to execute the plurality of instructions to randomly determine the amount of damage caused to the attacked target.

18. The method of claim 11, which includes causing the at least one processor to execute the plurality of instructions to cause the terminating event to occur when the player has a designated quantity of usable projectiles remaining.

19. The method of claim 12, wherein the designated quantity is zero.

20. The method of claim 11, which includes causing the at least one processor to execute the plurality of instructions to randomly determine when the terminating event occurs.

21. The method of claim 11, which is provided through a data network.

22. The method of claim 21, wherein the data network is an internet.

23. A gaming system comprising:

at least one display device;

at least one input device;

at least one processor; and at least one memory device which stores a plurality of instructions, which when executed by the at least one processor, cause the at least one processor to operate with the at least one display device and the at least one input device to:

(a) enable a player to place a wager to participate in a play of a game, said game having a plurality of targets, each target associated with an award and an amount of damage required to destroy said target;

(b) for each target, cause a display of information relating to the award associated with said target and the amount of damage required to destroy said target;

(c) provide the player with a number of projectiles for said play of the game;

(d) enable the player to join at least one team for said play of the game; and (e) enable the player to input a selection of one of said targets, wherein each of a plurality of players of said at least one team may select the same target to attack;

(i) enable the player to attack the selected target using said projectiles;

(ii) determine an amount of damage caused to the attacked target;

(iii) provide a portion of the award associated with the attacked target to the player, said portion of the award based on the amount of damage caused;

(iv) if the player has at least a designated number of projectiles remaining:

(A) enable the player to input another selection of one of said targets to attack in said play of the game, and (B) repeat (i) to (iv) until a terminating event occurs; and (v) when the terminating event occurs, terminate said play of the game for the player.

24. The gaming system of claim 23, wherein the plurality of instructions, when executed by the at least one processor, cause the at least one processor to operate with the at least one display device and the at least one input device to provide a portion of the award associated with the attacked target to each of the players of said team, wherein each player's portion is determined based on one of: (i) a number of projectiles used by said player to attack said target; and (ii) an amount of damage caused to the attacked target by said player.

25. A method of operating a gaming system, said method comprising:

(a) enabling a player to place a wager to participate in a play of a game, said game having a plurality of targets, each target associated with an award and an amount of damage required to destroy said target;

(b) for each target, causing at least one processor to execute a plurality of instructions stored in at least one memory device to operate with at least one display device to cause a display of information relating to the award associated with said target and the amount of damage required to destroy said target;

(c) providing the player with a number of projectiles for said play of the game;

(d) enabling the player to join at least one team for said play of the game;

(e) enabling the player to input a selection of one of said targets, wherein each of a plurality of players of said at least one team may select the same target to attack;

(i) enabling the player to attack the selected target using said projectiles;

(ii) causing the at least one processor to execute the plurality of instructions to determine an amount of damage caused to the attacked target;

(iii) providing a portion of the award associated with the attacked target to the player, said portion of the award based on the amount of damage caused;

(iv) if the player has at least a designated number of projectiles remaining:

(A) enabling the player to input another selection of one of said targets to attack in said play of the game, and (B) repeating (i) to (iv) until a terminating event occurs; and (v) when the terminating event occurs, causing the at least one processor to execute the plurality of instructions to terminate said play of the game for the player.

26. The method of claim 25, which includes providing a portion of the award associated with the attacked target to each of the players of said team, wherein each player's portion is determined based on one of: (i) a number of projectiles used by said player to attack said target; and (ii) an amount of damage caused to the attacked target by said player.

* * * * *

UNITED STATES PATENT AND TRADEMARK OFFICE

CERTIFICATE OF CORRECTION

PATENT NO. : 8,708,800 B2
APPLICATION NO. : 13/773232
DATED : April 29, 2014
INVENTOR(S) : Mark C. Nicely et al.

It is certified that error appears in the above-identified patent and that said Letters Patent is hereby corrected as shown below:

IN THE CLAIMS

In Claim 23, Column 43, Line 41, delete “and.”.
In Claim 24, Column 44, Line 6, replace “a” with --the--.
In Claim 24, Column 44, Line 8, between “said” and “team” insert --at least one--.
In Claim 26, Column 44, Line 50, replace “a” with --the--.
In Claim 26, Column 44, Line 52, between “said” and “team” insert --at least one--.

Signed and Sealed this
Seventh Day of October, 2014

Michelle K. Lee

Michelle K. Lee
*Deputy Director of the United States Patent and Trademark Office*